US012525038B2

(12) United States Patent
Miyatani

(10) Patent No.: US 12,525,038 B2
(45) Date of Patent: Jan. 13, 2026

(54) IMAGE PROCESSING APPARATUS AND METHOD, PROGRAM, AND IMAGE PROCESSING SYSTEM

(71) Applicant: Sony Group Corporation, Tokyo (JP)

(72) Inventor: Yoshitaka Miyatani, Tokyo (JP)

(73) Assignee: Sony Group Corporation, Tokyo (JP)

( * ) Notice: Subject to any disclaimer, the term of this patent is extended or adjusted under 35 U.S.C. 154(b) by 732 days.

(21) Appl. No.: 17/798,423

(22) PCT Filed: Mar. 18, 2021

(86) PCT No.: PCT/JP2021/010984
§ 371 (c)(1),
(2) Date: Aug. 9, 2022

(87) PCT Pub. No.: WO2021/200188
PCT Pub. Date: Oct. 7, 2021

(65) Prior Publication Data
US 2023/0070798 A1 Mar. 9, 2023

(30) Foreign Application Priority Data

Mar. 31, 2020 (JP) ................................. 2020-063540

(51) Int. Cl.
*G06V 20/64* (2022.01)
*G06T 5/00* (2006.01)
(Continued)

(52) U.S. Cl.
CPC ................ *G06V 20/64* (2022.01); *G06T 5/00* (2013.01); *G06T 5/20* (2013.01); *G06V 40/16* (2022.01);
(Continued)

(58) Field of Classification Search
CPC ... G06T 5/00; G06T 5/20; G06T 2207/20081; G06T 2207/30201; G06V 20/64; G06V 40/16; H04N 23/955
See application file for complete search history.

(56) References Cited

U.S. PATENT DOCUMENTS 9,296,336 B2 * 3/2016 Sobue .................... H04N 23/51
2020/0410654 A1 12/2020 Oyaizu

FOREIGN PATENT DOCUMENTS

CN 109479101 A 3/2019
EP 3700186 A1 8/2020
(Continued)

OTHER PUBLICATIONS

Oyaizu (Computer English Translation of WO Patent No. WO 2019/171691 A1). (Year: 2019).*
(Continued)

*Primary Examiner* — Daniel G Mariam
(74) *Attorney, Agent, or Firm* — Michael Best & Friedrich LLP

(57) ABSTRACT

A restoration region where a restoration image is to be created by use of a restoration matrix is identified, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject. For example, the present disclosure can be applied to an image processing apparatus, an image capturing apparatus, an image capturing element, electronic equipment, a system, and the like.

22 Claims, 45 Drawing Sheets

(51) Int. Cl.
  *G06T 5/20* (2006.01)
  *G06V 40/16* (2022.01)
  *H04N 23/955* (2023.01)

(52) U.S. Cl.
  CPC . *H04N 23/955* (2023.01); *G06T 2207/20081* (2013.01); *G06T 2207/30201* (2013.01)

(56) References Cited

FOREIGN PATENT DOCUMENTS

| | | |
|---|---|---|
| JP | 2003333388 A | 11/2003 |
| JP | 2012113605 A | 6/2012 |
| JP | 2013025473 A | 2/2013 |
| JP | 2019115487 A | 7/2019 |
| WO | 2016/123529 A1 | 8/2016 |
| WO | WO-2018039646 A1 | 3/2018 |
| WO | WO-2019078337 A1 | 4/2019 |
| WO | WO-2019171691 A1 | 9/2019 |
| WO | 2019/188536 A1 | 10/2019 |

OTHER PUBLICATIONS

Han, et al. (Computer English Translation of Korean Patent No. KR 20140089810 A). (Year: 2014).*

Nguyen Canh Thuong et al: "Deep Compressive Sensing for Visual Privacy Protection in FlatCam Imaging", 2019 IEEE/Cvf International Conference on Computer Vision Workshop (ICCVW), IEEE, Oct. 27, 2019 (Oct. 27, 2019), pp. 3978-3986, XP033732328.

Wang Zihao W et al: "Privacy-Preserving Action Recognition Using Coded Aperture Videos", 2019 IEEE/CVF Conference on Computer Vision and Pattern Recognition Workshops (CVPRW), IEEE, Jun. 16, 2019 (Jun. 16, 2019), pp. 1-10 XP033747023.

International Search Report (PCT/ISA/210), International Application No. PCT/JP2021/010984, dated Jun. 22, 2021.

* cited by examiner

FIG.12
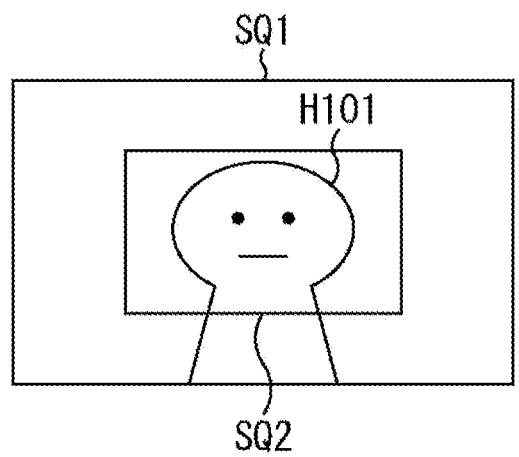
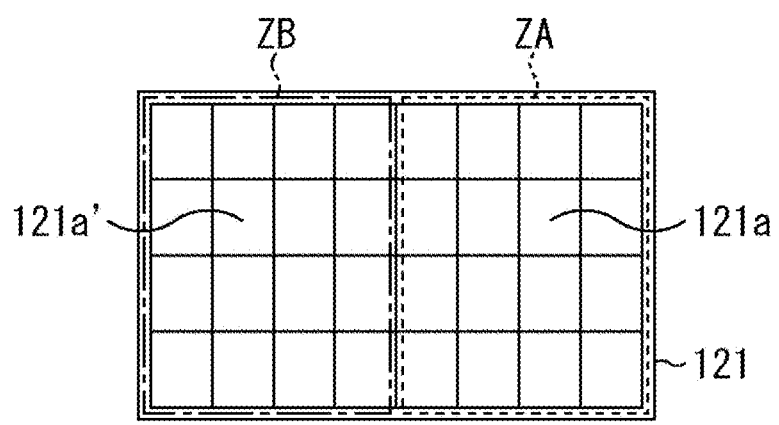

IMAGE PROCESSING APPARATUS AND METHOD, PROGRAM, AND IMAGE PROCESSING SYSTEM

TECHNICAL FIELD

The present technology relates to an image processing apparatus and method, a program, and an image processing system, and in particular, relates to an image processing apparatus and method, a program, and an image processing system that enable identification of regions to be restored.

BACKGROUND ART

Conventionally, an image capturing element is typically used in combination with an image capturing lens that condenses beams onto the image capturing element. The image capturing lens guides a beam from a subject plane to each pixel of an image capturing element such that the optical intensity distribution on the subject plane is reproduced. As a result, the image capturing element can obtain a detection signal at a level according to the optical intensity distribution at each pixel, and can obtain a captured image of the subject as a whole.

However, in this case, the physical size increases undesirably. In view of this, an image capturing element that does not use an image capturing lens has been devised (see PTL 1, for example). For example, an image capturing apparatus to which such an image capturing element is applied performs a predetermined calculation on a detection image generated at the image capturing element, and creates a restoration image.

CITATION LIST

Patent Literature

[PTL 1]
PCT Patent Publication No. WO2016/123529

SUMMARY

Technical Problem

However, with regard to whether or not to restore some regions of a detection image, for example, it has not been possible to identify regions to be restored.

The present disclosure has been made in view of such a situation, and is to enable identification of regions to be restored.

Solution to Problem

An image processing apparatus according to an aspect of the present technology is an image processing apparatus including a region identifying section that identifies a restoration region where a restoration image is to be created by using a restoration matrix, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

An image processing method according to an aspect of the present technology is an image processing method including identifying a restoration region where a restoration image is to be created by using a restoration matrix, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

A program according to an aspect of the present technology is a program that causes a computer to function as a region identifying section that identifies a restoration region where a restoration image is to be created by using a restoration matrix, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

An image processing system according to another aspect of the present technology is an image processing system including an image capturing apparatus and an image processing apparatus. The image capturing apparatus includes an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject. The image processing apparatus includes a region identifying section that identifies a restoration region where a restoration image is to be created by using a restoration matrix, the restoration region being in a region of a detection image obtained at the image capturing element.

In the image processing apparatus and method and the program according to an aspect of the present technology, a restoration region where a restoration image is to be created by use of a restoration matrix is identified, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

In the image processing system according to another aspect of the present technology, in an image capturing apparatus, an image of a subject is captured at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject, and a restoration region where a restoration image is to be created by use of a restoration matrix is identified at an image processing apparatus, the restoration region being in a region of a detection image obtained at the image capturing element.

BRIEF DESCRIPTION OF DRAWINGS

FIG. 12 is a figure for explaining the relation between the narrow-angle-of-view pixel and the wide-angle-of-view pixel.

DESCRIPTION OF EMBODIMENTS

Figure 1:
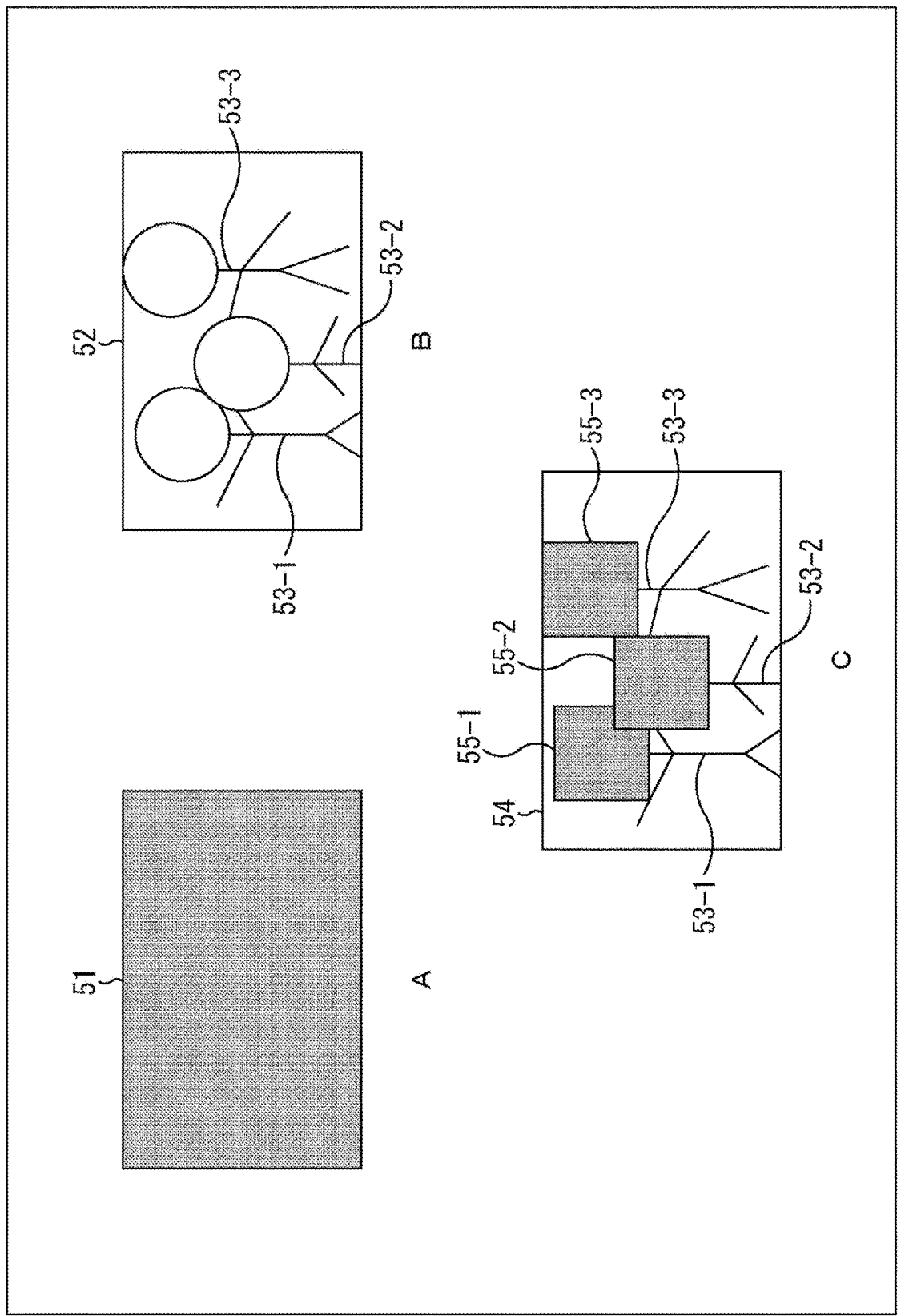
FIG. 1 depicts figures for explaining examples of control of restoration regions.

Modes for carrying out the present disclosure (hereinafter, referred to as embodiments) are explained below. Note that the explanation is given in the following order.

1. Identification of Restoration Regions/Non-Restoration Regions
2. First Embodiment (Image Capturing Apparatus)
3. Second Embodiment (Image Processing System)
4. Use Examples
5. Third Embodiment (Vehicle-Mounted Apparatus)
6. Fourth Embodiment (Other Configuration Examples of Image Capturing Element/Image Capturing Apparatus)
7. Notes 1. Identification of Restoration Regions/Non-Restoration Regions Conventionally, there has been an image capturing element that does not use an image capturing lens, as described in PTL 1, for example. For example, an image capturing apparatus to which such an image capturing element is applied performs a predetermined calculation on a detection image generated at the image capturing element, and creates a restoration image. However, with regard to whether or not to restore some regions of a detection image, for example, it has not been possible to control regions to be restored.

For example, in a crime prevention system that captures images of public spaces and the like by using a monitoring camera and the like, monitors occurrence of anomalies, use the captured images as image evidence used in a case where an anomaly occurred, and so on, there has been a fear that an infringement of the right to privacy or the like occurs due to unauthorized disclosure, unauthorized use, or the like of the captured images. In addition, for example, in a case where strangers are captured in an image captured in a town, the captured image is disclosed on an SNS (Social Networking Service) or the like, is broadcasted by a broadcast station, and so on, there has been a fear that an infringement of the right to the use of her/his likeness or the like occurs.

In addition, there has been a fear that the load of image analysis unnecessarily increases due to the existence of unnecessary portions in a captured image. Further, for the purpose of service or information management, it has been desired to control partial disclosure/non-disclosure (control disclosed areas) of a captured image according to a privilege or the like of a user to whom the captured image is disclosed.

The detection image described above is an image on which an image of a subject cannot be recognized as an image even if a user looks at it (i.e. the subject is visually unrecognizable) because the image is not formed. Whereas information leakage, unauthorized use, or the like can be reduced by use of the detection image, making the subject visually recognizable to a user who is looking at it requires creation of a restoration image from the detection image by use of a predetermined restoration matrix. Then, because regions to be restored cannot be controlled, and the whole detection image is restored as described above, there has been a fear of information leakage, unauthorized use, or the like of the restoration image similarly to the captured image described above. In addition, it has not been possible to control disclosed areas based on a user privilege or the like.

For example, whereas it is possible to protect information by encrypting a captured image, it is necessary to decode the whole captured image at the time of use, and still there has been a fear of unauthorized disclosure or unauthorized use of the decoded captured image. In addition, in such a case where encryption is used, it is necessary to perform processes such as encoding (encryption) or decoding, and there has been a fear that the load increases.

In view of this, a restoration region where a restoration image is to be created is set on a detection image. That is, a restoration region where a restoration image is to be created by use of a restoration matrix is identified, the restoration region being in a region of a detection image obtained at an image capturing element that includes multiple pixels to receive incident beams which are incident thereon via neither an image capturing lens nor a pinhole and that is configured such that output pixel values of at least two pixels in the multiple pixels have mutually different characteristics in terms of angle-of-incidence directional sensitivities about incident beams from a subject. Stated differently, a non-restoration region where a restoration image is not to be created is set on the detection image. That is, a non-restoration region where a restoration image is not created by use of a restoration matrix is identified, the non-restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

For example, a detection image 51 depicted in A in FIG. 1 is obtained by an image of a subject being captured by use of an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from the subject, and the detection image 51 includes detection signals obtained at the pixels. As depicted in A in FIG. 1, the detection image 51 is an image on which an image of the subject cannot be recognized as an image even if a user looks at it (i.e. the subject is visually unrecognizable) because the image is not formed.

A restoration image is created from the detection image 51 by use of a restoration matrix corresponding to the detection image. A restoration image 52 in B in FIG. 1 represents an example of a restoration image created from the detection image 51. As depicted in B in FIG. 1, the restoration image 52 captures, as subjects, a human 53-1, a human 53-2, and a human 53-3. Stated differently, on the restoration image 52, the human 53-1 to the human 53-3 can visually be recognized as subjects. In a case where the human 53-1 to the human 53-3 need not be explained with distinctions being made therebetween, they are referred to as humans 53.

Here, for example, if the faces of the humans 53 are disclosed due to disclosure of the restoration image 52, there is a fear of an infringement of the right to the use of her/his likeness or the like. In such a case, a non-restoration region including the face portion of each human 53 is set, and a restoration image is created. Stated differently, regions other than the non-restoration regions are set as restoration regions, and the restoration image is created. A restoration image 54 depicted in C in FIG. 1 represents an example of a restoration image created in such a manner such that the non-restoration regions are not restored.

On the restoration image 54, a non-restoration region 55-1 is a non-restoration region set such that the face portion of the human 53-1 is included therein. In addition, a non-restoration region 55-2 is a non-restoration region set such that the face portion of the human 53-2 is included therein. Further, a non-restoration region 55-3 is a non-restoration region set such that the face portion of the human 53-3 is included therein. In a case where the non-restoration region 55-1 to the non-restoration region 55-3 need not be explained with distinctions being made therebetween, they are referred to as non-restoration regions 55. As depicted in C in FIG. 1, on the restoration image 54, the non-restoration regions 55 are not restored, but kept the same as in the detection image. That is, on the restoration image 54 in this state, the face portion of each human 53 is visually unrecognizable.

In such a manner, the restoration image can be disclosed while the face portion of each human 53 is left undisclosed. That is, by setting restoration regions/non-restoration regions, it is possible to perform control as to whether or not to restore certain regions on the detection image. As a result, regarding certain regions on the detection image, for example, it is possible to control disclosure/non-disclosure, control protection/non-protection of information against unauthorized disclosure or unauthorized use, and so on. In addition, for example, it is possible to control target areas of image analysis or the like, control the levels of services to be provided, and so on. Note that a restoration region (or a non-restoration region) may be the whole region of the detection image. That is, it is possible to set the whole region of the detection image as a restoration region or as a non-restoration region.

2. First Embodiment

<Image Capturing Apparatus>

Figure 2:
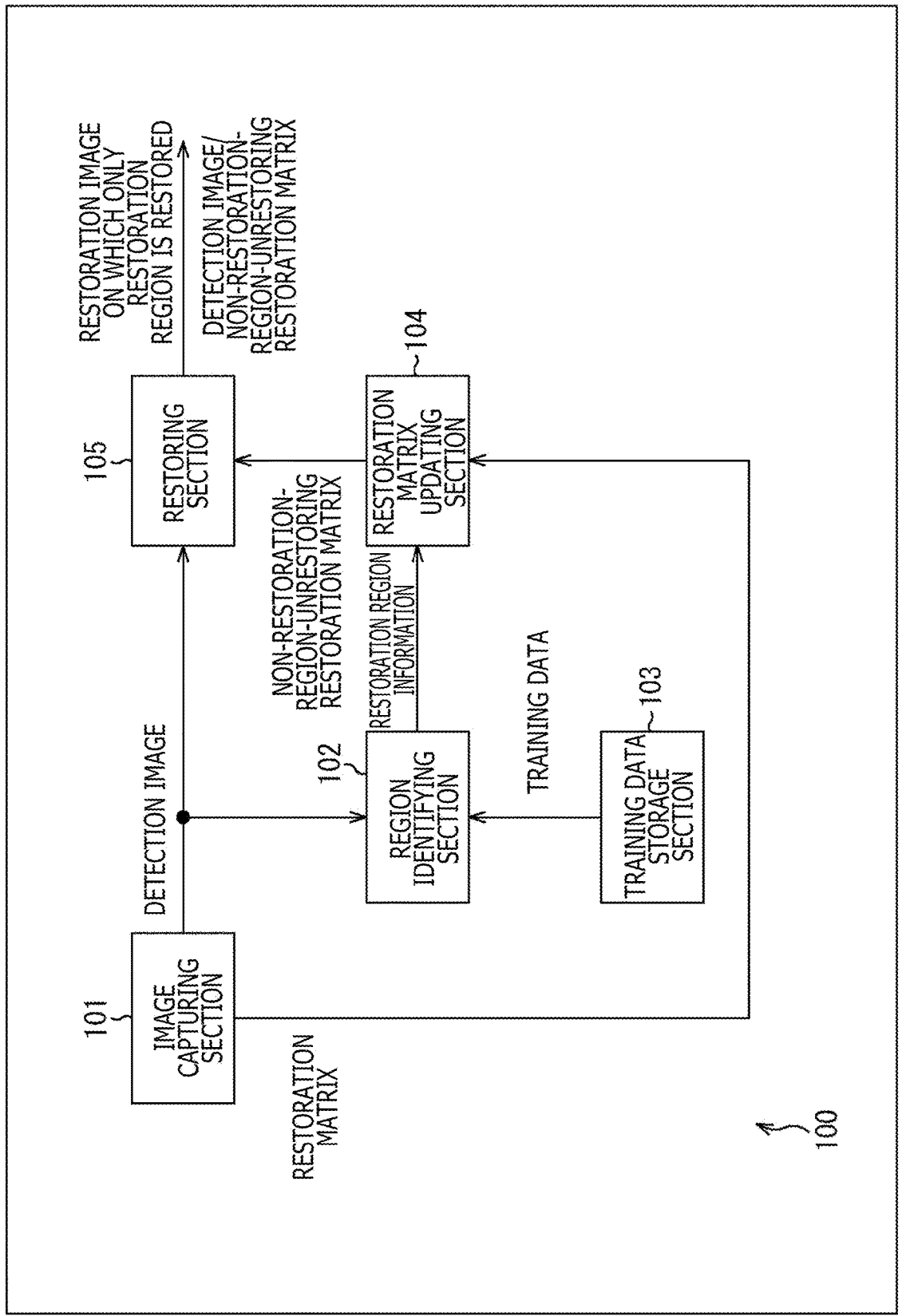
FIG. 2 is a block diagram depicting a main configuration example of an image capturing apparatus.

FIG. 2 is a diagram depicting a main configuration example of an image capturing apparatus which is one embodiment of an image processing apparatus to which the present technology is applied. An image capturing apparatus 100 depicted in FIG. 2 is an apparatus that captures an image of a subject and obtains electronic data related to the captured image. As described above in <1. Identification of Restoration Regions/Non-Restoration Regions>, the image capturing apparatus 100 can set restoration regions (non-restoration regions) on a detection image, and create a restoration image such that the non-restoration regions are not restored.

Note that FIG. 2 depicts main ones of processing sections, data flows, and the like, and not necessarily depicts all that are included. That is, in the image capturing apparatus 100, there may be a processing section not depicted as a block in FIG. 2, there may be a process or data flow not depicted as an arrow or the like in FIG. 2, and so on.

As depicted in FIG. 2, the image capturing apparatus 100 has an image capturing section 101, a region identifying section 102, a training data storage section 103, a restoration matrix updating section 104, a restoring section 105, and the like.

The image capturing section 101 has an image capturing element 121 described later, and performs a process related to generation of a detection image. For example, the image capturing section 101 can capture an image of a subject and generate a detection image by using the image capturing element 121. The image capturing element 121 is an image capturing element that includes multiple pixel output units to receive incident beams that are incident thereon via neither an image capturing lens nor a pinhole and that is configured such that output pixel values of at least two pixel output units in the multiple pixel output units have mutually different characteristics in terms of angle-of-incidence directional sensitivities about incident beams from a subject. Details of the image capturing element 121 are described later. In addition, the image capturing section 101 can supply the generated detection image to the region identifying section 102 and the restoring section 105. Further, the image capturing section 101 can supply, to the restoration matrix updating section 104, a restoration matrix corresponding to the detection image, that is, a restoration matrix used for generating a restoration image from the detection image. The restoration matrix may be stored in advance on the image capturing section 101 or may be generated at the image capturing section 101.

Note that the angle of view of the image capturing element 121 may be fixed in the absolute coordinate system of a three-dimensional space or may be variable. For example, the position and the posture of the image capturing element 121 (or the image capturing section 101) may be fixed relative to the image capturing apparatus 100 or may variable. In addition, the image capturing apparatus 100 may be fixed in the absolute coordinate system of a three-dimensional space or may be variable.

The region identifying section 102 performs a process related to identification of restoration regions (or non-restoration regions). For example, the region identifying section 102 can acquire a detection image supplied from the image capturing section 101. In addition, the region identifying section 102 can acquire training data stored on the training data storage section 103. Further, on the basis of the training data read out from the training data storage section 103, the region identifying section 102 can set a restoration region (or a non-restoration region) on the detection image supplied from the image capturing section 101, that is, the detection image obtained at the image capturing element 121. In addition, the region identifying section 102 generates restoration region information representing the restoration region (or non-restoration region information representing the non-restoration region), and supplies the restoration region information to the restoration matrix updating section 104.

The training data storage section 103 performs a process related to storage of training data. For example, the training data storage section 103 has a certain storage medium, and has stored thereon training data related to identification of restoration regions. The training data is described later. For example, according to a request from the region identifying section 102, the training data storage section 103 can supply the stored training data to the region identifying section 102.

The restoration matrix updating section 104 performs a process related to updating of a restoration matrix. For example, the restoration matrix updating section 104 can acquire restoration region information (or non-restoration region information) supplied from the region identifying section 102. In addition, the restoration matrix updating section 104 can acquire a restoration matrix supplied from the image capturing section 101. The restoration matrix is a restoration matrix corresponding to a detection image generated at the image capturing section 101 (a restoration matrix used for creation of a restoration image).

On the basis of the restoration region information, the restoration matrix updating section 104 can update the restoration matrix acquired from the image capturing section 101, and generate a restoration matrix (also referred to as a non-restoration-region-unrestoring restoration matrix) for restoring only a restoration region without restoring a non-restoration region. That is, the restoration matrix updating section 104 is a partial restoration matrix generating section that generates a partial restoration matrix used for creating only a restoration image of an identified restoration region from a detection image. The non-restoration region is a region determined on the basis of the restoration region represented by the restoration region information, and is a region in the detection image other than the restoration region. Note that, in a case where non-restoration region information is supplied from the region identifying section 102, the restoration matrix updating section 104 can update, on the basis of the non-restoration region information, the restoration matrix acquired from the image capturing section 101, and generate a non-restoration-region-unrestoring restoration matrix for restoring only the restoration region without restoring the non-restoration region represented by the non-restoration region information. The restoration region is a region determined on the basis of the non-restoration region represented by the non-restoration region information, and is a region in the detection image other than the non-restoration region.

In addition, the restoration matrix updating section 104 can supply, to the restoring section 105, the non-restoration-region-unrestoring restoration matrix which is the restoration matrix having been updated. Note that the restoration matrix updating section 104 may perform setting of a partial restoration matrix (also referred to as a non-restoration-region-unrestoring restoration matrix). For example, it is predetermined that the left half of a detection image is not to be restored entirely when a face is detected in the upper left of the detection image, a matrix for not restoring only the left half (a matrix dedicated for a case where the left half is not to be restored) is prepared as a restoration matrix in advance (e.g. stored on a storage area in the restoration matrix updating section 104), and the restoration matrix updating section 104 performs setting on the basis of restoration region information such that the non-restoration-region-unrestoring restoration matrix is applied in a case where a face is detected in the upper left of a detection image. That is, instead of generating a non-restoration-region-unrestoring restoration matrix, the restoration matrix updating section 104 may perform setting as to whether or not to apply a non-restoration-region-unrestoring restoration matrix prepared in advance. Note that, in a case where the non-restoration-region-unrestoring restoration matrix prepared in advance is to be applied, the restoration matrix updating section 104 may select any of multiple non-restoration-region-unrestoring restoration matrices prepared in advance and apply the selected non-restoration-region-unrestoring restoration matrix, on the basis of restoration region information. That is, the restoration matrix updating section 104 can also be said to be a partial restoration matrix setting section that sets a partial restoration matrix used for creating only a restoration image of an identified restoration region from a detection image.

The restoring section 105 performs a process related to creation of a restoration image. For example, the restoring section 105 can acquire a detection image supplied from the image capturing section 101. In addition, the restoring section 105 can acquire a non-restoration-region-unrestoring restoration matrix supplied from the restoration matrix updating section 104. Further, the restoring section 105 can perform creation of a restoration image by using the non-restoration-region-unrestoring restoration matrix. By this process, the restoration image on which only a restoration region is restored can be generated from the detection image. In addition, the restoring section 105 can output, to the outside of the image capturing apparatus 100, the generated restoration image (the restoration image on which only the restoration region is restored from the detection image). Note that the creation of the restoration image may be performed outside the image capturing apparatus 100. In that case, the restoring section 105 does not perform the restoration, but associates the detection image and the non-restoration-region-unrestoring restoration matrix with each other, and outputs the detection image and the non-restoration-region-unrestoring restoration matrix to a restoring apparatus that is located outside the image capturing apparatus 100 and that performs a restoration process. In such a manner, the image capturing apparatus 100 can transmit the image to the restoring apparatus (another apparatus) in a state where the information is protected. Accordingly, occurrence of an infringement of the right to privacy or the like due to unauthorized disclosure, unauthorized use, or the like of the image can be reduced.

The output of the information to the outside may be performed by communication via a certain communication path or may be performed via a certain storage medium (i.e. the information stored on the storage medium is output).

In addition, a term "associate" means, for example, associating a piece of information (data, a command, a program, etc.) with another piece of information such that, when the former piece of information is processed, the latter piece of information can be used (can be linked). That is, mutually associated pieces of information may be put together into one file or the like or may be separate pieces of information. For example, information B associated with information A may be transmitted on a transmission path which is different from a transmission path on which the information A is transmitted. In addition, for example, information B associated with information A may be recorded on a recording medium which is different from a recording medium on which the information A is recoded (or the information A and the information B may be stored on different recording areas of the same recording medium).

As described above, the region identifying section 102 can control a region to be restored, by identifying a restoration region (non-restoration region). As a result, the image capturing apparatus 100 can create a restoration image such that a certain region is not restored.

Note that these processing sections (the image capturing section 101 to the restoring section 105) of the image capturing apparatus 100 can each have any configuration. For example, each processing section may include a logical circuit that realizes processes described above. In addition, for example, each processing section may have a CPU (Central Processing Unit), a ROM (Read Only Memory), a RAM (Random Access Memory), and the like, and use them to execute a program to thereby realize processes described above. Needless to say, each processing section may have both types of configurations, realize some of processes described above by using a logical circuit, and realize the other processes by executing a program. The configurations of the processing sections may be independent of each other. For example, some processing sections may realize some of processes described above by using logical circuits, some other processing sections may realize processes described above by executing programs, and still other processing sections may realize processes described above by using both logical circuits and program execution.

<Regarding Image Capturing Element>

Next, the image capturing element 121 of the image capturing section 101 is explained with reference to FIG. 3 to FIG. 25.

<Pixels and Pixel Output Units>

In the present specification, the present technology is explained by using a term "pixel" (or "pixel output unit"). In the present specification, a "pixel" (or a "pixel output unit") refers to a divided unit including at least one physical configuration that can receive beams independently of another pixel, the divided unit being in a region (also referred to as a pixel region) of the image capturing element 121 in which physical configurations for receiving incident beams are formed. The physical configuration that can receive beams is a photoelectric converting element, for example, and is a photodiode (PD), for example. Such physical configurations (e.g. photodiodes) can be formed in any number in one pixel. One or multiple physical configurations described above can be formed. The type, size, shape, and the like of such physical configurations can be any type, size, shape, and the like.

In addition, the physical configurations of "pixel" units include not only "physical configurations that can receive beams" described above, but also all physical configurations related to reception of incident beams, such as on-chip lenses, light shielding films, color filters, flattening films, or antireflection films, for example. Further, configurations such as readout circuits are included in some cases. That is, physical configurations of the pixel units may be any configurations.

In addition, a detection signal read out from a "pixel" (i.e. the physical configuration of a pixel unit) is referred to as a "detection signal of the pixel unit (or pixel output unit)" or the like, in some cases. Further, the detection signal of the pixel unit (or pixel output unit) is also referred to as a "pixel-unit detection signal (or pixel output unit detection signal)." In addition, the pixel-unit detection signal is also referred to as "pixel output." Further, the value of the pixel-unit detection signal is also referred to as an "output pixel value."

The value (output pixel value) of a pixel-unit detection signal of the image capturing element 121 can have an angle-of-incidence directional sensitivity (characteristics related to angles of incidence) about incident beams from a subject independently of others. That is, each pixel unit (pixel output unit) of the image capturing element 121 is configured such that the angle-of-incidence directional sensitivity, of an output pixel value thereof, about incident beams from a subject can be set independently. Accordingly, output pixel values of at least two pixel units in the image capturing element 121 have mutually different angle-of-incidence directional sensitivities about incident beams from a subject.

Note that, because, as described above, there can be "physical configurations that can receive beams" of "pixels (or pixel output units)" in any number, pixel-unit detection signals may be detection signals obtained by one "physical configuration that can receive beams" or may be detection signals obtained by multiple "physical configurations that can receive beams."

In addition, multiple pixel-unit detection signals (output pixel values) can also be put together into one at a certain stage. For example, output pixel values of multiple pixels may be added together in a state where the pixel-unit detection signals are analog signals, or may be added together after being converted into digital signals.

In addition, after being read out from the image capturing element 121, that is, when being on the detection image, multiple detection signals can be put together into one or one detection signal can be split into multiple detection signals. That is, the resolution of a detection image (the number of pieces of data) is variable.

Meanwhile, for convenience of explanation, unless noted otherwise, it is supposed in the explanation below that the image capturing element 121 has a pixel region in which multiple pixels are arranged in a matrix (a pixel array is formed). Note that the array pattern of pixels (or pixel output units) of the image capturing element 121 can be any array pattern, and is not limited to this example. For example, pixels (or pixel output units) may be arranged in a honeycomb-like structure. In addition, for example, pixels (or pixel output units) may be arranged in one row (or one column). That is, the image capturing element 121 may be a line sensor.

Note that wavelength bands to which (pixels of) the image capturing element 121 are sensitive can be any wavelength bands. For example, (pixels of) the image capturing element 121 may be sensitive to visible light, may be sensitive to invisible light such as infrared light or ultraviolet light, or may be sensitive to both visible light and invisible light.

<Angle-Of-Incidence Directional Sensitivity>

The image capturing element 121 has multiple pixel output units. Then, the image capturing element 121 is configured such that output pixel values of at least two pixel output units in the multiple pixel output units have mutually different characteristics in terms of angle-of-incidence directional sensitivities about incident beams from a subject. That is, the image capturing element 121 can obtain detection signals (multiple pixel output unit detection signals) in an amount corresponding to the multiple pixel output units, and the angle-of-incidence directional sensitivities, of the at least two pixel output unit detection signals among them, about incident beams from a subject are mutually different.

Here, an "angle-of-incidence directional sensitivity" means light-reception sensitivity characteristics according to the angles of incidence of incident beams, that is, a detection sensitivity about the angles of incidence of incident beams. For example, even about incident beams with the same optical intensity, the detection sensitivity changes depending on the angles of incidence, in some cases. Such non-uniformity of the detection sensitivity (also including the nonexistence of non-uniformity) is referred to as an "angle-of-incidence directional sensitivity."

For example, if incident beams with a mutually identical optical intensity enter the physical configurations of two pixel output units at mutually identical angles of incidence, signal levels (detection signal levels) of detection signals of the pixel output units can be mutually different values. (Pixel output units of) the image capturing element 121 has (have) physical configurations with such features.

More specifically, whereas the image capturing element 121 may be similar to a typical one including an image capturing element such as a CMOS (Complementary Metal Oxide Semiconductor) image sensor, for example, in terms of the basic structure, as described above, the image capturing element 121 is configured such that at least two pixel output units have mutually different characteristics in terms of angle-of-incidence directional sensitivities, of output pixel values thereof, about incident beams from a subject. The angle-of-incidence directional sensitivities may be realized by any method. For example, an angle-of-incidence directional sensitivity may be realized by light shielding films being provided before (on the light incidence side of) photoelectric converting elements (photodiodes, etc.) and so on.

If image-capturing is performed by use of only a typical image capturing element including pixels having mutually identical angle-of-incidence directional sensitivities, beams with an approximately identical optical intensity enter all the pixels of the image capturing element, and a formed image of a subject cannot be obtained. In view of this, typically, an image capturing lens or a pinhole is provided before (on the light incidence side of) an image capturing element. For example, by an image capturing lens being provided, an image can be formed on the image capturing plane of the image capturing element by beams from a subject plane. Accordingly, the image capturing element can obtain, at each pixel, a detection signal at a level according to the formed image of the subject (i.e. can obtain a formed captured image of the subject). However, in this case, there has been a fear that the physical size increases and size reduction of the apparatus becomes difficult. In addition, in a case where a pinhole is provided, whereas size reduction is possible as compared to the case where an image capturing lens is provided, the amount of beams that enter the image capturing element decreases. As a result, it becomes essential to take a measure such as making the exposure time longer, increasing the gain, or the like, and there has been a fear that it becomes more likely that bokeh is generated in high-speed image-capturing of a subject or that natural colors cannot be expressed.

Figure 3:
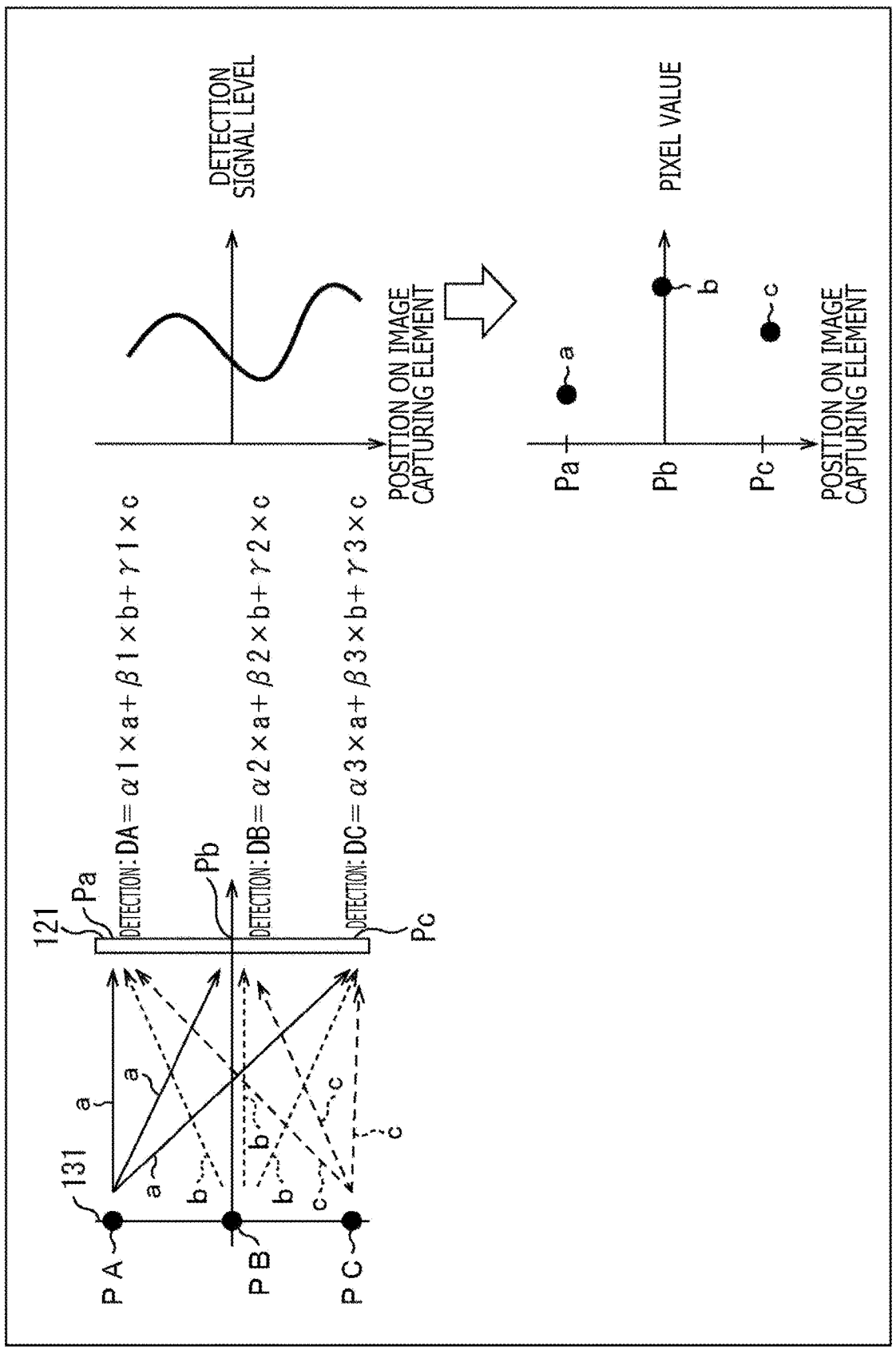
FIG. 3 is a figure for explaining the principle of image-capturing in an image capturing apparatus.

In contrast to this, as depicted in the upper left section of FIG. 3, the image capturing element 121 has pixels with mutually different angle-of-incidence directional sensitivities in terms of detection sensitivities. That is, light-reception sensitivity characteristics according to the angles of incidence of incident beams are different among pixels. It should be noted that it is not necessary for all pixels to have completely different light-reception sensitivity characteristics, but some pixels may have identical light-reception sensitivity characteristics, and some pixels may have different light-reception sensitivity characteristics.

Supposing that light sources that are included in a subject plane 131 are point light sources, beams with an identical optical intensity that are emitted from the identical point light sources enter all pixels at the image capturing element 121, but the beams enter the pixels at mutually different angles of incidence. Then, because the pixels of the image capturing element 121 have mutually different angle-of-incidence directional sensitivities, the pixels detect the beams with the identical optical intensity at mutually different sensitivities. That is, detection signals at different signal levels are detected at the pixels.

More specifically, sensitivity characteristics according to the angles of incidence of incident beams received at pixels of the image capturing element 121, that is, angle-of-incidence directional sensitivities according to the angles of incidence at the pixels, are expressed by coefficients representing light-reception sensitivities according to the angles of incidence, and the signal level (also referred to as the detection signal level) of a detection signal according to incident beams at each pixel is determined by multiplying the coefficients that are set corresponding to the light-reception sensitivity according to the angles of incidence of incident beams.

More specifically, as depicted in the upper left section of FIG. 3, detection signal levels DA, DB, and DC at positions Pa, Pb, and Pc are represented by the following Formula (1) to Formula (3), respectively.

$$DA = \alpha1 \times a + \beta1 \times b + \gamma1 \times c \quad (1)$$

$$DB = \alpha2 \times a + \beta2 \times b + \gamma2 \times c \quad (2)$$

$$DC = \alpha3 \times a + \beta3 \times b + \gamma3 \times c \quad (3)$$

Here, $\alpha1$ is a coefficient that is set according to the angle of incidence of a beam from a point light source PA on the subject plane 131 to be restored at the position Pa on the image capturing element 121. $\beta1$ is a coefficient that is set according to the angle of incidence of a beam from a point light source PB on the subject plane 131 to be restored at the position Pa on the image capturing element 121. $\gamma1$ is a coefficient that is set according to the angle of incidence of a beam from a point light source PC on the subject plane 131 to be restored at the position Pa on the image capturing element 121.

As represented by Formula (1), the detection signal level DA at the position Pa is expressed by the sum (composite value) of the product of the coefficient $\alpha1$ and an optical intensity "a" of the beam from the point light source PA at the position Pa, the product of the coefficient $\beta1$ and an optical intensity "b" of the beam from the point light source PB at the position Pa, and the product of the coefficient $\gamma1$ and an optical intensity "c" of the beam from the point light source PC at the position Pa. Hereinafter, the coefficients $\alpha x$, $\beta x$, and $\gamma x$ (x is a natural number) are collectively referred to as a coefficient set.

Similarly, the coefficient set $\alpha2$, $\beta2$, and $\gamma2$ in Formula (2) is a coefficient set that is set according to the angles of incidence of beams from the point light sources PA, PB, and PC on the subject plane 131 to be restored at the position Pb on the image capturing element 121. That is, as in Formula (2) described above, the detection signal level DB at the position Pb is expressed by the sum (composite value) of the product of the coefficient $\alpha2$ and the optical intensity "a" of the beam from the point light source PA at the position Pb, the product of the coefficient $\beta2$ and the optical intensity "b" of the beam from the point light source PB at the position Pb, and the product of the coefficient $\gamma2$ and the optical intensity "c" of the beam from the point light source PC at the position Pb. In addition, the coefficients $\alpha3$, $\beta3$, and $\gamma3$ of Formula (3) are a coefficient set that is set according to the angles of incidence of beams from the point light sources PA, PB, and PC on the subject plane 131 to be restored at the position Pc on the image capturing element 121. That is, as in Formula (3) described above, the detection signal level DC at the position Pc is expressed by the sum (composite value) of the product of the coefficient $\alpha3$ and the optical intensity "a" of the beam from the point light source PA at the position Pc, the product of the coefficient $\beta3$ and the optical intensity "b" of the beam from the point light source PB at the position Pc, and the product of the coefficient $\gamma3$ and the optical intensity "c" of the beam from the point light source PC at the position Pc.

As described above, these detection signal levels are ones including the mixed optical intensities of the beams emitted from the point light sources PA, PB, and PC, and an image of the subject thus becomes one that is different from a formed image. That is, the detection signal levels depicted in the upper right section of FIG. 3 are not detection signal levels corresponding to an image (captured image) on which the image of the subject is formed, and thus are different from pixel values depicted in the lower right section of FIG. 3 (typically, each corresponding pair of the detection signal levels and the pixel values do not match).

It should be noted that, when a simultaneous equation using the coefficient set $\alpha1$, $\beta1$, and $\gamma1$, coefficient set $\alpha2$, $\beta2$, and $\gamma2$, and coefficient set $\alpha3$, $\beta3$, and $\gamma3$, and the detection signal levels DA, DB, and DC is formed and the simultaneous equation including Formula (1) to Formula (3) described above is solved by using a, b, and c as variables, pixel values of the positions Pa, Pb, and Pc like the ones depicted in the lower right section of FIG. 3 can be determined. As a result, a restoration image which is a set of the pixel values (an image on which the image of the subject is formed) is created.

Due to such a configuration, the image capturing element 121 has mutually different angle-of-incidence directional sensitivities at at least two pixel output units without requiring an image capturing lens, an optical filter including a diffraction grating or the like, a pinhole, and the like. As a result, because an image capturing lens, an optical filter including a diffraction grating or the like, a pinhole, and the like are not essential configurations, it becomes possible to reduce the height of the image capturing apparatus, that is, to reduce the thickness, in the direction of incidence of beams, of a configuration that realizes an image capturing functionality.

<Formation of Angle-Of-Incidence Directional Sensitivity>

Figure 4:
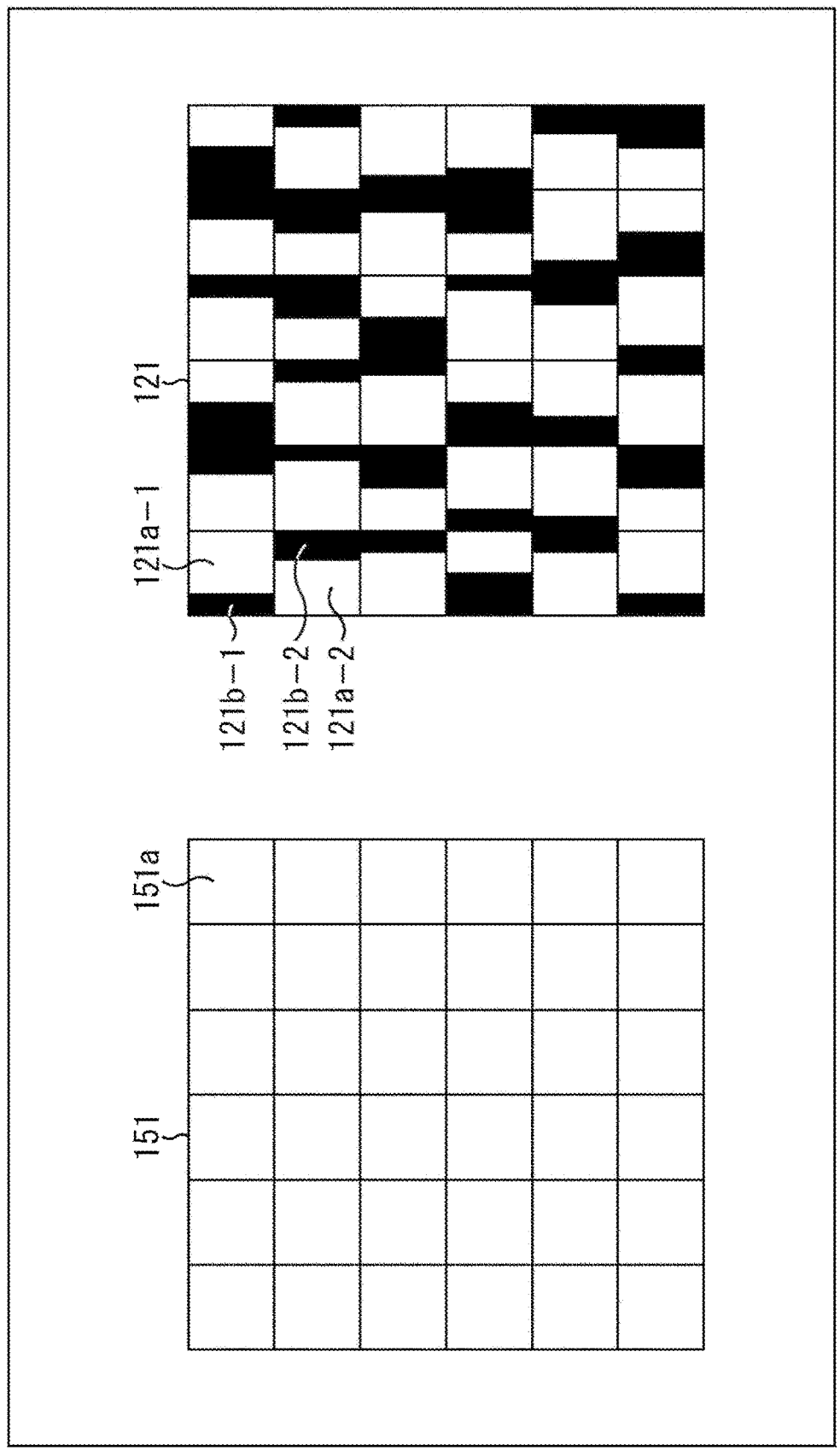
FIG. 4 is a figure for explaining differences in configuration between a conventional image capturing element and an image capturing element according to the present disclosure.

The left section of FIG. 4 depicts a front view of part of a pixel array section of a typical image capturing element, and the right section of FIG. 4 depicts a front view of part of a pixel array section of the image capturing element 121. Note that, whereas FIG. 4 depicts an example in a case where the pixel array section has a configuration including six pixels in the horizontal direction and six pixels in the vertical direction, the configuration regarding the pixel counts is not limited to this.

Angle-of-incidence directional sensitivities can be formed by use of light shielding films, for example. As depicted in the example in the left section of FIG. 4, a typical image capturing element 151 includes pixels 151a with identical angle-of-incidence directional sensitivities that are arranged in an array. In contrast to this, the image capturing element 121 in the example in the right section of FIG. 4 has a configuration in which each pixel 121a is provided with a light shielding film 121b at an area thereof that is part of the light reception region of the photodiode and that is different from counterparts of other pixels 121a and in which each pixel 121a has a different light-reception sensitivity to an angle of incidence of an incident beam (i.e. the pixels 121a have mutually different angle-of-incidence directional sensitivities).

More specifically, for example, a pixel 121a-1 and a pixel 121a-2 are provided with a light shielding film 121b-1 and a light shielding film 121b-2 which make shielded areas different (make at least either shielded regions (positions) or shielded area sizes different) between the pixels. That is, the pixel 121a-1 is provided with the light shielding film 121b-1 such that only a predetermined width of part which is on the left side of the light reception region of the photodiode is shielded. Meanwhile, the pixel 121a-2 is provided with the light shielding film 121b-2 such that only a horizontal width, of part which is on the right side of the light reception region, greater than that of the light shielding film 121b-1 is shielded. Other pixels 121a also are similarly provided with light shielding films 121b such that mutually different areas of the light reception regions of the pixels are shielded, and such pixels are arranged randomly in the pixel array.

Note that, because the amount of beams that can be received by each pixel decreases as the coverage of the light reception region of the pixel increases, it is desirable that the area of a light shielding film 121b be such an area that a desired light amount can be ensured, and, for example, the area size of the light shielding film 121b may be determined with a limitation that the maximum area size of the light shielding film 121b is approximately ¾ of the entire light-receivable area. In such a manner, it becomes possible to ensure a light amount equal to or greater than a desired amount. It should be noted that, as long as each pixel is provided with an unshielded area with a width equivalent to the wavelength of beams to be received, a bare minimum amount of beams can be received. That is, for example, in a case of a B pixel (blue pixel), the wavelength is approximately 500 nm, and a bare minimum amount of beams can be received as long as the shielded area is not equal to or greater than a width equivalent to the wavelength.

<Configuration Example of Image Capturing Element>

Figure 5:
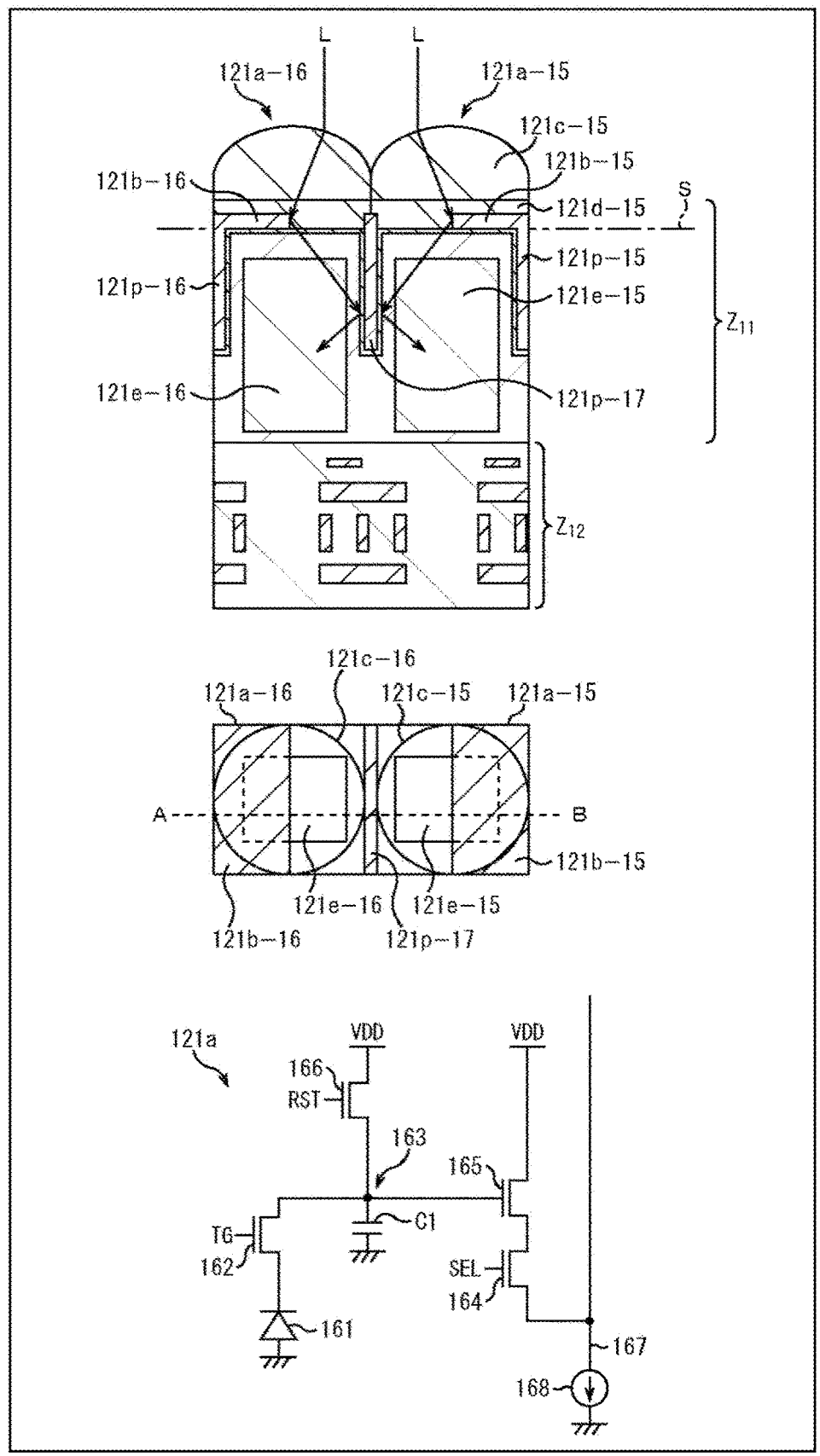
FIG. 5 is a figure for explaining a first configuration example of the image capturing element.

With reference to FIG. 5, a configuration example of the image capturing element 121 in this case is explained. The upper section of FIG. 5 is a side cross-sectional view of the image capturing element 121, and the middle section of FIG. 5 is a top view of the image capturing element 121. In addition, the side cross-sectional view in the upper section of FIG. 5 is a cross-section taken along A-B in the middle section of FIG. 5. Further, the lower section of FIG. 5 is a circuit configuration example of the image capturing element 121.

The image capturing element 121 having a configuration depicted in FIG. 5 includes multiple pixel output units to receive incident beams that are incident thereon via neither an image capturing lens nor a pinhole, and is configured such that output pixel values of at least two pixel output units in the multiple pixel output units have mutually different characteristics in terms of angle-of-incidence directional sensitivities about incident beams from a subject. In addition, the image capturing element 121 in this case is configured such that the angle-of-incidence directional sensitivity, of each pixel output unit in multiple pixel output units of the image capturing element 121, about incident beams from a subject can be set independently.

Incident beams enter the image capturing element 121 in the upper section of FIG. 5 downward from above in the figure. Adjacent pixels 121a-15 and 121a-16 are what are generally called backside illumination pixels provided with a wiring layer Z12 at their lowermost-layers in the figure and provided with a photoelectric conversion layer Z11 on the wiring layer Z12.

Note that, in a case where it is not necessary to make a distinction between the pixels 121a-15 and 121a-16, they are simply referred to as pixels 121a, and other configurations are also similarly referred to. In addition, whereas FIG. 5 depicts a side view and a top view corresponding to the two pixels that are included in the pixel array of the image capturing element 121, needless to say, a greater number of pixels 121a are arranged, but are not depicted and are omitted in the figure.

Further, the pixels 121a-15 and 121a-16 include photodiodes 121e-15 and 121e-16, respectively, in the photoelectric conversion layer Z11. In addition, on-chip lenses 121c-15 and 121c-16 and color filters 121d-15 and 121d-16 are included on the photodiodes 121e-15 and 121e-16, respectively, in this order from above.

The on-chip lenses 121c-15 and 121c-16 condense incident beams onto the photodiodes 121e-15 and 121e-16.

For example, the color filters 121d-15 and 121d-16 are optical filters that transmit beams with particular wavelengths such as red, green, blue, infrared, or white beams. Note that, in a case of white, the color filters 121d-15 and 121d-16 may be transparent filters, or there may be no filters.

At the boundaries, in the photoelectric conversion layer Z11, of the pixels 121a-15 and 121a-16, light shielding films 121p-15 to 121p-17 are formed to reduce crosstalk between the adjacent pixels.

In addition, as depicted in the upper section and the middle section of FIG. 5, part of light shielding films 121b-15 and 121b-16 shields a light reception plane S when seen from above. On the light reception plane S of the photodiodes 121e-15 and 121e-16 of the pixels 121a-15 and 121a-16, the light shielding films 121b-15 and 121b-16 shield mutually different areas, and angle-of-incidence directional sensitivities which are different between the pixels are thereby set. It should be noted that it is not always the case that all the pixels 121a of the image capturing element 121 each have a different shielded area, and there may be some pixels 121a whose shielded areas are identical.

Due to a configuration like the one depicted in the upper section of FIG. 5, a right end section of the light shielding film 121p-15 and an upper end section of the light shielding film 121b-15 are connected to each other. Also, a left end section of the light shielding film 121b-16 and an upper end section of the light shielding film 121p-16 are connected to each other, forming L-shaped sections as seen from the side.

Further, the light shielding films 121b-15 to 121b-17 and the light shielding films 121p-15 to 121p-17 include metal, and, for example, include tungsten (W), aluminum (Al), or an alloy of Al and copper (Cu). In addition, the light shielding films 121b-15 to 121b-17 and the light shielding films 121p-15 to 121p-17 may be formed simultaneously by use of metal identical to that used for wires to be formed in a semiconductor process by a process identical to the process by which the wires are formed. Note that the film thicknesses of the light shielding films 121*b*-15 to 121*b*-17 and the light shielding films 121*p*-15 to 121*p*-17 may not be identical thicknesses depending on positions.

In addition, as depicted in the lower section of the FIG. 5, each pixel 121*a* includes a photodiode 161 (corresponding to the photodiode 121*e*), a transfer transistor 162, a FD (Floating Diffusion) section 163, a selection transistor 164, an amplification transistor 165, and a reset transistor 166, and is connected to a current source 168 via a vertical signal line 167.

The photodiode 161 includes an anode electrode which is grounded and a cathode electrode which is connected to a gate electrode of the amplification transistor 165 via the transfer transistor 162.

The transfer transistor 162 is driven according to a transfer signal TG. For example, when the transfer signal TG supplied to a gate electrode of the transfer transistor 162 becomes a high-level signal, the transfer transistor 162 is turned on. As a result, a charge accumulated in the photodiode 161 is transferred to the FD section 163 via the transfer transistor 162.

The amplification transistor 165 serves as an input section of a source follower which is a readout circuit to read out a signal obtained by photoelectric conversion at the photodiode 161, and outputs, to a vertical signal line 23, a pixel signal at a level according to a charge accumulated in the FD section 163. That is, the amplification transistor 165 has a drain terminal which is connected to a power supply voltage VDD and a source terminal which is connected to the vertical signal line 167 via the selection transistor 164, thereby forming the source follower together with the current source 168 connected to one end of the vertical signal line 167.

The FD (Floating Diffusion) section 163 is a floating diffusion region having charge capacity C1 provided between the transfer transistor 162 and the amplification transistor 165, and temporarily accumulates a charge transferred from the photodiode 161 via the transfer transistor 162. The FD section 163 is a charge detecting section that converts a charge into a voltage, and a charge accumulated in the FD section 163 is converted into a voltage at the amplification transistor 165.

The selection transistor 164 is driven according to a selection signal SEL. When the selection signal SEL supplied to a gate electrode of the selection transistor 164 becomes a high-level signal, the selection transistor 164 is turned on and connects the amplification transistor 165 and the vertical signal line 167 to each other.

The reset transistor 166 is driven according to a reset signal RST. For example, when the reset signal RST supplied to a gate electrode of the reset transistor 166 becomes a high-level signal, the reset transistor 166 is turned on, discharges a charge accumulated in the FD section 163 to the power supply voltage VDD, and resets the FD section 163.

Due to the circuit configuration like the one above, the pixel circuit depicted in the lower section of FIG. 5 operates in the following manner.

That is, as first operation, the reset transistor 166 and the transfer transistor 162 are turned on, a charge accumulated in the FD section 163 is discharged to the power supply voltage VDD, and the FD section 163 is reset.

As second operation, the reset transistor 166 and the transfer transistor 162 are turned off, an exposure period begins, and the photodiode 161 accumulates a charge according to the light amount of an incident beam.

As third operation, the reset transistor 166 is turned on, the FD section 163 is reset, and then the reset transistor 166 is turned off. Due to this operation, the FD section 163 is reset, and the potential of the FD section 163 is set as a reference potential.

As fourth operation, the potential of the FD section 163 at the reset state is output by the amplification transistor 165 as the reference potential.

As fifth operation, the transfer transistor 162 is turned on, and the charge accumulated in the photodiode 161 is transferred to the FD section 163.

As sixth operation, the potential of the FD section 163 to which the charge of the photodiode has been transferred is output by the amplification transistor 165 as a signal potential.

By the process described above, the reference potential is subtracted from the signal potential, and the resultant potential is output as a detection signal by CDS (correlated double sampling).

In such a manner, each pixel 121*a* in the case depicted in FIG. 5 is provided with one photodiode 121*e*, each pixel 121*a* has a different area shielded by a light shielding film 121*b*, and, due to optical modulation using the light shielding film 121*b*, one pixel 121*a* can express a detection signal corresponding to one pixel of a detection image having an angle-of-incidence directional sensitivity.

<Another Configuration Example of Image Capturing Element>

In addition, for example, an angle-of-incidence directional sensitivity can be formed on the basis of the position, size, shape, and the like of a light receiving element (e.g. a photodiode) in a pixel. Pixels having these parameters which are different from each other have different sensitivities to incident beams with an identical optical intensity from identical directions. That is, by these parameters for each pixel being set, an angle-of-incidence directional sensitivity can be set for each pixel.

For example, multiple light receiving elements (e.g. photodiodes) may be provided in a pixel and used selectively. In such a manner, it becomes possible to set an angle-of-incidence directional sensitivity for each pixel according to selection of the light receiving elements.

Figure 6:
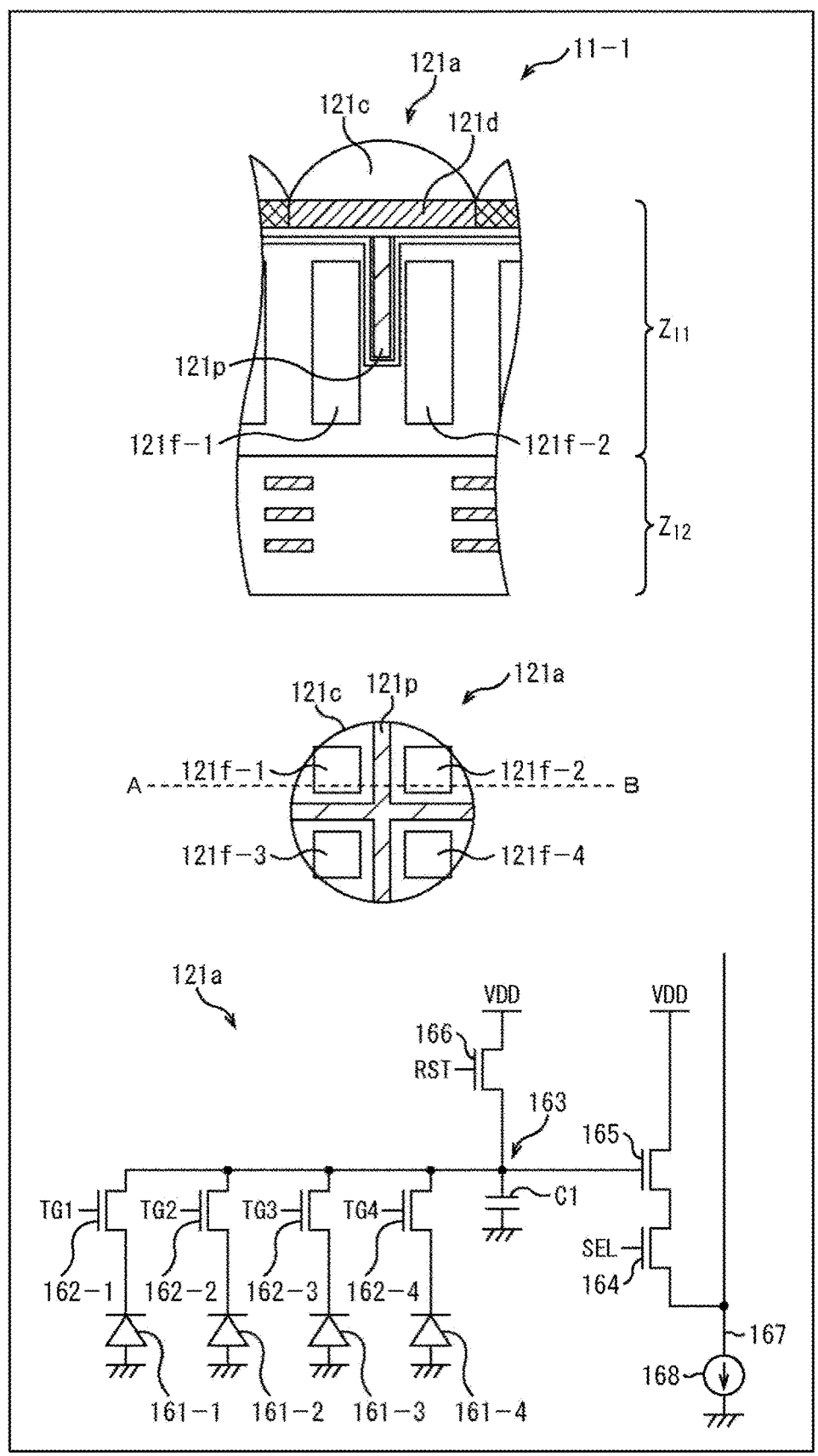
FIG. 6 is a figure for explaining the first configuration example of the image capturing element.

FIG. 6 is a diagram depicting another configuration example of the image capturing element 121. The upper section of FIG. 6 depicts a side cross-sectional view of a pixel 121*a* of the image capturing element 121, and the middle section of FIG. 6 depicts a top view of the image capturing element 121. In addition, the side cross-sectional view in the upper section of FIG. 6 is a cross-section taken along A-B in the middle section of FIG. 6. Further, the lower section of FIG. 6 is a circuit configuration example of the image capturing element 121.

The image capturing element 121 having a configuration depicted in FIG. 6 includes multiple pixel output units to receive incident beams that are incident thereon via neither an image capturing lens nor a pinhole, and is configured such that output pixel values of at least two pixel output units in the multiple pixel output units have mutually different characteristics in terms of angle-of-incidence directional sensitivities about incident beams from a subject. In addition, in the image capturing element 121 in this case, the angle-of-incidence directional sensitivity of an output pixel value of each pixel output unit in the multiple pixel output units can be set independently by making PDs (Photo Diodes) that contribute to output mutually different among the multiple pixel output units.

As depicted in FIG. 6, the image capturing element 121 has a configuration different from that of the image capturing element 121 in FIG. 6 in that four photodiodes 121*f*-1 to 121*f*-4 are formed in the pixel 121*a* and that a light shielding film 121*p* is formed in a region separating the photodiodes 121*f*-1 to 121*f*-4. That is, in the image capturing element 121 in FIG. 6, the light shielding film 121*p* is formed in a shape of "+" when seen from above. Note that common configurations thereof are given identical reference signs, and detailed explanations are omitted.

In the image capturing element 121 configured as in FIG. 6, by the light shielding film 121*p* serving as a separator between the photodiodes 121*f*-1 to 121*f*-4, electrical and optical crosstalk between the photodiodes 121*f*-1 to 121*f*-4 can be prevented. That is, the light shielding film 121*p* in FIG. 6 is for preventing crosstalk similarly to the light shielding film 121*p* of the image capturing element 121 in FIG. 5, and is not for giving an angle-of-incidence directional sensitivity.

As described in detail later, the photodiodes 121*f*-1 to 121*f*-4 have mutually different light-reception sensitivity characteristics in terms of angles of incidence at which their light-reception sensitivities become high. That is, depending on from which of the photodiodes 121*f*-1 to 121*f*-4 a charge is read out, an output pixel value of the pixel 121*a* can be given a desired angle-of-incidence directional sensitivity. That is, the angle-of-incidence directional sensitivity of the output pixel value of the pixel 121*a* can be controlled.

In the configuration example of the image capturing element 121 in FIG. 6, the four photodiodes 121*f*-1 to 121*f*-4 share the one FD section 163. The lower section of FIG. 6 depicts a circuit configuration example in which the four photodiodes 121*f*-1 to 121*f*-4 share the one FD section 163. Note that, in the lower section of FIG. 6, explanations about configurations identical to their counterparts in the lower section of FIG. 5 are omitted.

The circuit configuration in the lower section of FIG. 6 is different from the circuit configuration in the lower section of FIG. 5 in that, instead of the photodiode 161 and the transfer transistor 162, photodiodes 161-1 to 161-4 (corresponding to the photodiodes 121*f*-1 to 121*f*-4 in the upper section of FIG. 6) and transfer transistors 162-1 to 162-4 are provided and that the FD section 163 is shared.

In a case where it is not necessary to explain the photodiodes 161-1 to 161-4 with distinctions being made therebetween in the circuit depicted in the lower section of FIG. 6, they are referred to as photodiodes 161. In addition, in a case where it is not necessary to explain the transfer transistors 162-1 to 162-4 with distinctions being made therebetween, they are referred to as transfer transistors 162.

In the circuit depicted in the lower section of FIG. 6, if any of the transfer transistors 162 is turned on, a charge of the photodiode 161 corresponding to the transfer transistor 162 is read out and transferred to the common FD section 163. Then, a signal according to the level of the charge kept at the FD section 163 is read out as a detection signal of the pixel output unit. That is, it is possible to read out a charge of each photodiode 161 independently of each other, and it is possible to control from which photodiode 161 a charge is read out depending on which of the transfer transistors 162 is turned on. Stated differently, depending on which of the transfer transistors 162 is turned on, it is possible to control the extent of contribution to an output pixel value by each photodiode 161. For example, by reading out charges from mutually different photodiodes 161 between at least two pixels, it is possible to cause the mutually different photodiode 161 to contribute to output pixel values. That is, according to selection of a photodiodes 161 from which a charge is read out, an output pixel value of the pixel 121*a* can be given a desired angle-of-incidence directional sensitivity.

For example, in FIG. 6, when charges of the photodiode 121*f*-1 and photodiode 121*f*-3 are transferred to the FD section 163 and signals obtained by the charges being read out are added together, an output pixel value of the pixel 121*a* can be given an angle-of-incidence directional sensitivity in the leftward and rightward direction in the figure. Similarly, when charges of the photodiode 121*f*-1 and photodiode 121*f*-2 are transferred to the FD section 163 and signals obtained by the charges being read out are added together, an output pixel value of the pixel 121*a* can be given an angle-of-incidence directional sensitivity in the upward and downward direction in the figure.

Note that signals obtained on the basis of charges of the photodiodes 121*f* of the pixel 121*a* in FIG. 6 may be added together after they are read out from the pixel, or may be added together in the pixel (e.g. at the FD section 163).

In addition, the combination of photodiodes 121*f* whose charges (or signals corresponding to the charges) are added together can be any combination, and is not limited to the examples described above. For example, charges (or signals corresponding to the charges) of three or more photodiodes 121*f* may be added together. In addition, for example, without performing addition, a charge of one photodiode 121*f* may be read out.

Note that (the detection sensitivity of) the pixel 121*a* may be given a desired angle-of-incidence directional sensitivity by use of an electronic shutter functionality to reset detection values (charges) accumulated in the photodiodes 161 (photodiodes 121*f*) before the charges are read out to the FD section 163.

In a case where an electronic shutter functionality is used, if the resetting is performed immediately before reading out the charges of the photodiodes 121*f* to the FD section 163, it is possible in this state to cause the photodiodes 121*f* not to contribute to the detection signal level of the pixel 121*a*, and, if a period of time is provided between the resetting and the readout to the FD section 163, it is also possible to cause the photodiodes 121*f* to partially contribute to the detection signal level of the pixel 121*a*.

As described above, each pixel 121*a* in FIG. 6 is provided with four photodiodes 121*f*, and no light shielding film 121*b* is formed on the light reception plane. However, the light reception plane is divided into multiple regions by the light shielding film 121*p*, the four photodiodes 121*f*-1 to 121*f*-4 are formed, and a detection signal corresponding to one pixel of a detection image having an angle-of-incidence directional sensitivity is expressed. Stated differently, for example, areas which do not contribute to output in the photodiodes 121*f*-1 to 121*f*-4 serve a function similar to shielded regions, and a detection signal corresponding to one pixel of a detection image having an angle-of-incidence directional sensitivity is expressed. Note that, in a case where a detection signal corresponding to one pixel is expressed by use of the photodiodes 121*f*-1 to 121*f*-4, the detection signal is not a signal obtained by optical modulation, because a light shielding film 121*b* is not used.

Whereas four photodiodes are arranged in a pixel in an example explained thus far, photodiodes can be arranged in any number in a pixel, and the number is not limited to the example described above. That is, partial regions where the photodiodes are arranged can be provided in any number in the pixel.

In addition, whereas it is explained above that the photodiodes are arranged in four partial regions formed by the pixel equally being divided into four, the partial regions may not be ones formed by equal division. That is, the sizes and shapes of all the partial regions may not be set uniformly (partial regions whose sizes and shapes are different from those of other partial regions may be included). Alternatively, the position (position in a partial region), size, shape, and the like of each photodiode arranged in the partial region may be different from other photodiodes (other partial regions). At that time, the sizes and shapes of all the partial regions may be set uniformly or may not be set uniformly.

Further, these parameters of all the pixels of the image capturing element 121 may not be set uniformly. That is, one or more pixels of the image capturing element 121 may have one or more parameters, in those parameters, that are different from the one or more parameters of other pixels.

For example, a pixel whose division positions for forming partial regions where photodiodes are arranged in the pixel are different from those of other pixels may be included in the pixel group of the image capturing element 121. That is, the image capturing element 121 may have one or more pixels whose sizes and shapes of partial regions are different from those of other pixels. For example, by division positions being made different among pixels, angle-of-incidence directional sensitivities to detection signals detected at the multiple pixels can be made mutually different even if only upper left photodiodes in the multiple pixels are used.

In addition, for example, a pixel whose positions, sizes, shapes, and the like of multiple photodiodes arranged in the pixel are different from the positions, sizes, shapes, and the like of other pixels may be included in the pixel group of the image capturing element 121. That is, the image capturing element 121 may have one or more pixels whose at least either positions, sizes, or shapes of multiple photodiodes arranged in the pixels are different from those of other pixels. For example, by positions, sizes, shape, and the like of photodiodes being made different among pixels, angle-of-incidence directional sensitivities to detection signals detected at the multiple pixels can be made mutually different even if only upper left photodiodes in the multiple pixels are used.

Further, for example, the image capturing element 121 may have one or more pixels whose parameters (the sizes and shapes) of partial regions and parameters (the positions, sizes, and shapes) of photodiodes are both different from the parameters of other pixels.

In addition, for example, a pixel whose number of division for forming partial regions where photodiodes are arranged in the pixel are different from those of other pixels may be included in the pixel group of the image capturing element 121. That is, the image capturing element 121 may have one or more pixels whose numbers of photodiodes arranged in the pixels are different from the numbers of photodiodes of other pixels. For example, by the numbers of division (the numbers of photodiodes) being made different among pixels, angle-of-incidence directional sensitivities can be set more freely.

<Regarding Principles of Generation of Angle-of-Incidence Directional Sensitivity>

Figure 7:
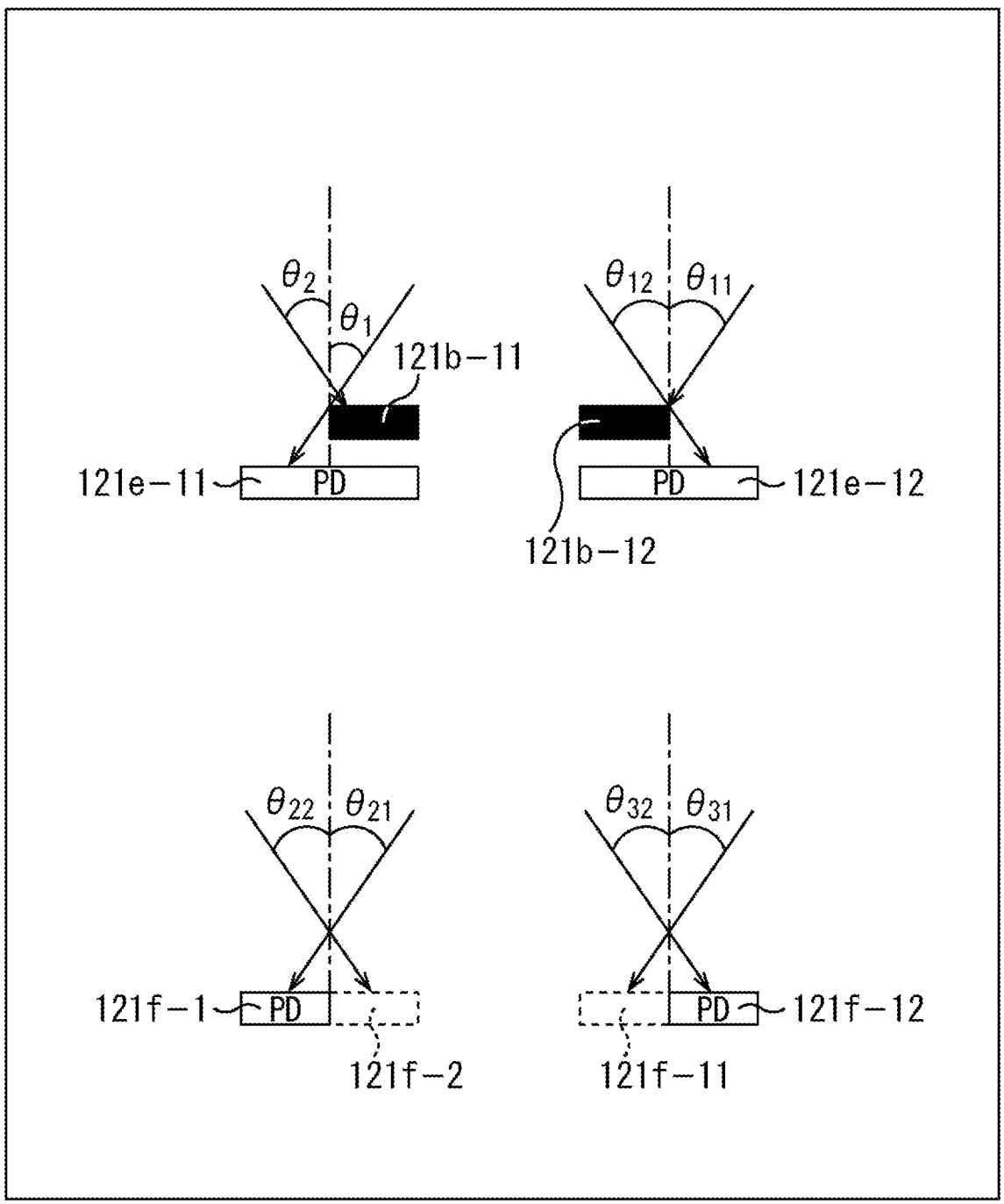
FIG. 7 is a figure for explaining the principle of occurrence of an angle-of-incidence directional sensitivity.

The angle-of-incidence directional sensitivity of each pixel in the image capturing element 121 is generated by principles like the ones depicted in FIG. 7, for example. Note that the upper left section and the upper right section of FIG. 7 are figures for explaining principles of generation of angle-of-incidence directional sensitivities in the image capturing element 121 in FIG. 5, and the lower left section and the lower right section of FIG. 7 are figures for explaining principles of generation of angle-of-incidence directional sensitivities in the image capturing element 121 in FIG. 6.

In addition, one pixel in each of the upper left section and the upper right section of FIG. 7 includes one photodiode 121e. In contrast to this, one pixel in each of the lower left section and the lower right section of FIG. 7 includes two photodiodes 121f. Note that, whereas one pixel includes two photodiodes 121f in the example explained here, this is for convenience of explanation, and the number of photodiodes 121f included in one pixel may be different.

In the upper left section of FIG. 7, a light shielding film 121b-11 is formed such that, when an incident beam enters a pixel downward from above in the figure, the right half of the light reception plane of a photodiode 121e-11 is shielded. In addition, in the upper right section of FIG. 7, a light shielding film 121b-12 is formed such that the left half of the light reception plane of a photodiode 121e-12 is shielded. Note that dash-dotted lines in the figure represent the center positions of the light reception planes of the photodiodes 121e in the horizontal direction in the figure, and are vertical to the light reception planes.

For example, in a case of a configuration like the one in the upper left section of FIG. 7, an incident beam from the upper right in the figure represented by an arrow forming an angle of incidence θ1 relative to a dash-dotted line in the figure is likely to be received in the area on the left half which is not shielded by the light shielding film 121b-11 of the photodiode 121e-11, but an incident beam from the upper left in the figure represented by an arrow forming an angle of incidence θ2 relative to a dash-dotted line in the figure is unlikely to be received in the area on the left half which is not shielded by the light shielding film 121b-11 of the photodiode 121e-11. Accordingly, a configuration like the one in the upper left section of FIG. 7 has an angle-of-incidence directional sensitivity in which light-reception sensitivity characteristics in terms of sensitivity to an incident beam from the upper right in the figure are high and light-reception sensitivity characteristics in terms of sensitivity to an incident beam from the upper left in the figure are low.

In contrast to this, for example, in a case of a configuration like the one in the upper right section of FIG. 7, an incident beam from the upper right in the figure represented by an arrow forming an angle of incidence 911 relative to a dash-dotted line in the figure is unlikely to be received in the area on the left half which is shielded by the light shielding film 121b-12 of the photodiode 121e-12, but an incident beam from the upper left in the figure represented by an arrow forming an angle of incidence θ12 relative to a dash-dotted line in the figure is likely to be received in the area on the right half which is not shielded by the light shielding film 121b-12 of the photodiode 121e-12. Accordingly, a configuration like the one in the upper right section of FIG. 7 has an angle-of-incidence directional sensitivity in which light-reception sensitivity characteristics in terms of sensitivity to an incident beam from the upper right in the figure are low and light-reception sensitivity characteristics in terms of sensitivity to an incident beam from the upper left in the figure are high.

In addition, in the case of the lower left section of FIG. 7, photodiodes 121f-1 and 121f-2 are provided on the left and right sides in the figure, and an angle-of-incidence directional sensitivity is attained in this configuration by a detection signal being read out from either one of the photodiodes 121f-1 and 121f-2 without light shielding films 121b provided.

That is, in a case where two photodiodes 121*f*-1 and 121*f*-2 are formed in a pixel 121*a* as depicted in the lower left section of FIG. 7, when a detection signal of the photodiode 121*f*-1 provided on the left side in the figure is caused to contribute to a detection signal level of the pixel 121*a*, an angle-of-incidence directional sensitivity similar to that of the configuration depicted in the upper left section of FIG. 7 can be attained. That is, an incident beam from the upper right in the figure represented by an arrow forming an angle of incidence θ21 relative to a dash-dotted line in the figure enters and is received by the photodiode 121*f*-1, and a detection signal of the photodiode 121*f*-1 is read out and contributes to a detection signal level of the pixel 121*a*. In contrast to this, an incident beam from the upper left in the figure represented by an arrow forming an angle of incidence θ22 relative to a dash-dotted line in the figure enters the photodiode 121*f*-2, but a detection signal of the photodiode 121*f*-2 is not read out and does not contribute to a detection signal level of the pixel 121*a*.

Similarly, in a case where two photodiodes 121*f*-11 and 121*f*-12 are formed in a pixel 121*a* as depicted in the lower right section of FIG. 7, when a detection signal of the photodiode 121*f*-12 provided on the left side in the figure is caused to contribute to a detection signal level of the pixel 121*a*, an angle-of-incidence directional sensitivity similar to that of the configuration depicted in the upper right section of FIG. 7 can be attained. That is, an incident beam from the upper right in the figure represented by an arrow forming an angle of incidence θ31 relative to a dash-dotted line in the figure enters the photodiode 121*f*-11, but a detection signal of the photodiode 121*f*-11 is not read out and does not contribute to a detection signal level of the pixel 121*a*. In contrast to this, an incident beam from the upper left in the figure represented by an arrow forming an angle of incidence θ32 relative to a dash-dotted line in the figure enters and is received by the photodiode 121*f*-12, and a detection signal of the photodiode 121*f*-12 is read out and contributes to a detection signal level of the pixel 121*a*.

Note that, whereas the dash-dotted lines in the vertical direction represent the center positions of the light reception planes of the photodiodes 121*e* in the horizontal direction in the figure in the example explained with reference to FIG. 7, this is for convenience of explanation, and the dash-dotted lines may represent other positions. When the positions of the light shielding films 121*b* in the horizontal direction represented by the dash-dotted lines in the vertical direction are made different from each other, it is possible to generate different angle-of-incidence directional sensitivities.

<Regarding Angle-of-Incidence Directional Sensitivities in Configuration Including On-Chip Lenses>

Whereas principles of generation of angle-of-incidence directional sensitivities have been explained thus far, angle-of-incidence directional sensitivities in a configuration including on-chip lenses 121*c* are explained here.

Figure 8:
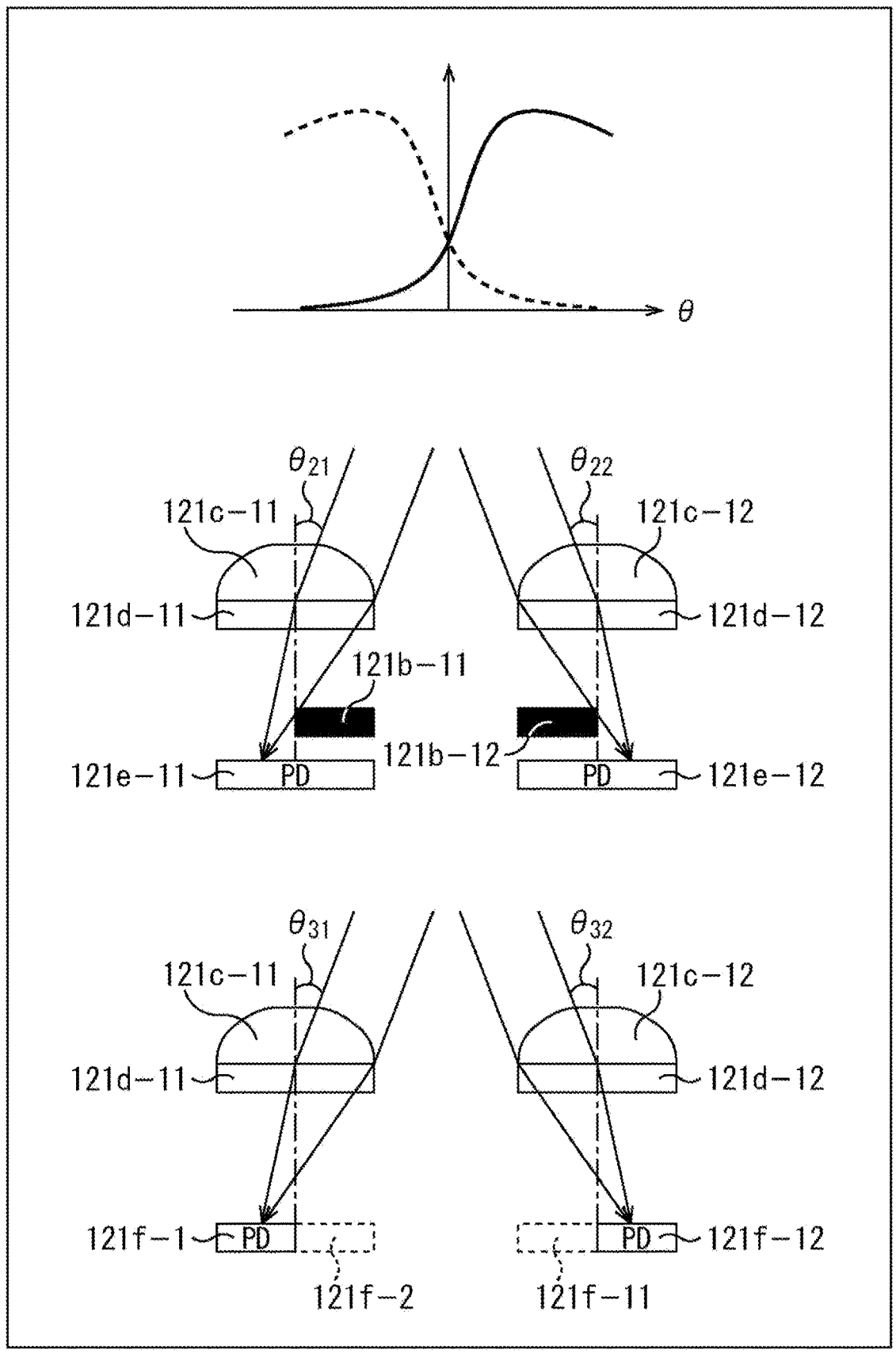
FIG. 8 is a figure for explaining changes of angle-of-incidence directional sensitivities according to a configuration in which on-chip lenses are used.

That is, the angle-of-incidence directional sensitivity of each pixel in the image capturing element 121 can be set as depicted in FIG. 8, for example, by use of an on-chip lens 121*c*, instead of the light shielding film 121*b* described above. That is, in the middle left section of FIG. 8, an on-chip lens 121*c*-11 that condenses incident beams, a color filter 121*d*-11 that transmits beams with a predetermined wavelength, and a photodiode 121*e*-11 that generates a pixel signal by photoelectric conversion are stacked one on another in this order in a direction of incidence from the upper section of the figure. In the middle right section of FIG. 8, an on-chip lens 121*c*-12, a color filter 121*d*-12, and a photodiode 121*e*-12 are configured in this order in a direction of incidence from the upper section of the figure.

Note that, in a case where it is not necessary to make distinctions between the on-chip lenses 121*c*-11 and 121*c*-12, between the color filters 121*d*-11 and 121*d*-12, and between the photodiodes 121*e*-11 and 121*e*-12, they are referred to simply as on-chip lenses 121*c*, color filters 121*d*, and photodiodes 121*e*.

Further, as depicted in each of the middle left section and the middle right section of FIG. 8, the image capturing element 121 is provided with light shielding films 121*b*-11 and 121*b*-12 that shield part of regions that receive incident beams.

As depicted in the middle left section of FIG. 8, in a case where the light shielding film 121*b*-11 that shields the right half of the photodiode 121*e*-11 in the figure is provided, a detection signal level of the photodiode 121*e*-11 changes according to an angle of incidence θ of an incident beam as represented by the waveform of a solid line in the upper section of FIG. 8.

That is, as the angle of incidence θ, which is the angle of an incident beam relative to a dash-dotted line that represents the center positions of the photodiode 121*e* and the on-chip lens 121*c* and that is vertical to the photodiode 121*e* and the on-chip lens 121*c*, increases (as the angle of incidence θ increases in the positive direction (inclines rightward in the figure)), the beam is condensed in the area not provided with the light shielding film 121*b*-11, and accordingly the detection signal level of the photodiode 121*e*-11 increases. On the contrary, as the angle of incidence θ decreases (as the angle of incidence θ increases in the negative direction (as the angle of incidence θ inclines leftward in the figure)), the beam is condensed in the area provided with the light shielding film 121*b*-11, and accordingly the detection signal level of the photodiode 121*e*-11 decreases.

Note that it is supposed that the angle of incidence θ described here has 0 degrees in a case where the direction of an incident beam matches the dash-dotted line, angles of incidence θ on the side of an angle of incidence θ21 of an incident beam from the upper right in the figure on the left side in the middle section of FIG. 8 have positive values, and angles of incidence θ on the side of an angle of incidence θ22 on the right side in the middle section of FIG. 8 have negative values. Accordingly, in FIG. 8, the angle of incidence of an incident beam that enters the on-chip lens 121*c* from the upper right is greater than the angle of incidence of an incident beam that enters the on-chip lens 121*c* from the upper left in the figure. That is, it is supposed in FIG. 8 that the angle of incidence θ increases as the advancing direction of an incident beam inclines rightward (increases in the positive direction), and decreases as the advancing direction inclines leftward (increases in the negative direction).

In addition, as depicted in the middle right section of FIG. 8, in a case where the light shielding film 121*b*-12 that shields the left half of the photodiode 121*e*-12 in the figure is provided, a detection signal level of the photodiode 121*e*-12 changes according to the angle of incidence θ of an incident beam as represented by the waveform of a dotted line in the upper section of FIG. 8.

That is, as represented by the waveform of the dotted line in the upper section of FIG. 8, as the angle of incidence θ, which is the angle of an incident beam relative to a dash-dotted line that represents the center positions of the photodiode 121*e* and the on-chip lens 121*c* and that is vertical to the photodiode 121*e* and the on-chip lens 121*c*, increases (as the angle of incidence θ increases in the positive direction), the beam is condensed in the area provided with the light shielding film 121*b*-12, and accordingly the detection signal level of the photodiode 121*e*-12 decreases. On the contrary, as the angle of incidence θ decreases (as the angle of incidence θ increases in the negative direction), the beam enters the area not provided with the light shielding film 121*b*-12, and accordingly the detection signal level of the photodiode 121*e*-12 increases.

Note that, in the upper section of FIG. 8, the horizontal axis represents angles of incidence θ, and the longitudinal axis represents detection signal levels of photodiodes 121*e*.

The waveforms depicted in the upper section of FIG. 8 and represented by the solid line and the dotted line representing detection signal levels according to the angles of incidence θ can be changed to correspond to the areas of light shielding films 121*b*, and it becomes thereby possible to give pixel units mutually different angle-of-incidence directional sensitivities. Note that the waveform of the solid line in the upper section of FIG. 8 corresponds to solid line arrows representing the states of incident beams depicted in the middle left section and the lower left section of FIG. 8 being condensed at different angles of incidence θ. In addition, the waveform of the dotted line in the upper section of FIG. 8 corresponds to dotted arrows representing the states of incident beams depicted in the middle right section and the lower right section of FIG. 8 being condensed at different angles of incidence θ.

Whereas an angle-of-incidence directional sensitivity described here is characteristics of a detection signal level of each pixel (light-reception sensitivity characteristics) according to the angle of incidence θ, it can also be said that, in a case of the example depicted in the middle section of FIG. 8, the angle-of-incidence directional sensitivity is characteristics of a light shielding value according to the angle of incidence θ. That is, a light shielding film 121*b* shields an incident beam from a particular direction at a high level, but cannot sufficiently shield incident beams from directions other than the particular direction. Differences of levels at which beams can be shielded generate different detection signal levels according to the angle of incidence θ like the ones depicted in the upper section of FIG. 8. Accordingly, if the direction of a beam that can be shielded at the highest level at each pixel is defined as the light shielding direction of the pixel, giving pixel units mutually different angle-of-incidence directional sensitivities means, stated differently, giving pixel units mutually different light shielding directions.

Further, as depicted in the lower left section of FIG. 8, when a configuration in which the one on-chip lens 121*c*-11 is provided with the two photodiodes 121*f*-1 and 121*f*-2 (the pixel output unit includes the two photodiodes 121*f*-1 and 121*f*-2) is adopted, a detection signal level which is the same as that of being in the state depicted in the middle left section of FIG. 8 in which the right side of the photodiode 121*e*-11 is shielded can be determined by use of a detection signal of only the photodiode 121*f*-1 depicted in the left section of the figure.

That is, as the angle of incidence θ, which is the angle of an incident beam relative to the dash-dotted line that represents the center position of the on-chip lens 121*c* and that is vertical to the on-chip lens 121*c*, increases (as the angle of incidence θ increases in the positive direction), the beam is condensed in the area of the photodiode 121*f*-1 whose detection signal is read out, and accordingly the detection signal level increases. On the contrary, as the angle of incidence θ decreases (as the angle of incidence θ increases in the negative direction), the beam is condensed in the area of the photodiode 121*f*-2 whose detection value is not read out, and accordingly the detection signal level decreases.

In addition, similarly, as depicted in the lower right section of FIG. 8, when a configuration in which the one on-chip lens 121*c*-12 is provided with the two photodiodes 121*f*-11 and 121*f*-12 is adopted, an output-pixel-unit detection signal which is at the same detection signal level as that of being in the state depicted in the middle right section of FIG. 8 in which the left side of the photodiode 121*e*-12 is shielded can be obtained by use of a detection signal of only the photodiode 121*f*-12 depicted in the right section of the figure.

That is, as the angle of incidence θ, which is the angle of an incident beam relative to the dash-dotted line that represents the center position of the on-chip lens 121*c* and that is vertical to the on-chip lens 121*c*, increases (as the angle of incidence θ increases in the positive direction), the beam is condensed in the area of the photodiode 121*f*-11 whose detection signal does not contribute to an output-pixel-unit detection signal, and accordingly the detection signal level of the output-pixel-unit detection signal decreases. On the contrary, as the angle of incidence θ decreases (as the angle of incidence θ increases in the negative direction), the beam is condensed in the area of the photodiode 121*f*-12 whose detection signal contributes to an output-pixel-unit detection signal, and accordingly the detection signal level of the output-pixel-unit detection signal increases.

Note that angle-of-incidence directional sensitivities are desirably set highly randomly. For example, if adjacent pixels have identical angle-of-incidence directional sensitivities, there is a fear that Formula (1) to Formula (3) described above or Formula (4) to Formula (6) described later become mutually identical formulae, it becomes impossible to satisfy a relation between unknown values which are solutions of simultaneous equations and the number of the formulae, and there is a fear that it becomes impossible to determine pixel values included in a restoration image. In addition, in the configuration depicted in the middle section of FIG. 8, the one photodiode 121*e*-11 and the one photodiode 121*e*-12 are formed in the pixel 121*a*. In contrast to this, in the configuration depicted in the lower section of FIG. 8, the two photodiodes 121*f*-1 and 121*f*-2 and the two photodiodes 121*f*-11 and 121*f*-12 are formed in the pixel 121*a*. Accordingly, for example, in the lower section of FIG. 8, a photodiode 121*f* does not singly form one pixel.

In addition, in a case where multiple photodiodes 121*f* are included in each pixel output unit as depicted in the lower section of FIG. 8, it can be deemed that an output pixel value of the pixel output unit is modulated according to an angle of incidence. Accordingly, it becomes possible to make characteristics (angle-of-incidence directional sensitivities) of output pixel values different among pixel output units, and the angle-of-incidence directional sensitivity of each pixel output unit is set. Further, in a case where multiple photodiodes 121*f* are included in each pixel output unit, one on-chip lens 121*c* for each pixel output unit is an essential configuration in generating the angle-of-incidence directional sensitivity of each pixel output unit.

In addition, in a case where either the one photodiode 121*e*-11 or the one photodiode 121*e*-12 is included in each pixel output unit as depicted in the middle section of FIG. 8, an incident beam that enters the one photodiode 121*e*-11 or photodiode 121*e*-12 included in each pixel output unit is modulated according to an angle of incidence. As a result, the output pixel value is modulated. Accordingly, it becomes possible to make characteristics (angle-of-incidence directional sensitivities) of output pixel values different, and the angle-of-incidence directional sensitivity of each pixel output unit is set. Further, in a case where either the one photodiode 121e-11 or the one photodiode 121e-12 is included in each pixel output unit, the angle-of-incidence directional sensitivity is set at the time of manufacturing, independently of a light shielding film 121b provided for each pixel output unit.

In addition, in a case where each pixel output unit includes multiple photodiodes 121f as depicted in the lower section of FIG. 8, the number of multiple photodiodes 121f for setting the angle-of-incidence directional sensitivity of each pixel output unit (the number of division of photodiodes 121f included in each pixel output unit) and the positions thereof are set, at the time of manufacturing, independently for each pixel output unit, and further, it becomes possible to switch, at the time of image capturing, which of the multiple photodiodes 121f is used to set the angle-of-incidence directional sensitivity.

<Setting of Angle-of-Incidence Directional Sensitivity>

Figure 9:
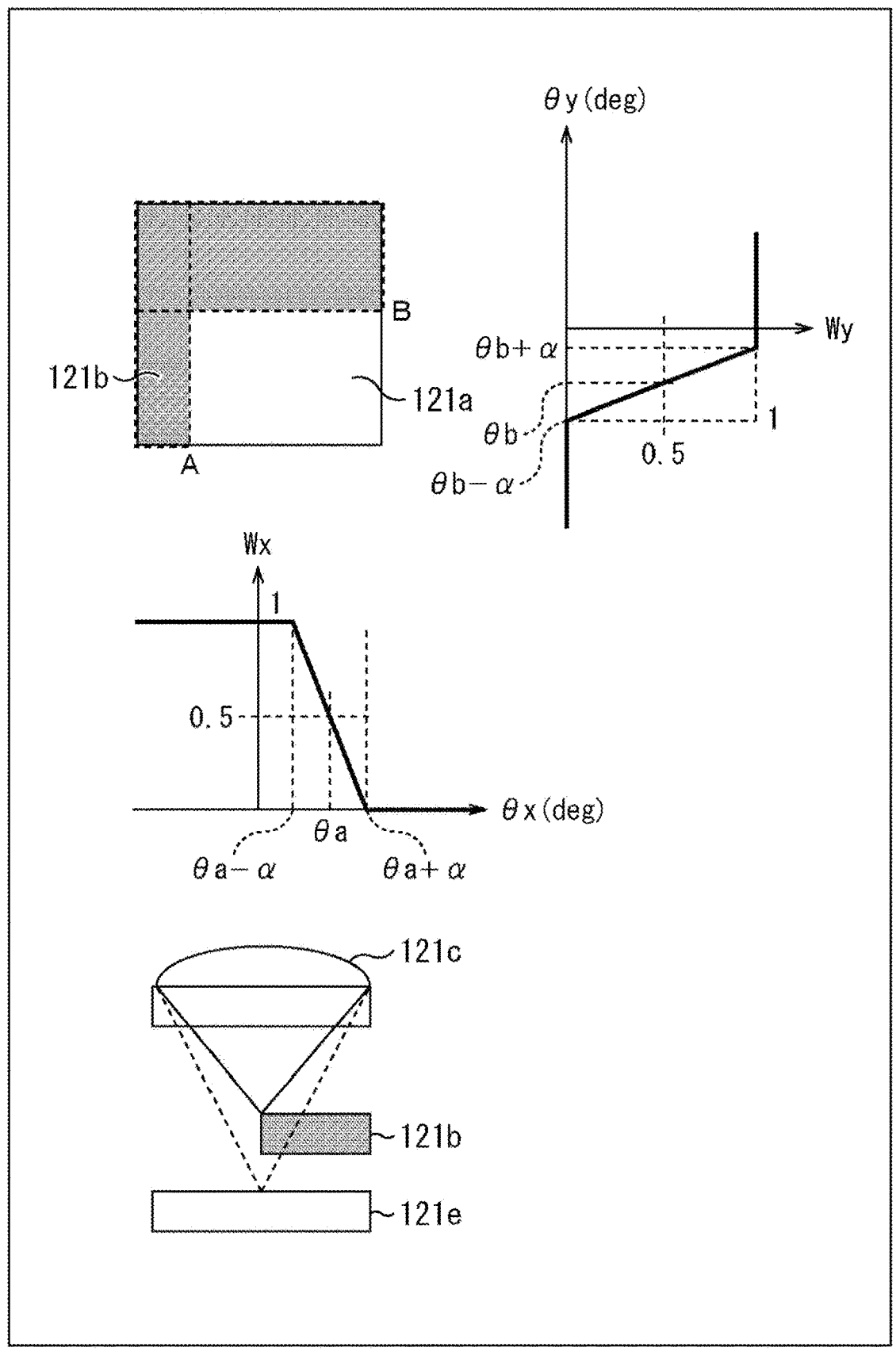
FIG. 9 is a figure for explaining a design of an angle-of-incidence directional sensitivity.

For example, as depicted in the upper section of FIG. 9, the set area of the light shielding film 121b extends from the left end section of a pixel 121a to a position A in the horizontal direction, and extends from the upper end section of the pixel 121a to a position B in the vertical direction.

In this case, a weight Wx in the horizontal direction which is within the range of 0 to 1 and serves as an index of the angle-of-incidence directional sensitivity according to an angle of incidence Ox (deg) from the center position of each pixel in the horizontal direction is set. More specifically, in a case where it is supposed that the weight Wx becomes 0.5 when the angle of incidence θx corresponding to the position A is θa, a weight Wh is set such that the weight Wx becomes 1 when angle of incidence θx<θa−α, the weight Wx becomes $(-(\theta x-\theta a)/2\alpha+\frac{1}{2})$ when θa−α≤angle of incidence θx≤θa+α, and the weight Wx becomes 0 when angle of incidence θx>θa+α. Note that, whereas the weight Wh is 0, 0.5, or 1 in the example explained here, the weight Wh becomes 0, 0.5, or 1 only when ideal conditions are satisfied.

Similarly, a weight Wy in the vertical direction which is within the range of 0 to 1 and serves as an index of the angle-of-incidence directional sensitivity according to an angle of incidence by (deg) from the center position of each pixel in the vertical direction is set. More specifically, in a case where it is supposed that a weight Wv becomes 0.5 when the angle of incidence θy corresponding to the position B is θb, the weight Wy is set such that the weight Wy becomes 0 when angle of incidence θy<θb−α, the weight Wy becomes $((\theta y-\theta b)/2\alpha+\frac{1}{2})$ when θb−α≤angle of incidence θy≤θb+α, and the weight Wy becomes 1 when angle of incidence θy>θb+α.

Then, by use of the thus-determined weights Wx and Wy, coefficients (a coefficient set) corresponding to the angle-of-incidence directional sensitivity, that is, light-reception sensitivity characteristics, of each pixel 121a can be determined.

In addition, at this time, inclinations (½α) representing changes of the weights in ranges where the weight Wx in the horizontal direction and the weight Wy in the vertical direction become approximately 0.5 can be set by use of on-chip lenses 121c having different focal lengths.

That is, by use of on-chip lenses 121c having different curvatures, different focal lengths can be attained.

For example, as represented by a solid line in the lower section of FIG. 9, by use of on-chip lenses 121c having different curvatures, the inclination (½α) becomes steep when the focal length is set such that beams are condensed onto the light shielding film 121b. That is, the weight Wx in the horizontal direction and the weight Wy in the vertical direction in the upper section of FIG. 9 change suddenly to 0 or 1 near the boundaries where they become approximately 0.5, that is, where the angle of incidence θx in the horizontal direction is θa, and where the angle of incidence θy in the vertical direction is θb.

In addition, for example, as represented by a dotted line in the lower section of FIG. 9, by use of on-chip lenses 121c having different curvatures, the inclination (½α) becomes gentle when the focal length is set such that beams are condensed onto the photodiode 121e. That is, the weight Wx in the horizontal direction and the weight Wy in the vertical direction in the upper section of FIG. 9 change gently to 0 or 1 near the boundaries where they become approximately 0.5, that is, where the angle of incidence θx in the horizontal direction is θa, and where the angle of incidence θy in the vertical direction is θb.

As described above, by attaining different focal lengths by using on-chip lenses 121c having different curvatures, it is possible to attain different angle-of-incidence directional sensitivities, that is, different light-reception sensitivity characteristics.

Accordingly, the angle-of-incidence directional sensitivities of pixels 121a can be set to different values when areas of photodiodes 121e that are shielded by light shielding films 121b are made different and the curvatures of on-chip lenses 121c are made different. Note that the curvatures of on-chip lenses of all pixels in the image capturing element 121 may be identical to each other, or some pixels may have different curvatures.

<Differences Between On-Chip Lenses and Image Capturing Lenses>

As described above, the image capturing element 121 does not require an image capturing lens. It should be noted that on-chip lenses 121c are necessary at least in a case like the one explained with reference to FIG. 6 in which an angle-of-incidence directional sensitivity is realized by use of multiple photodiodes in a pixel. On-chip lenses 121c and image capturing lenses provide different physical effects.

An image capturing lens has a condensing functionality of causing incident beams having entered from the same direction to enter multiple pixels that are adjacent to each other. In contrast to this, beams passing through an on-chip lens 121c are caused to enter only the light reception plane of the photodiode 121e or 121f included in one corresponding pixel. Stated differently, an on-chip lens 121c is provided for each pixel output unit, and condenses beams from a subject that enter itself only onto a corresponding pixel output unit. That is, an on-chip lens 121c does not have a condensing functionality for causing diffused beams emitted from an imaginary point light source to enter multiple pixels that are adjacent to each other.

<Relation of Distance Between Subject Plane and Image Capturing Element>

Next, a relation of a distance between a subject plane and the image capturing element 121 is explained with reference to FIG. 10.

Figure 10:
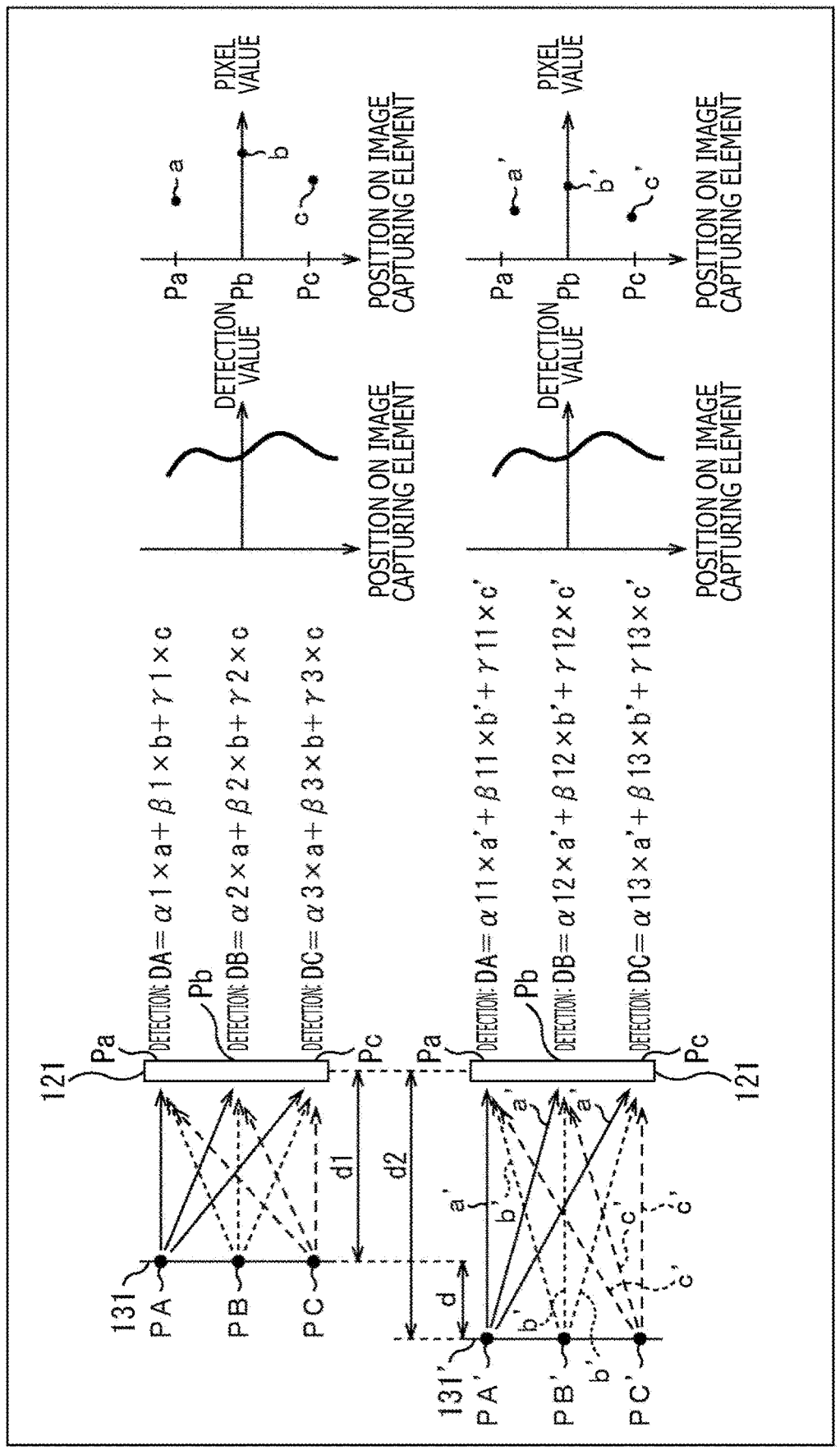
FIG. 10 is a figure for explaining a relation between subject distances and coefficients expressing angle-of-incidence directional sensitivities.

In a case where the subject distance from the image capturing element 121 to the subject plane 131 is a distance d1 as depicted in the upper left section of FIG. 10, for example, when the point light sources PA, PB, and PC on the subject plane 131 are set, the detection signal levels DA, DB, and DC at the corresponding positions Pa, Pb, and Pc on the image capturing element 121 can be expressed by formulae identical to Formula (1) to Formula (3) described above.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

In contrast to this, in a case of a subject plane 131' which is at a subject distance from the image capturing element 121, the subject distance being equal to a distance d2 greater than the distance d1 by d as depicted in the lower left section of FIG. 10, that is, in a case of the subject plane 131' which is farther than the subject plane 131 as seen from the image capturing element 121, the detection signal levels DA, DB, and DC are all similar as depicted in the upper middle section and the lower middle section of FIG. 10.

However, in this case, beams that are emitted from point light sources PA', PB', and PC' on the subject plane 131' and that have optical intensities equal to a', b', and c' are received by pixels of the image capturing element 121. At this time, because the angles of incidence of the beams that are received on the image capturing element 121 and that have optical intensities equal to a', b', and c' are different (change), mutually different coefficient sets are necessary, and the detection signal levels DA, DB, and DC at the positions Pa, Pb, and Pc are expressed as represented by the following Formula (4) to Formula (6), for example.

$$DA = \alpha 11 \times a' + \beta 11 \times b' + \gamma 11 \times c' \quad (4)$$

$$DB = \alpha 12 \times a' + \beta 12 \times b' + \gamma 12 \times c' \quad (5)$$

$$DC = \alpha 13 \times a' + \beta 13 \times b' + \gamma 13 \times c' \quad (6)$$

Here, a coefficient set group including the coefficient set $\alpha 11$, $\beta 11$, and $\gamma 11$, the coefficient set $\alpha 12$, $\beta 12$, and $\gamma 12$, and the coefficient set $\alpha 13$, $\beta 13$, and $\gamma 13$ is a coefficient set group of the subject plane 131' corresponding to the coefficient set $\alpha 1$, $\beta 1$, and $\gamma 1$, the coefficient set $\alpha 2$, $\beta 2$, and $\gamma 2$, and the coefficient set $\alpha 3$, $\beta 3$, and $\gamma 3$ of the subject plane 131, respectively.

Accordingly, by solving Formula (4) to Formula (6) by using the preset coefficient set group $\alpha 11$, $\beta 11$, $\gamma 11$, $\alpha 12$, $\beta 12$, $\gamma 12$, $\alpha 13$, $\beta 13$, and $\gamma 13$, it becomes possible to determine the optical intensities (a', b', and c') of beams emitted from the point light sources PA', PB', and PC' as depicted in the lower right section of FIG. 10 by a technique similar to the technique by which the optical intensities (a, b, and c) of beams emitted from the point light sources PA, PB, and PC is determined in the case of the subject plane 131 depicted in the upper right section of FIG. 10. As a result, it becomes possible to determine a restoration image of the subject of the subject plane 131'.

That is, by storing a coefficient set group of each distance from the image capturing element 121 to a subject plane in advance, switching the coefficient set groups and forming simultaneous equations, and solving the formed simultaneous equations, it becomes possible to obtain restoration images of subject planes at various subject distances on the basis of one detection image.

That is, by capturing a detection image only once, switching the coefficient set groups according to distances to subject planes, and determining restoration images in the subsequent process, it is also possible to generate restoration images of any distances.

In addition, in a case where it is desired to perform image recognition or obtain visible images or characteristics of subjects other than visible images, it is also possible to apply machine learning such as deep learning on detection signals of an image capturing element and perform image recognition or the like by using the detection signals themselves, without performing image recognition or the like on the basis of a restoration image after obtaining the restoration image.

In addition, in a case where a subject distance or an angle of view can be identified, a restoration image may be generated by use of a detection image including detection signals of pixels having angle-of-incidence directional sensitivities suited for capturing an image of a subject plane corresponding to the identified subject distance or angle of view, instead of using all pixels. In such a manner, a restoration image can be determined by use of detection signals of pixels suited for capturing an image of a subject plane corresponding to the identified subject distance or angle of view, and accordingly it becomes possible to highly precisely determine the restoration image of the identified subject distance or angle of view.

Here, a reason why a restoration image can be determined highly precisely when the restoration image is determined by use of detection signals of pixels suited for capturing an image of a subject plane corresponding to the identified subject distance or angle of view is explained.

Figure 11:
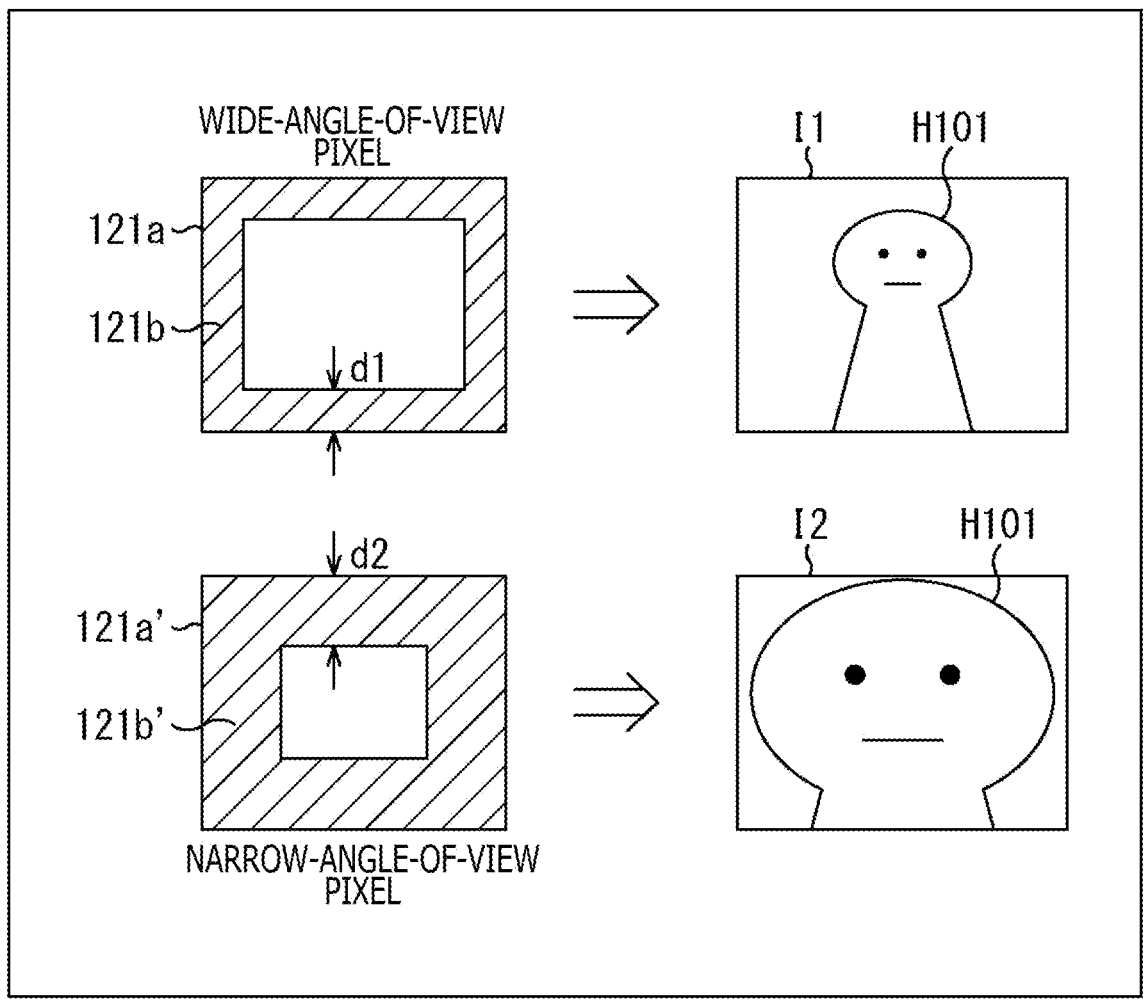
FIG. 11 is a figure for explaining a relation between a narrow-angle-of-view pixel and a wide-angle-of-view pixel.

For example, pixels considered here are a pixel 121a that is shielded by a light shielding film 121b having a width d1 from end sections of the four sides as depicted in the upper section of FIG. 11, and a pixel 121a' that is shielded by a light shielding film 121b having a width d2 (>d1) from end sections of the four sides as depicted in the lower section of FIG. 11.

For example, the pixel 121a is used for restoring an image I1 in FIG. 11 corresponding to an angle of view SQ1 including the whole of a human H101 which is a subject, like the one depicted in the upper section of FIG. 12. In contrast to this, for example, the pixel 121a' is used for restoring an image I2 in FIG. 11 corresponding to an angle of view SQ2 including a close-up view around the face of the human H101 which is a subject, like the one depicted in the upper section of FIG. 12.

Figure 13:
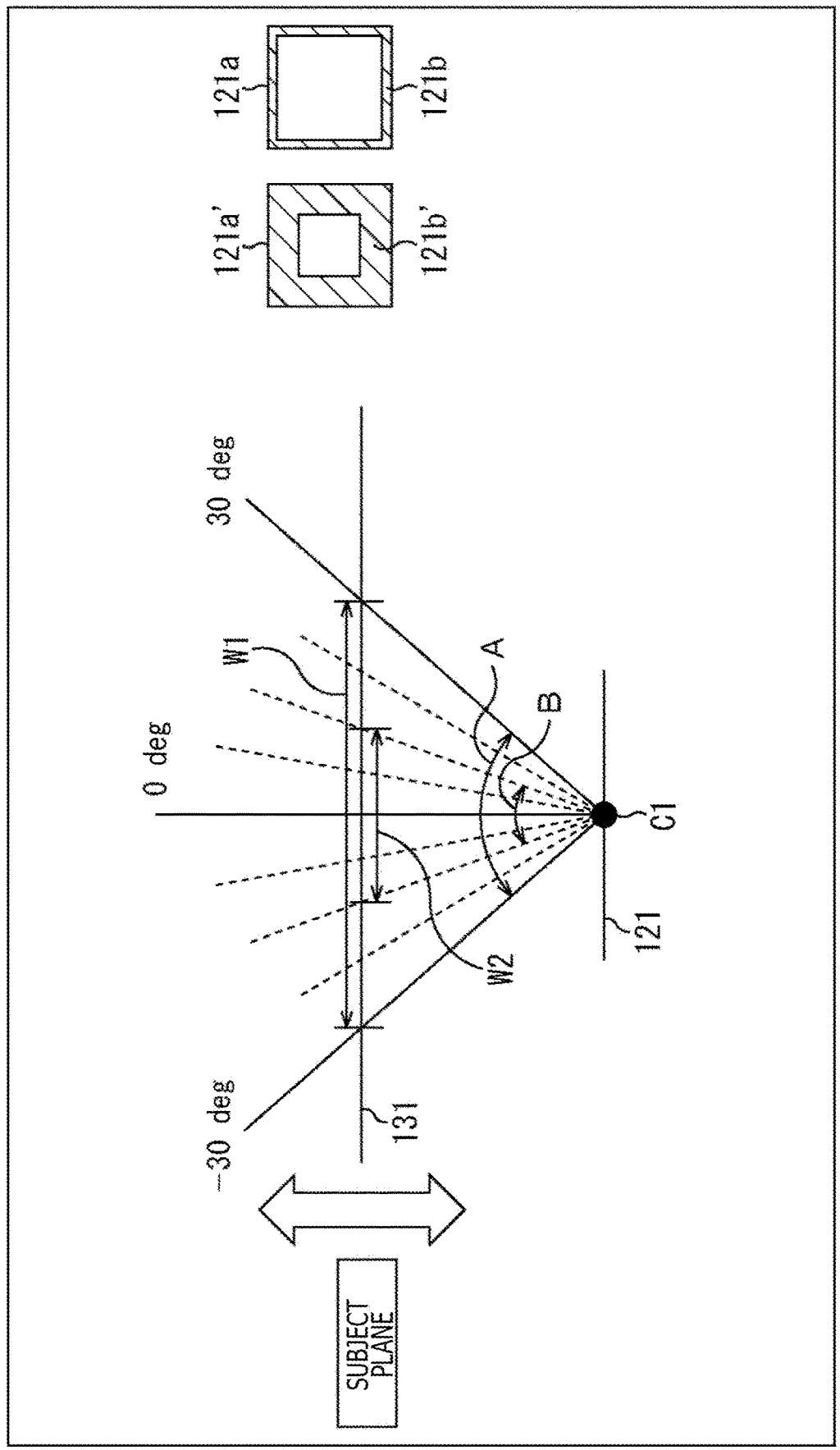
FIG. 13 is a figure for explaining the relation between the narrow-angle-of-view pixel and the wide-angle-of-view pixel.

The reason is because, as depicted in the left section of FIG. 13, the possible angle-of-incidence range of incident beams that enter the image capturing element 121 is a possible angle-of-incidence range A and the pixel 121a in FIG. 11 can thus receive incident beams corresponding to a subject width W1 in the horizontal direction on the subject plane 131.

In contrast to this, the reason is because, since the shielded area of the pixel 121a' in FIG. 11 is larger than the shielded area of the pixel 121a in FIG. 11, the possible angle-of-incidence range of incident beams that enter the image capturing element 121 is a possible angle-of-incidence range B (<A) and the pixel 121a thus receives incident beams corresponding to a subject width W2 (<W1) in the horizontal direction on the subject plane 131, as depicted in the left section of FIG. 13.

That is, while the pixel 121a in FIG. 11 having a small shielded area is a wide-angle-of-view pixel suited for capturing an image of a large area on the subject plane 131, the pixel 121a' in FIG. 11 having a large shielded area is a narrow-angle-of-view pixel suited for capturing an image of a small area on the subject plane 131. Note that a wide-angle-of-view pixel and a narrow-angle-of-view pixel described here are expressions for comparing both the pixels 121a and 121a' in FIG. 11, and there may be other expressions if pixels having other angles of view are compared.

Note that FIG. 13 depicts a relation between positions on the subject plane 131 relative to the center position C1 of the image capturing element 121 and angles of incidence of incident beams emitted from the positions. In addition, whereas FIG. 13 depicts a relation in the horizontal direction between the positions on the subject plane 131 and the angles of incidence of incident beams emitted from the positions on the subject plane 131, a relation in the vertical direction is a similar relation. Further, the right section of FIG. 13 depicts the pixels 121a and 121a' in FIG. 11.

Due to the configuration described above, as depicted in the lower section of FIG. 12, in a case where the image capturing element 121 is configured by a predetermined number of the pixels 121a in FIG. 11 being placed together in an area ZA surrounded by a dotted line and a predetermined number of the pixels 121a' in FIG. 11 being placed together in an area ZB surrounded by a dash-dotted line, an image of the subject width W1 of the subject plane 131 can be restored appropriately by use of the pixels 121a in FIG. 11 that capture an image of the angle of view SQ1 when it is attempted to restore an image of the angle of view SQ1 corresponding to the subject width W1.

Similarly, when it is attempted to restore an image of the angle of view SQ2 corresponding to the subject width W2, the image of the subject width W2 can be restored appropriately by use of detection signal levels of the pixels 121a' in FIG. 11 that capture an image of the angle of view SQ2.

Note that, whereas the lower section of FIG. 12 depicts a configuration in which the predetermined number of the pixels 121a' are provided on the left side in the figure and in which the predetermined number of the pixels 121a are provided on the right side in the figure, this is depicted as an example for simplifying the explanation, and it is desirable that the pixels 121a and the pixel 121a' be arranged such that they are mixedly present randomly.

In such a manner, because the angle of view SQ2 is narrower than the angle of view SQ1, restoration images with high image quality can be obtained when images of the narrower angle of view SQ2 are restored, compared to when images of the angle of view SQ1 are restored, in a case where images of the angle of view SQ2 and the angle of view SQ1 are restored by use of identical predetermined numbers of the pixels.

That is, in a case where it is considered that restoration images are to be obtained by use of identical numbers of the pixels, restoration images with higher image quality can be obtained when images of narrower angles of view are restored.

Note that, in a case where images of a wide angle of view are obtained as restoration images, all the wide-angle-of-view pixels may be used, or some of the wide-angle-of-view pixels may be used. In addition, in a case where images of a narrow angle of view are obtained as restoration images, all the narrow-angle-of-view pixels may be used, or some of the narrow-angle-of-view pixels may be used.

By using the image capturing element 121 like the one above, as a result, an image capturing lens, an optical element including a diffraction grating or the like, a pinhole, and the like become unnecessary. Accordingly, it becomes possible to enhance the degree of freedom of design of the apparatus, also it becomes possible to realize a size reduction of the apparatus in the direction of incidence of incident beams. Hence, it becomes possible to reduce the manufacturing cost. In addition, a lens equivalent to an image capturing lens for forming an optical image, such as a focusing lens, also becomes unnecessary.

Further, by using the image capturing element 121, it becomes possible to generate restoration images of various subject distances and angles of view simply by acquiring a detection image, and thereafter determining the restoration images by solving simultaneous equations formed by selectively using coefficient set groups according to the subject distances and angles of view.

Further, because the image capturing element 121 can have an angle-of-incidence directional sensitivity in each pixel unit, an increase in the number of pixels can be realized, and also a captured image with high resolution and additionally high angular resolution can be obtained as compared with an optical filter including a diffraction grating, a conventional image capturing element, or the like.

In addition, because the image capturing element 121 does not require an optical filter including a diffraction grating or the like, an optical filter is not distorted due to heat when the image capturing element 121 is used at a high-temperature environment. Accordingly, by using such an image capturing element 121, it becomes possible to realize an apparatus which is highly environment-tolerant.

First Modification Example

Whereas, as a configuration of a light shielding film 121b in each pixel 121a of the image capturing element 121, the right section of FIG. 4 depicts an example in which differences of angle-of-incidence directional sensitivities in the horizontal direction are created by the pixels being shielded entirely in the vertical direction and by different widths and positions of the pixels being shielded in the horizontal direction, the configuration of light shielding films 121b is not limited to this example. For example, differences of angle-of-incidence directional sensitivities in the vertical direction may be created by pixels entirely being shielded in the horizontal direction and by different widths (heights) or positions of the pixels being shielded in the vertical direction.

Note that light shielding films 121b that shield pixels 121a entirely in the vertical direction and shield predetermined widths of the pixels 121a in the horizontal direction as in the example depicted in the right section of FIG. 4 are referred to as horizontal-strip type light shielding films 121b. In contrast to this, light shielding films 121b that shield pixels 121a entirely in the horizontal direction and shield predetermined heights of the pixels 121a in the vertical direction are referred to as vertical-strip type light shielding films 121b.

Figure 14:
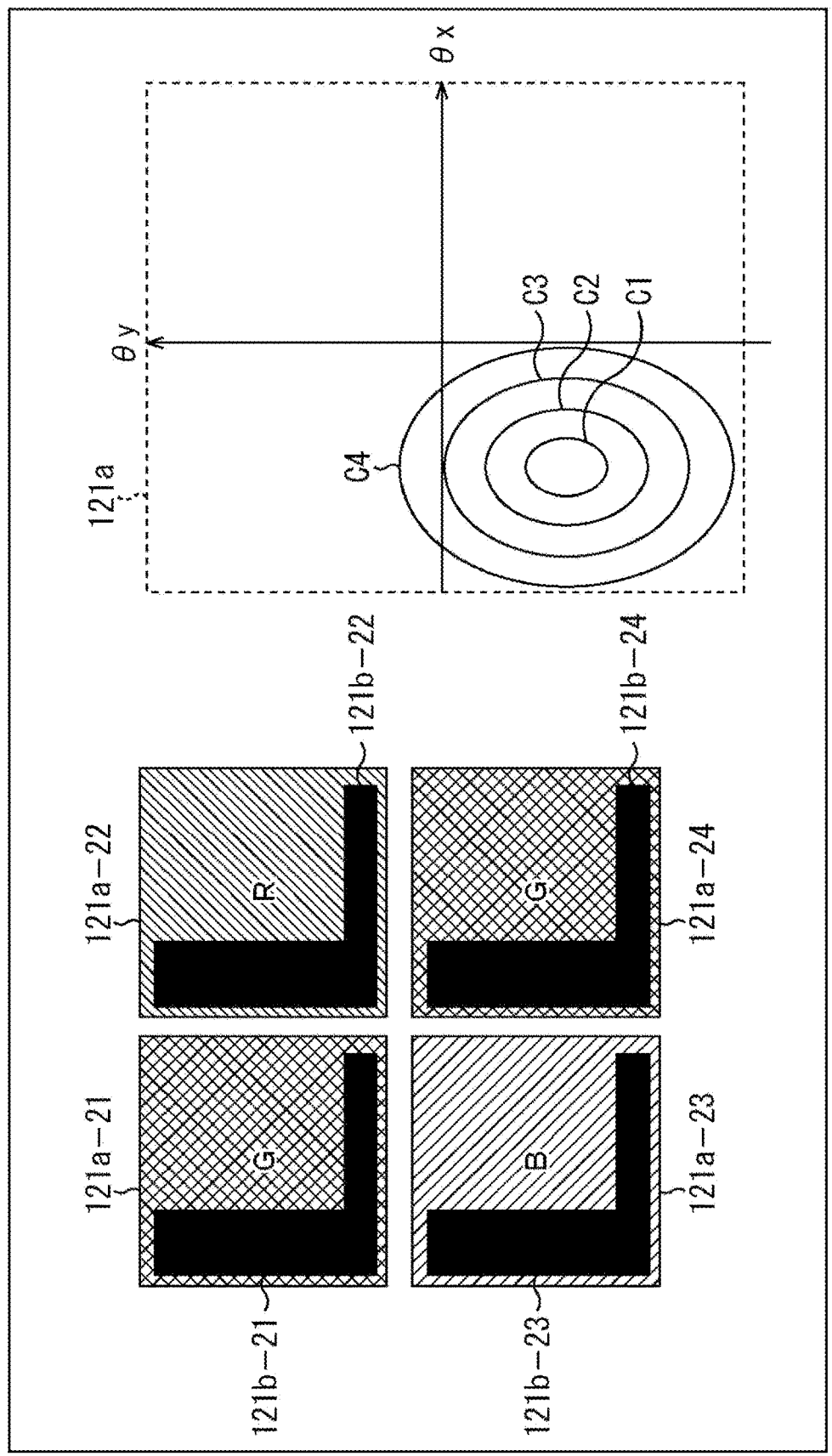
FIG. 14 is a figure for explaining a modification example.

In addition, as in the example depicted in the left section of FIG. 14, vertical-strip type and horizontal-strip type light shielding films 121b may be combined to provide L-shaped light shielding films 121b in pixels 121a. In the left section of FIG. 14, portions depicted in black correspond to light shielding films 121b. That is, a light shielding film 121b-21 to a light shielding film 121b-24 are light shielding films of a pixel 121a-21 to a pixel 121a-24, respectively.

Each of these pixels (the pixel 121a-21 to the pixel 121a-24) has an angle-of-incidence directional sensitivity like the one depicted in the right section of FIG. 14. The graph depicted in the right section of FIG. 14 depicts the light-reception sensitivity of each pixel. The horizontal axis represents the angle of incidence θx of an incident beam in the horizontal direction (x direction), and the longitudinal axis represents the angle of incidence θy of an incident beam in the vertical direction (y direction). Then, the light-reception sensitivity in an area C4 is higher than the outside of the area C4, the light-reception sensitivity in an area C3 is higher than the outside of the area C3, the light-reception sensitivity in an area C2 is higher than the outside of the area C2, and the light-reception sensitivity in an area C1 is higher than the outside of the area C1.

Accordingly, it is depicted that, in each pixel, the detection signal level of an incident beam satisfying conditions of the angle of incidence θx in the horizontal direction (x direction) and the angle of incidence θy in the vertical direction (y direction) in the area C1 becomes the highest, and the detection signal levels decrease in order of conditions of the inside of the area C2, the inside of the area C3, the inside of the area C4, and the outside of the area C4. The degrees of such light-reception sensitivities are decided by areas shielded by a light shielding film 121b.

In addition, in the left section of FIG. 14, an alphabetical character in each pixel 121a represents the color of a color filter (the characters are written for convenience of explanation, and are not actually written). The pixel 121a-21 is a G pixel on which a green color filter is arranged, the pixel 121a-22 is an R pixel on which a red color filter is arranged, the pixel 121a-23 is a B pixel on which a blue color filter is arranged, and the pixel 121a-24 is a G pixel on which a green color filter is arranged. That is, these pixels form a Bayer array. Needless to say, this is an example, and the array pattern of color filters can be any pattern. The arrangement of light shielding films 121b and color filters are not related to each other. For example, filters other than color filters may be provided in some or all of pixels, or filters may not be provided in the pixels.

While the left section of FIG. 14 depicts an example in which "L-shaped" light shielding films 121b shield sides closer to the left sides and the lower sides of pixels 121a in the figure, the directions of "L-shaped" light shielding films 121b can be any directions, and are not limited to the example in FIG. 14. For example, "L-shaped" light shielding films 121b may shield sides closer to the lower sides and the right sides of the pixels 121a in the figure, may shields sides closer to the right sides and the upper sides of the pixels 121a in the figure, or may shield sides closer to the upper sides and the left sides of the pixels 121a in the figure. Needless to say, the direction of a light shielding film 121b of each pixel can be set independently of other pixels. Note that "L-shaped" light shielding films 121b are collectively referred to also as "L-shaped type light shielding films 121b."

Whereas light shielding films have been explained thus far, the explanation of this example can also be applied to a case where angle-of-incidence directional sensitivities are attained by selective use of multiple photodiodes arranged in pixels. That is, for example, incident-beam directional sensitivities equivalent to incident-beam directional sensitivities attained by L-shaped type light shielding films 121b described above can be realized by appropriate setting of the division positions (the sizes and shapes of partial regions) or the positions, sizes, shape, and the like of photodiodes, by appropriate selection of photodiodes, and so on.

Second Modification Example

Figure 15:
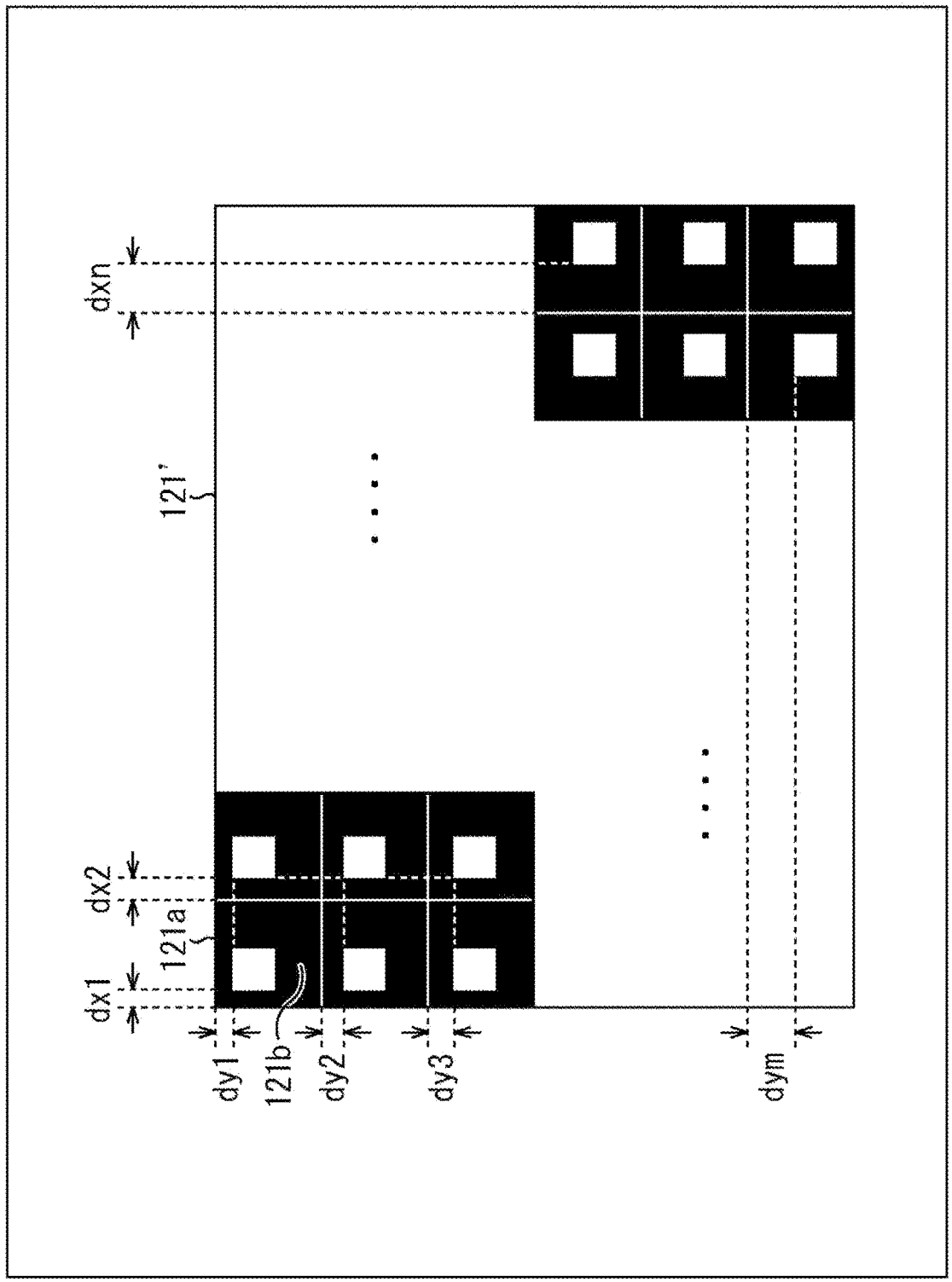
FIG. 15 is a figure for explaining a modification example.

Whereas horizontal-strip type, vertical-strip type, and L-shaped type light shielding films are arranged in pixels such that shielded areas randomly vary in the examples explained thus far, for example, as represented by an image capturing element 121' in FIG. 15, light shielding films 121b (areas depicted in black in the figure) that shield areas other than areas near positions where individual pixels receive beams may be configured in a case where rectangular openings are provided.

That is, in a case where a rectangular opening is provided in each pixel, light shielding films 121b may be provided in such a manner as to attain angle-of-incidence directional sensitivities that allow reception of only beams that are received by being transmitted through the rectangular openings, in beams that are emitted from point light sources included in a subject plane at a predetermined subject distance.

Note that, in FIG. 15, for example, regarding a pixel array in the horizontal direction, the widths of light shielding films 121b in the horizontal direction change from a width dx1 through a width dx2 . . . to a width dxn, and this satisfies dx1<dx2< . . . <dxn. Similarly, regarding a pixel array in the vertical direction, the heights of the light shielding films 121b in the vertical direction change from a height dy1 through a height dy2 . . . to a height dym, and this satisfies dy1<dy2< . . . <dxm. In addition, intervals between the changes of the widths in the horizontal direction and widths in the vertical direction of the light shielding films 121b depend on subject resolution (angular resolution) of restoration.

Stated differently, the configuration of each pixel 121a in the image capturing element 121' in FIG. 15 can be said to attain angle-of-incidence directional sensitivities to change shielded areas in a manner corresponding to the pixel arrangement in the image capturing element 121' in the horizontal direction and the vertical direction.

Figure 16:
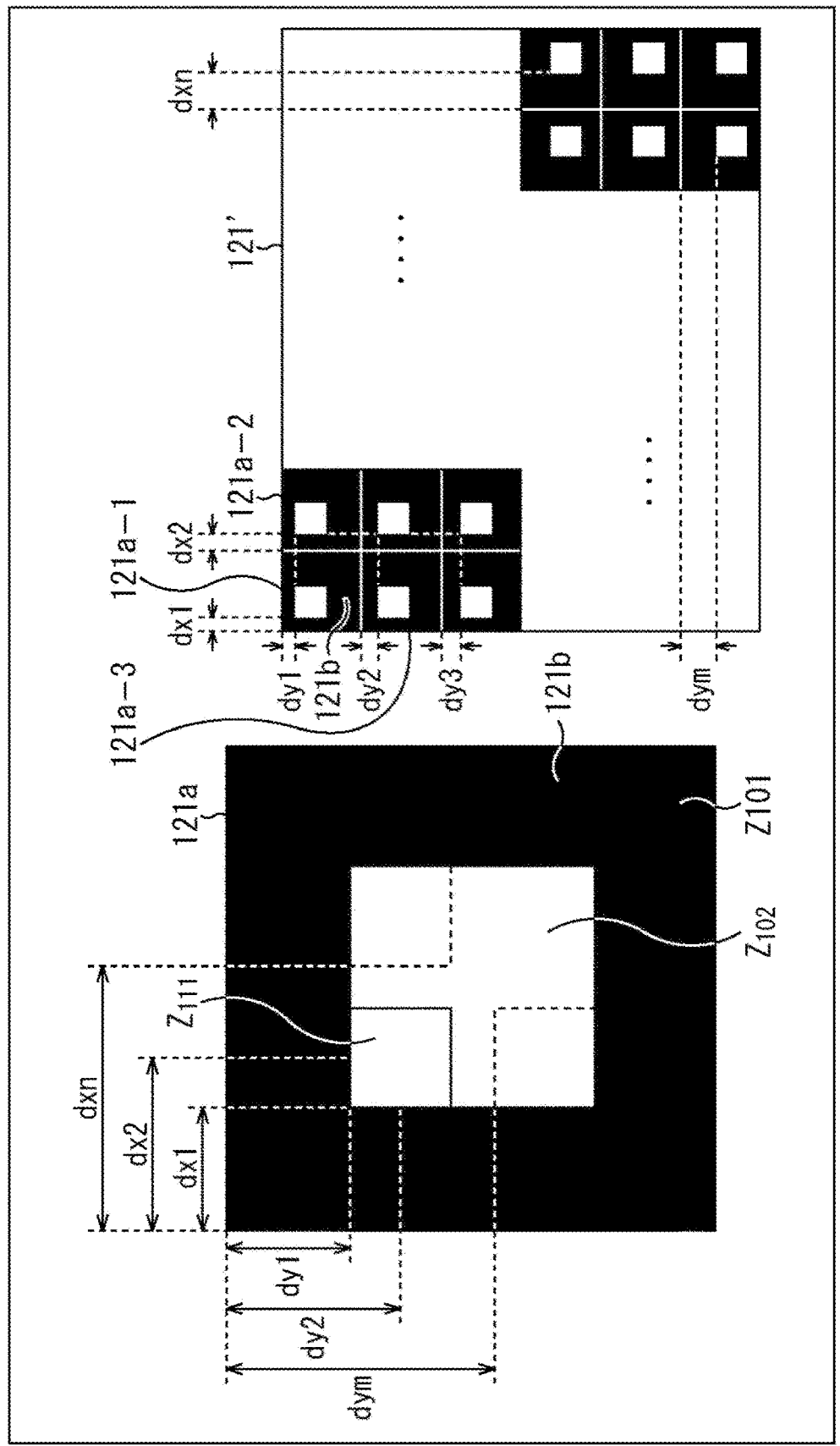
FIG. 16 is a figure for explaining the modification example.

More specifically, the shielded area of each pixel 121a in FIG. 15 is decided according to rules explained by use of pixels 121a depicted in the left section of FIG. 16, for example.

Note that the right section of FIG. 16 depicts the configuration of an image capturing element 121' identical to the one in FIG. 15. In addition, the left section of FIG. 16 depicts the configuration of a pixel 121a in the image capturing element 121' depicted in the right section of FIG. 16 (which is identical to the one in FIG. 15).

As depicted in the left section of FIG. 16, areas, in the pixel 121a, having the width dx1 and extending inward from end sections on the upper side and the lower side of the pixel 121a are shielded by a light shielding film 121b, and areas, in the pixel 121a, having the height dy1 and extending inward from end sections on the left side and the right side of the pixel 121a are shielded by the light shielding film 121b. Note that the light shielding films 121b in FIG. 15 to FIG. 17 correspond to areas depicted in black.

In the left section of FIG. 16, the areas that are shielded by the light shielding film 121b being formed in such a manner are hereinafter referred to as a main light shielding section Z101 (the black section in the left section of FIG. 16) of the pixel 121a, and a rectangular area other the main light shielding section Z101 is referred to as an area Z102.

A rectangular opening Z111 not shielded by the light shielding film 121b is provided in the area Z102 in the pixel 121a. Accordingly, the area other than the rectangular opening Z111 in the area Z102 is shielded by the light shielding film 121b.

In the pixel array in the image capturing element 121' in FIG. 15, as depicted in the right section (which is identical to the one in FIG. 15) in FIG. 16, a pixel 121a-1 located at the left end section and at the upper end section is configured to have a rectangular opening Z111 which is arranged such that its left side is at a distance, from the left side of the pixel

121a, which is equal to the width dx1 and its upper side is at a distance, from the upper side of the pixel 121a, which is equal to dy1.

Similarly, a pixel 121a-2 located adjacent to and on the right of the pixel 121a-1 is configured to have a rectangular opening Z111 which is arranged such that its left side is at a distance, from the left side of the pixel 121a, which is equal to the width dx2 and its upper side is at a distance, from the upper side of the pixel 121a, which is equal to the height dy1, and have areas other than the rectangular opening Z111 that are shielded by the light shielding film 121b.

Similar rules apply to the rest, and pixels 121a that are adjacent to each other in the horizontal direction have right sides of rectangular openings Z111 that are at distances, from the right sides of the pixels 121a, which are equal to the widths dx1, dx2, . . . , and dxn in this order as arrangement positions of the pixels 121a get closer to the right side in the figure. Note that the rectangular portion represented by dotted lines in the upper right section of the area Z102 in FIG. 16 represents a state where a rectangular opening Z111 is arranged such that its left side is at a distance, from the left side of the pixel 121a, which is equal to the width dxn and its upper side is at a distance, from the upper side of the pixel 121a, which is equal to the height dy1. In addition, the interval between each pair of the widths dx1, dx2, . . . , and dxn is a value obtained by dividing, by the pixel count n in the horizontal direction, a width obtained by subtracting the width of a rectangular opening Z111 from the width of an area Z102 in the horizontal direction. That is, intervals between changes in the horizontal direction are decided by division by the pixel count n in the horizontal direction.

In addition, the position, in the horizontal direction, of a rectangular opening Z111 in a pixel 121a in the image capturing element 121' is identical to those in other pixels 121a whose positions in the horizontal direction in the image capturing element 121' are identical (pixels 121a in the same column).

Further, a pixel 121a-3 located adjacent to and immediately below the pixel 121a-1 is configured to have a rectangular opening Z111 which is arranged such that its left side is at a distance, from the left side of the pixel 121a, which is equal to the width dx1 and its upper side is at a distance, from the upper side of the pixel 121a, which is equal to the height dy2, and have areas other than the rectangular opening 4111 that are shielded by the light shielding film 121b.

Similar rules apply to the rest, and pixels 121a that are adjacent to each other in the vertical direction have upper sides of rectangular openings Z111 that are at distances, from the upper sides of the pixels 121a, which are equal to the different heights dy1, dy2, . . . , and dyn in this order as arrangement positions of the pixels 121a get closer to the lower side in the figure. Note that the rectangular portion represented by dotted lines in the lower left section of the area Z102 in FIG. 16 represents a state where a rectangular opening Z111 is arranged such that its left side is at a distance, from the left side of the pixel 121a, which is equal to the width dx1 and its upper side is at a distance, from the upper side of the pixel 121a, which is equal to the height dym. In addition, the interval between each pair of the heights dy1, dy2, . . . , and dym is a value obtained by dividing, by the pixel count m in the vertical direction, a height obtained by subtracting the height of a rectangular opening Z111 from the height of an area Z102 in the vertical direction. That is, intervals between changes in the vertical direction are decided by division by the pixel count m in the vertical direction.

In addition, the position, in the vertical direction, of a rectangular opening Z111 in a pixel 121a in the image capturing element 121' is identical to those in other pixels 121a whose positions in the vertical direction in the image capturing element 121' are identical (pixels 121a in the same row).

Further, the angle of view of each pixel 121a included in the image capturing element 121' depicted in FIG. 16 (FIG. 15) can be changed by its main light shielding section Z101 and rectangular opening Z111 being changed.

Figure 17:
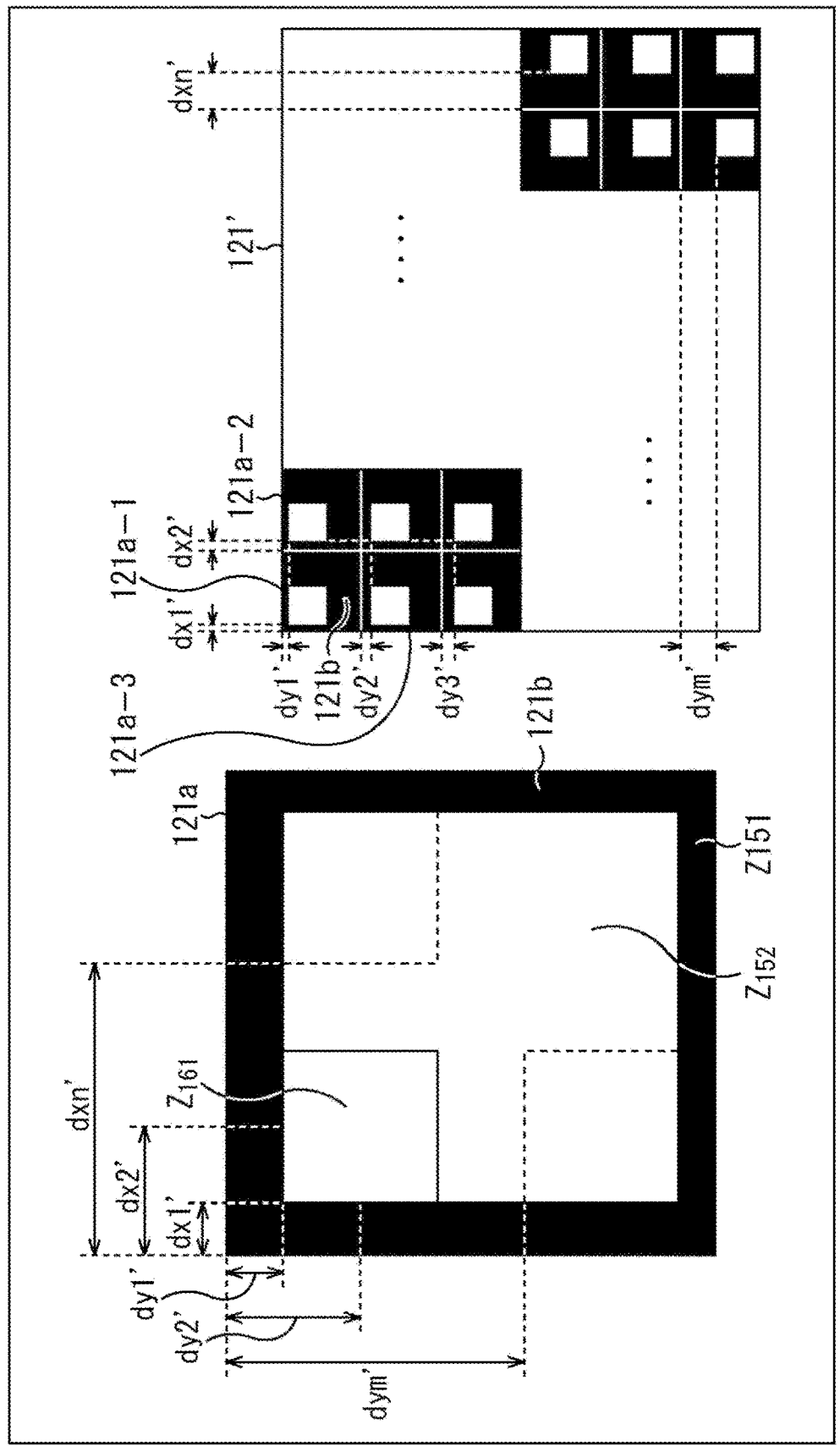
FIG. 17 is a figure for explaining an example in which an angle of view is changed by application of the modification example.

The right section of FIG. 17 depicts the configuration of an image capturing element 121' obtained in a case where the angle of view is made large as compared to the image capturing element 121' in FIG. 16 (FIG. 15). In addition, the left section of FIG. 17 depicts the configuration of a pixel 121a in the image capturing element 121' in the right section of FIG. 17.

That is, as depicted in the left section of FIG. 17, for example, a main light shielding section Z151 (the black section in the left section of FIG. 17) having a shielded area smaller than the shielded area of the main light shielding section Z101 in FIG. 16 is set in the pixel 121a, and other areas are set as an area Z152. Further, a rectangular opening Z161 having an opening area size which is larger than the opening area size of the rectangular opening Z111 is set in the area Z152.

More specifically, as depicted in the left section of FIG. 17, areas, in the pixel 121a, having a width dx1' (<dx1) and extending inward from end sections on the upper side and the lower side of the pixel 121a are shielded by a light shielding film 121b, and areas, in the pixel 121a, having a height dy1' (<dy1) and extending inward from end sections on the left side and the right side of the pixel 121a are shielded by the light shielding film 121b. The rectangular opening Z161 is thereby formed.

Here, as depicted in the right section of FIG. 17, a pixel 121a-1 located at the left end section and at the upper end section is configured to have a rectangular opening Z161 which is arranged such that its left side is at a distance, from the left side of the pixel 121a, which is equal to the width dx1' and its upper side is at a distance, from the upper side of the pixel 121a, which is equal to the height dy1', and have areas other than the rectangular opening Z161 that are shielded by the light shielding film 121b.

Similarly, a pixel 121a-2 located adjacent to and on the right of the pixel 121a-1 is configured to have a rectangular opening Z161 which is arranged such that its left side is at a distance, from the left side of the pixel 121a, which is equal to the width dx2' and its upper side is at a distance, from the upper side of the pixel 121a, which is equal to the height dy1', and have areas other than the rectangular opening Z161 that are shielded by the light shielding film 121b.

Similar rules apply to the rest, and pixels 121a that are adjacent to each other in the horizontal direction have right sides of rectangular openings Z161 that are at distances, from the right sides of the pixels 121a, which are equal to the widths dx1', dx2', . . . , and dxn' in this order as arrangement positions of the pixels 121a get closer to the right side in the figure. Here, the interval between each pair of the widths dx1', dx2', . . . , and dxn' is a value obtained by dividing, by the pixel count n in the horizontal direction, a width obtained by subtracting the width, in the horizontal direction, of a rectangular opening Z161 from the width of an area Z152 in the horizontal direction. That is, intervals between changes in the vertical direction are decided by division by the pixel count n in the horizontal direction. Accordingly, intervals between changes of the widths dx1', dx2', . . . , and dxn' become greater than intervals between changes of the widths dx1, dx2, . . . , and dxn.

In addition, the position, in the horizontal direction, of a rectangular opening Z161 in a pixel 121a in the image capturing element 121' in FIG. 17 is identical to those in other pixels 121a whose positions in the horizontal direction in the image capturing element 121' are identical (pixels 121a in the same column).

Further, a pixel 121a-3 located adjacent to and immediately below the pixel 121a-1 is configured to have a rectangular opening Z161 which is arranged such that its left side is at a distance, from the left side of the pixel 121a, which is equal to the width dx1' and its upper side is at a distance, from the upper side of the pixel 121a, which is equal to the height dy2', and have areas other than the rectangular opening Z161 that are shielded by the light shielding film 121b.

Similar rules apply to the rest, and pixels 121a that are adjacent to each other in the vertical direction have upper sides of rectangular openings Z161 that are at distances, from the upper sides of the pixels 121a, which are equal to the different heights dy1', dy2', . . . , and dym' in this order as arrangement positions of the pixels 121a get closer to the lower side in the figure. Here, an interval between changes of each pair of the heights dy1', dy2', . . . , and dym' is a value obtained by dividing, by the pixel count m in the vertical direction, a height obtained by subtracting the height of a rectangular opening Z161 from the height of an area Z152 in the vertical direction. That is, intervals between changes in the vertical direction are decided by division by the pixel count m in the vertical direction. Accordingly, intervals between changes of the heights dy1', dy2', . . . , and dym' become greater than intervals between changes of the width heights dy1, dy2, . . . , and dym.

In addition, the position, in the vertical direction, of a rectangular opening Z161 in a pixel 121a in the image capturing element 121' in FIG. 17 is identical to those in other pixels 121a whose positions in the vertical direction in the image capturing element 121' are identical (pixels 121a in the same row).

In such a manner, it becomes possible to realize an image capturing element 121' including pixels 121a having various angles of view (having various angle-of-incidence directional sensitivities) by changing combinations of shielded areas of main light shielding sections and opening areas of openings.

Further, instead of using only pixels 121a having identical angles of view, an image capturing element 121 may be realized by combinations of pixels 121a having various angles of view.

Figure 18:
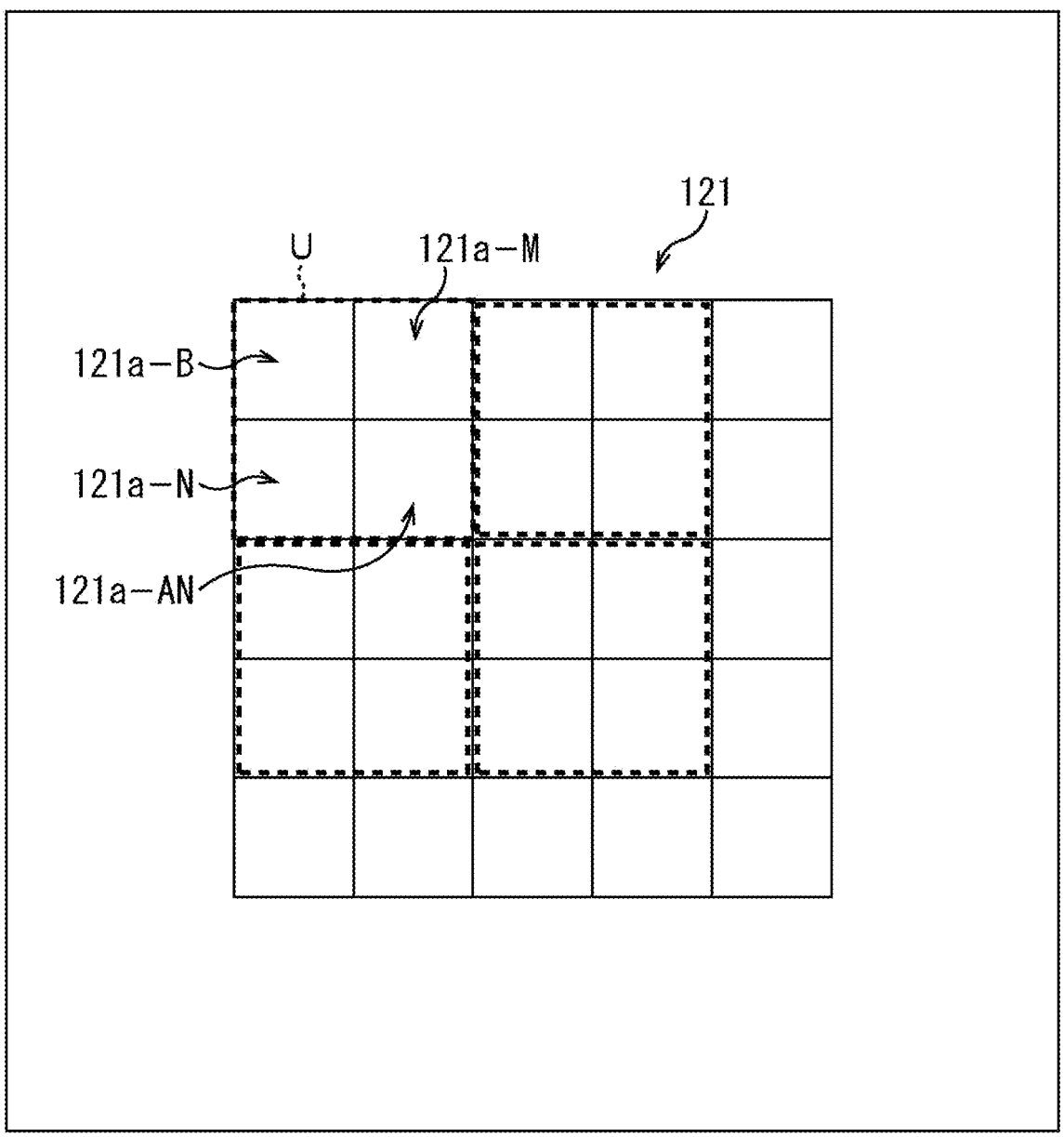
FIG. 18 is a figure for explaining an example of a combination of pixels with multiple angles of view when an angle of view is changed by application of the modification example.

For example, as depicted in FIG. 18, supposing that four pixels including two pixels x two pixels represented by dotted lines are treated as one unit U, each unit U includes four pixels which are a pixel 121a-W having a wide angle of view, a pixel 121a-M having a medium angle of view, a pixel 121a-N having a narrow angle of view and a pixel 121a-AN having an extremely narrow angle of view.

In this case, for example, in a case where the number of all the pixels 121a is X, it becomes possible to create restoration images by using detection images of X/4 pixels for each of the four types of angles of view. At this time, four types of coefficient sets which are different among the angles of view are used, and restoration images of mutually different angles of view are created according to four different types of simultaneous equations.

Because of this, by creating the restoration images of the angles of view to be restored by use of detection images obtained from pixels suited for capturing the images of the angles of view to be restored, it becomes possible to create appropriate restoration images according to the four types of angles of view.

In addition, images of intermediate angles of view between the four types of angles of view or images of angles of view narrower or wider than the intermediate angles of view may be generated by interpolation of images of the four types of angles of view, and a pseud-optical zoom may be realized by images of various angles of view being generated seamlessly.

Whereas light shielding films have been explained thus far, the explanation of this example can also be applied to a case where angle-of-incidence directional sensitivities are attained by selective use of multiple photodiodes arranged in pixels. That is, for example, incident-beam directional sensitivities equivalent to incident-beam directional sensitivities attained by light shielding films 121b having rectangular openings described above can be realized by appropriate setting of the division positions (the sizes and shapes of partial regions) or the positions, sizes, shape, and the like of photodiodes, by appropriate selection of photodiodes, and so on. Needless to say, also in this case, it is also possible to realize an image capturing element 121 by combining pixels 121a having various angles of view. In addition, images of intermediate angles of view or images of angles of view narrower or wider than the intermediate angles of view may be generated by interpolation of images of multiple types of angles of view, and a pseud-optical zoom may be realized by images of various angles of view being generated seamlessly.

Third Modification Example

Meanwhile, in a case where areas in pixels 121a in an image capturing element 121 that are shielded by light shielding films 121b are given randomness, the load of processes by a restoring section 321 or the like increases as the disorderedness of differences between the areas shielded by the light shielding film 121b increases. In view of this, the processing load may be reduced by a regularity being given to some of the changes of the areas in the pixels 121a that are shielded by the light shielding films 121b to reduce the disorderedness.

That is, for example, L-shaped type light shielding films 121b may be configured by vertical-strip type and horizontal-strip type light shielding films being combined. In this case, while a regularity may be given in a predetermined column direction and a predetermined row direction by a combination of horizontal-strip type light shielding films 121b having identical widths for the column direction and a combination of vertical-strip type light shielding films 121b having identical heights for the row direction, random differences are crated between pixel units. The disorderedness of the angle-of-incidence directional sensitivities of the pixels may thereby be reduced, and the processing load outside the image capturing element 121, such as the load of the restoring section 321, may be reduced.

Figure 19:
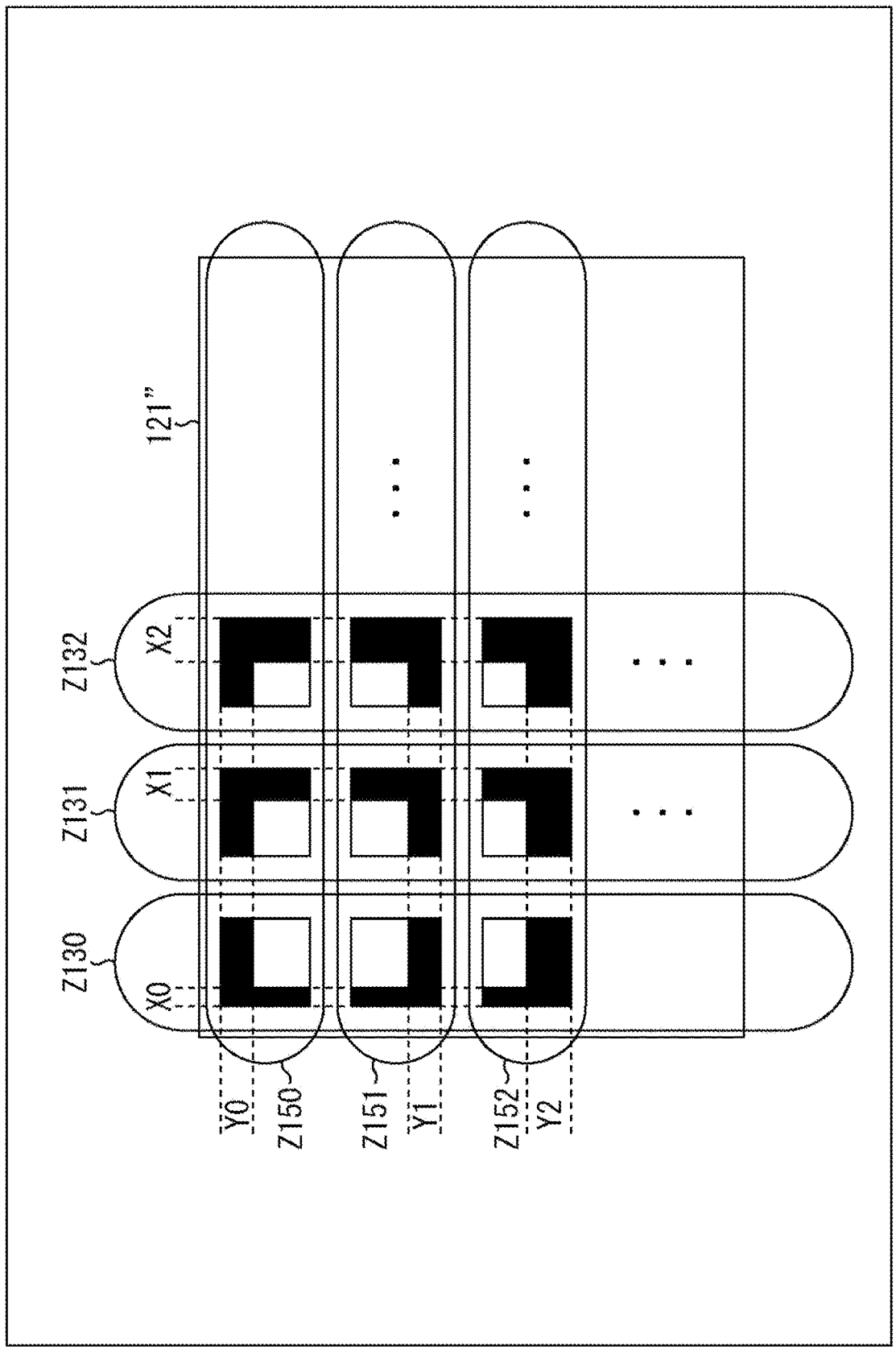
FIG. 19 is a figure for explaining a modification example.

That is, for example, as represented by an image capturing element 121" in FIG. 19, horizontal-strip type light shielding films 121b all having identical widths X0 are used for pixels in the same column represented by an area Z130, vertical-strip type light shielding films 121b having identical heights Y0 are used for pixels in the same row represented by an area Z150, and an L-shaped type light shielding film 121*b* which is a combination of these is set for each pixel 121*a* identified by a row and a column.

Similarly, horizontal-strip type light shielding films 121*b* all having identical widths X1 are used for pixels in the same column represented by an area Z131 adjacent to the area Z130, vertical-strip type light shielding films 121*b* having identical heights Y1 are used for pixels in the same row represented by an area Z151 adjacent to the area Z150, and an L-shaped type light shielding film 121*b* which is a combination of these is set for each pixel 121*a* identified by a row and a column.

Further, horizontal-strip type light shielding films all having identical widths X2 are used for pixels in the same column represented by an area Z132 adjacent to the area Z131, vertical-strip type light shielding films having identical heights Y2 are used for pixels in the same row represented by an area Z152 adjacent to the area Z151, and an L-shaped type light shielding film 121*b* which is a combination of these is set for each pixel 121*a* identified by a row and a column.

In such a manner, while a regularity is given in the widths and positions of light shielding films 121*b* in the horizontal direction and to the heights and positions of the light shielding films 121*b* in the vertical direction, the areas of the light shielding films can be made different among pixel units. Accordingly, the disorderedness of angle-of-incidence directional sensitivities can be reduced. As a result, it becomes possible to reduce patterns of coefficient sets, and it becomes possible to reduce the processing load of calculation processes at a latter stage (e.g. the restoring section 321, etc.).

Figure 20:
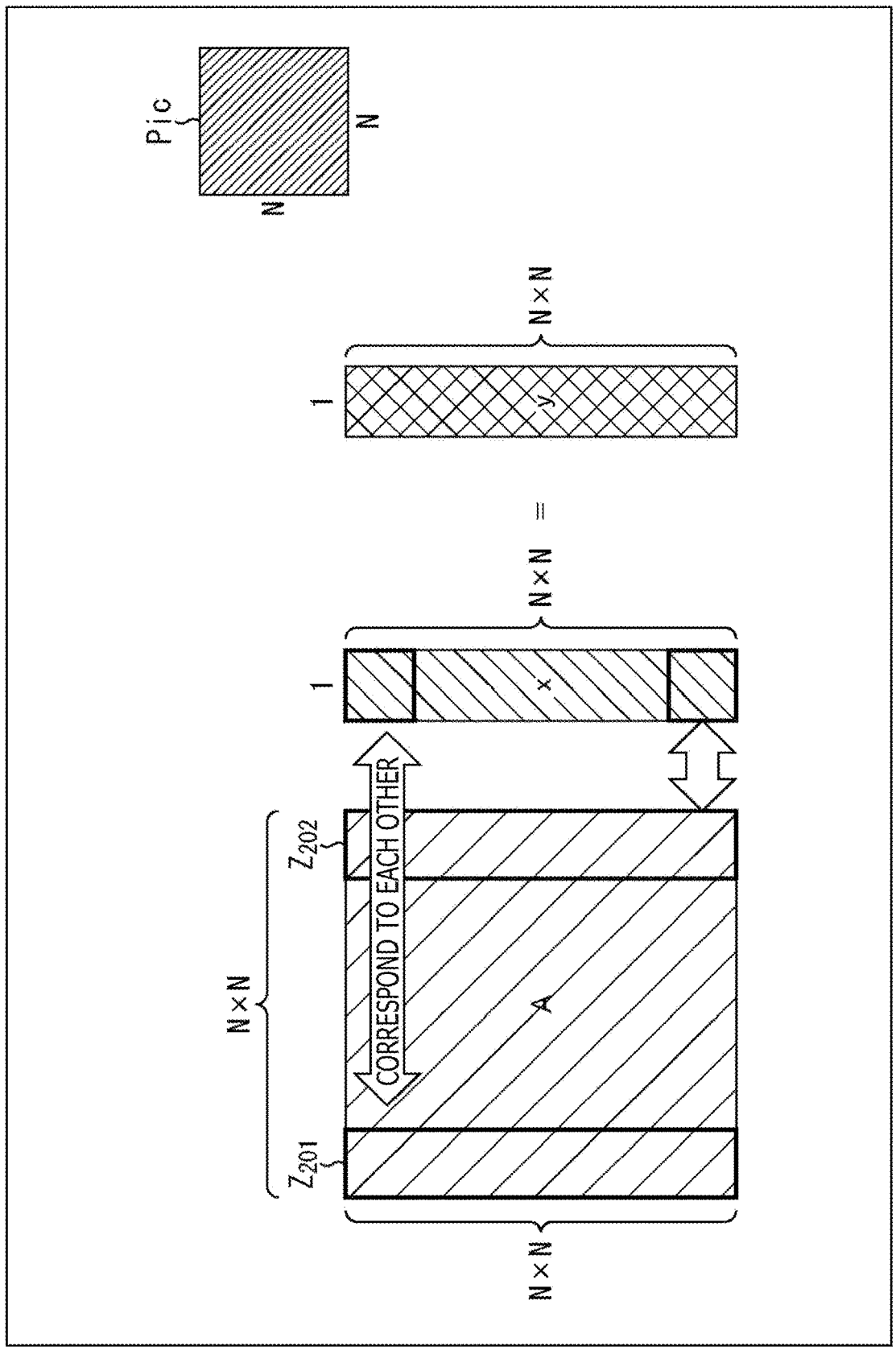
FIG. 20 is a figure for explaining a reason for reduction of a computation amount and a memory capacity by rules for a shielded area about each of the horizontal direction and the vertical direction being provided.

More specifically, in a case where a restoration image of N×N pixels is determined from a detection image Pic of N pixels×N pixels as depicted in the upper right section of FIG. 20, a vector X having, as an element, a pixel value of each pixel of a restoration image of N×N rows and one column, a vector Y having, as an element, a pixel value of each pixel of a detection image of N×N rows and one column, and a matrix A of N×N rows and N×N columns including coefficient sets satisfy a relation like the one depicted in the left section of FIG. 20.

That is, FIG. 20 depicts that the product of each element of the matrix A of N×N rows and N×N columns including coefficient sets and the vector X of N×N rows and one column representing a restoration image becomes the vector Y of N×N rows and one column representing a detection image, and simultaneous equations are determined from this relation.

Note that FIG. 20 depicts that each element in the first column represented by an area Z201 of the matrix A corresponds to an element of the first row of the vector X and that each element of the N×N-th column represented by an area Z202 of the matrix A corresponds to an element of the N×N-th row of the vector X.

Stated differently, when the simultaneous equations based on the determinant depicted in FIG. 20 are solved, each element of the vector X is determined, and a restoration image is thereby determined. In addition, in a case where a pinhole is used and in a case where a condensing functionality of an image capturing lens or the like is used for causing incident beams having entered from the same direction to enter both of pixel output units that are adjacent to each other, a relation between the position of each pixel and the angles of incidence of the beams is determined uniquely. Hence, the matrix A becomes a diagonal matrix which is a square matrix, and includes diagonal components ((i, i) elements) which are all 1 and non-diagonal components which are all 0. On the contrary, in a case where none of a pinhole and an image capturing lens are used as in the image capturing element 121 in FIG. 3, a relation between the position of each pixel and the angles of incidence of the beams is not determined uniquely. Hence, the matrix A does not become a diagonal matrix.

Figure 21:
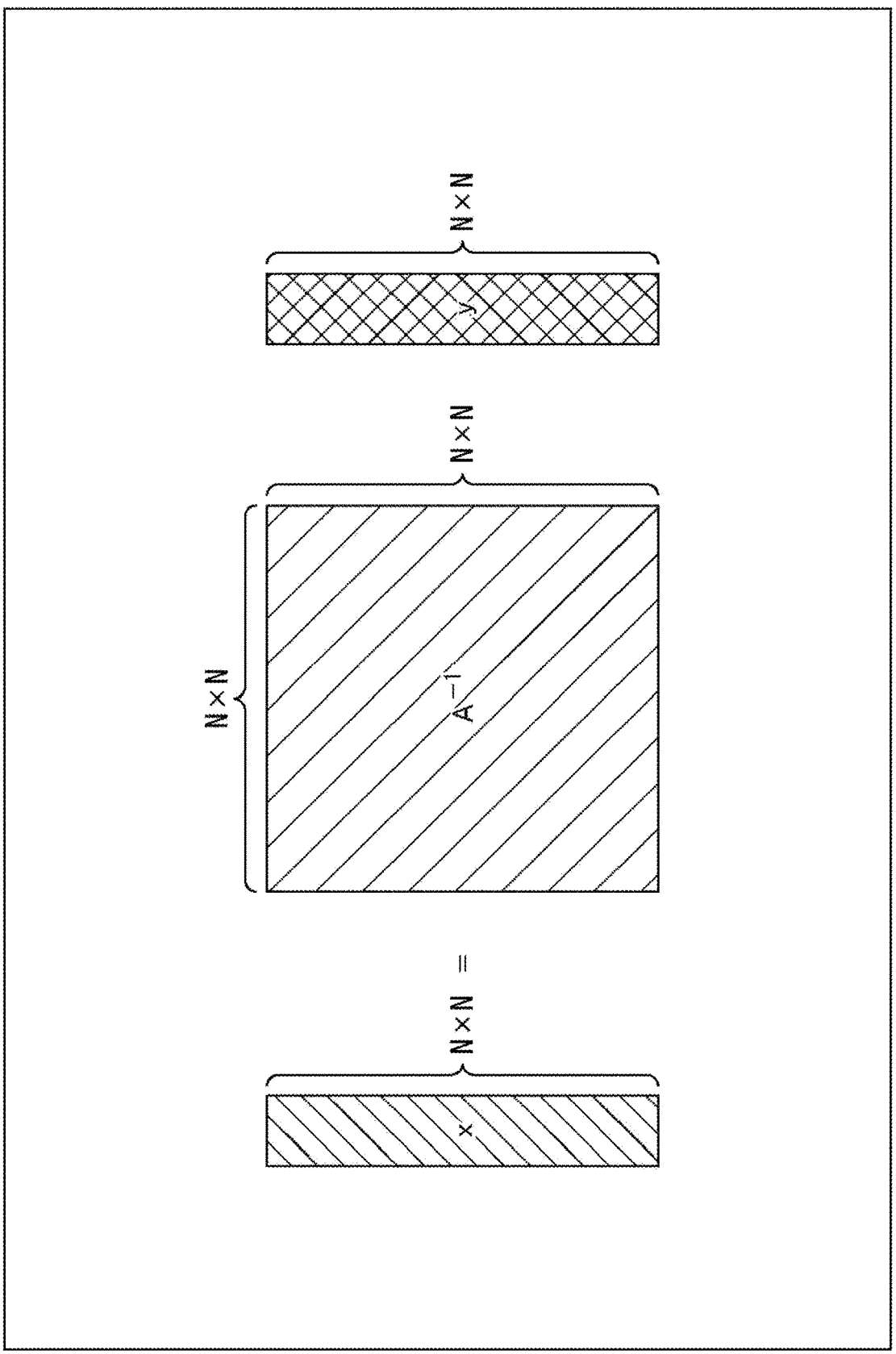
FIG. 21 is a figure for explaining the reason for reduction of the computation amount and the memory capacity by the rules for the shielded area about each of the horizontal direction and the vertical direction being provided.

Meanwhile, typically, the determinant in FIG. 20 is transformed as depicted in FIG. 21 by multiplying both sides by the inverse matrix $A^{-1}$ of the matrix A from left, and each element of the vector X which is a detection image is determined by multiplying the vector Y of the detection image by the inverse matrix $A^{-1}$ from right.

However, simultaneous equations cannot be solved in some cases for any of or any combination of reasons that the actual matrix A cannot be determined accurately, that the actual matrix A cannot be measured accurately, that the base vector of the matrix A is almost linearly dependent and cannot be solved, and that each element of a detection image includes noise.

In view of this, a configuration which is robust against various errors is devised, and the following Formula (7) using the concept of regularized least-squares method is used.

[Math. 1]

$$x = \min \|A\hat{x} - y\|^2 + \|\gamma\hat{x}\|^2 \qquad (7)$$

Here, ones provided with "^" on top of x in Formula (7) represent the vector X, A represents the matrix A, Y represents the vector Y, γ represents a parameter, and ∥A∥ represents the L2 norm (the square root of the sum of squares). Here, the first member represents a norm when the difference between both sides in FIG. 20 is to be minimum, and the second member is a regularization member.

When this Formula (7) is solved for x, the solution is expressed by the following Formula (8).

[Math. 2]

$$\hat{x} = (A^t A + \gamma I)^{-1} A^t y \qquad (8)$$

However, because the matrix A has an enormous size, computation time and a high-capacity memory for computation are required.

Figure 22:
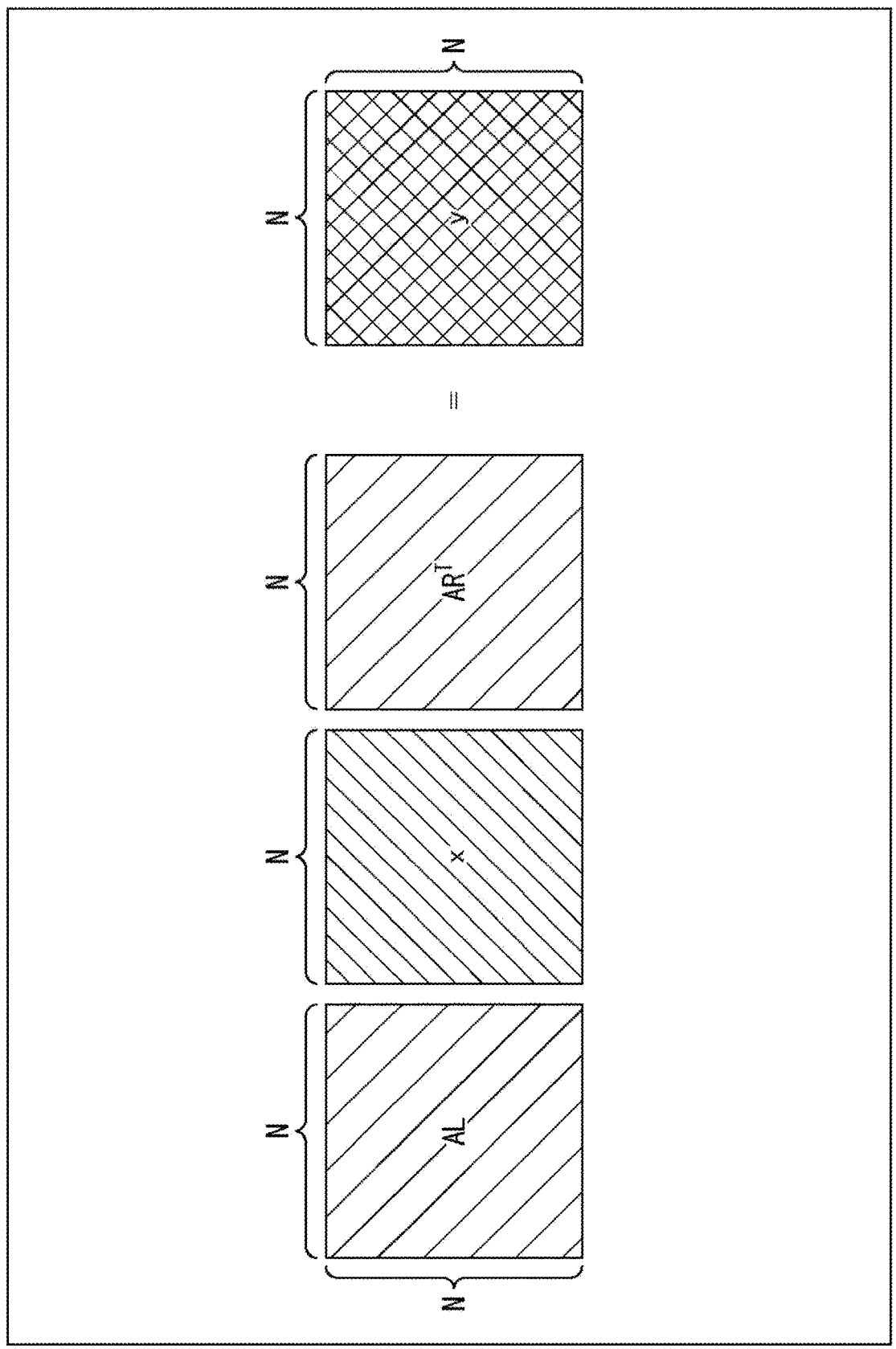
FIG. 22 is a figure for explaining the reason for reduction of the computation amount and the memory capacity by the rules for the shielded area about each of the horizontal direction and the vertical direction being provided.

In view of this, for example, in a case considered here, as depicted in FIG. 22, the matrix A is decomposed into a matrix AL of N rows and N columns and a matrix $AR^T$ of N rows and N columns, and the products obtained by multiplying them and a matrix X of N rows and N columns from the beginning and from the end, respectively, the matrix X of N rows and N columns representing a restoration image, are formed into a matrix Y of N rows and N columns representing a detection image. Accordingly, while the number of elements of the matrix A is (N×N)×(N×N), the numbers of elements of the matrices AL and $AR^T$ are (N×N), and therefore, the number of elements can be reduced to 1/(N×N). As a result, it is sufficient to use only the two matrices AL and $AR^T$ whose numbers of elements are (N×N), and the computation amount and the memory capacity can thus be reduced.

Here, $A^T$ is the transpose of the matrix A, γ is a parameter, and I is a unit matrix. The determinant depicted in FIG. 22 is realized when the matrix in the parentheses in Formula (8) is the matrix AL and the inverse matrix of the transpose of the matrix A is the matrix $AR^T$.

Figure 23:
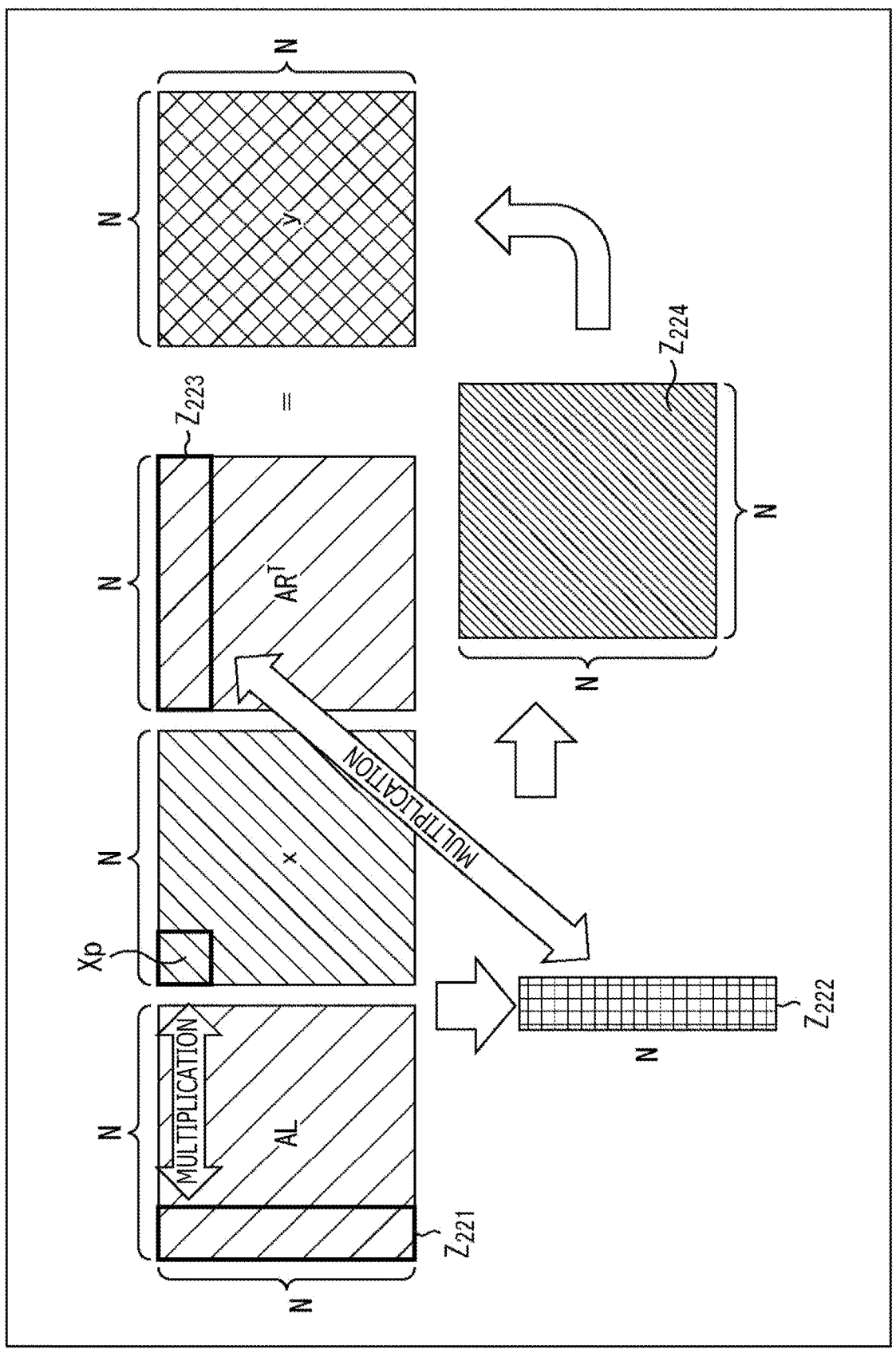
FIG. 23 is a figure for explaining the reason for reduction of the computation amount and the memory capacity by the rules for the shielded area about each of the horizontal direction and the vertical direction being provided.

In a computation like the one depicted in FIG. 22 described above, an element of interest Xp in the matrix X is multiplied by each element group Z221 of a corresponding column in the matrix AL, and an element group Z222 is thereby determined, as depicted in FIG. 23. Further, by multiplying the element group Z222 and elements in a row in the matrix $AR^T$ corresponding to the element of interest Xp, a two-dimensional response Z224 corresponding to the element of interest Xp is determined. Then, by integrating two-dimensional responses Z224 corresponding to all the elements of the matrix X, the matrix Y is determined.

In view of this, the element group Z221 (FIG. 23) corresponding to each row in the matrix AL is given a coefficient set corresponding to the angle-of-incidence directional sensitivities of horizontal-strip type pixels 121a having widths that are set to identical widths for each column of the image capturing element 121 depicted in FIG. 19.

Similarly, an element group Z223 (FIG. 23) of each row in the matrix $AR^T$ is given a coefficient set corresponding to the angle-of-incidence directional sensitivities of vertical-strip type pixels 121a having heights that are set to identical heights for each row of the image capturing element 121 depicted in FIG. 19.

As a result, since it becomes possible to reduce the sizes of matrices to be used when a restoration image is created on the basis of a detection image, the computation amount is reduced, and accordingly it becomes possible to enhance the processing speed and reduce power consumption related to the computation. In addition, because the sizes of the matrices can be reduced, it becomes possible to reduce the memory capacity used for the computation, and it becomes possible to reduce the apparatus cost.

Note that, although shielded areas (areas where beams can be received) are made different among pixel units while a predetermined regularity is given in the horizontal direction and the vertical direction in the example depicted in FIG. 19, shielded areas (areas where beams can be received) of pixel units that are set not completely randomly but are set randomly to some extent in such a manner are also deemed as being set randomly in the technology of the present disclosure. Stated differently, in the present disclosure, shielded areas (areas where beams can be received) of pixel units that are set randomly include not only areas that are set completely randomly, but also areas that are set randomly to some extent (e.g. some of all the pixels are given a regularity, but other areas are set randomly) and areas that seem to lack a regularity to some extent (arrangement in which all the pixels cannot be confirmed as being arranged according to a rule like the one explained with reference to FIG. 19).

Whereas light shielding films have been explained thus far, the explanation of this example can also be applied to a case where angle-of-incidence directional sensitivities are attained by selective use of multiple photodiodes arranged in pixels. That is, for example, incident-beam directional sensitivities equivalent to incident-beam directional sensitivities attained in a case where some of changes of areas, in pixels 121a, that are shielded by light shielding films 121b are given a regularity as described above can be realized by appropriate setting of the division positions (the sizes and shapes of partial regions) or the positions, sizes, shape, and the like of photodiodes, by appropriate selection of photodiodes, and so on. In such a manner, the disorderedness of angle-of-incidence directional sensitivities of pixels can be reduced, and the processing load outside the image capturing element 121, such as the load of a restoring section 122, can be reduced.

Fourth Modification Example

Variations of the shapes of light shielding films 121b of pixel units can be any shapes, and are not limited to each example described above. For example, triangular light shielding films 121b may be set, and areas of the triangles may be set different to thereby attain different angle-of-incidence directional sensitivities. Alternatively, circular light shielding films 12b may be set, and areas of the circles may be set different to thereby attain different angle-of-incidence directional sensitivities. In addition, for example, oblique linear light shielding films and the like may be adopted.

In addition, a variation (pattern) of light shielding films 121b may be set for multiple pixel units included in a unit including a predetermined number of multiple pixels. Such one unit may include any type of pixel. For example, an image capturing element 121 may include color filters and include pixels included in a unit of a color array of the color filters. In addition, a unit may include a pixel group formed by a combination of pixels each having different exposure time. Note that it is desirable that the randomness of the pattern of areas in pixels included in a unit that are shielded by light shielding films 121b be higher, that is, pixels included in a unit have mutually different angle-of-incidence directional sensitivities.

In addition, an arrangement pattern of light shielding films 121b may be set for each unit. For example, the widths and positions of light shielding films may be different among units. Further, patterns of areas shielded by light shielding films 121b may be set within or for each unit including multiple pixels classified into different categories.

Whereas light shielding films have been explained thus far, the explanation of this example can also be applied to a case where angle-of-incidence directional sensitivities are attained by selective use of multiple photodiodes arranged in pixels. That is, for example, incident-beam directional sensitivities equivalent to incident-beam directional sensitivities attained in a case where some of changes of areas, in pixels 121a, that are shielded by light shielding films 121b are given a regularity as described above can be realized by appropriate setting of the division positions (the sizes and shapes of partial regions) or the positions, sizes, shape, and the like of photodiodes, by appropriate selection of photodiodes, and so on. In such a manner, the disorderedness of angle-of-incidence directional sensitivities of pixels can be reduced, and the processing load outside the image capturing element 121, such as the load of the restoring section 122, can be reduced.

Whereas light shielding films have been explained thus far, the explanation of this example can also be applied to a case where angle-of-incidence directional sensitivities are attained by selective use of multiple photodiodes arranged in pixels. That is, incident-beam directional sensitivities equivalent to incident-beam directional sensitivities attained by light shielding films having any shapes such as, for example, triangular shapes, circular shapes, or oblique linear shapes can be realized by appropriate setting of the division positions (the sizes and shapes of partial regions) or the positions, sizes, shape, and the like of photodiodes, by appropriate selection of photodiodes, and so on.

In addition, for example, similarly to the case of light shielding films 121b described above, division positions (the sizes and shapes of partial regions), the positions, sizes, shape, and the like of photodiodes, selection of photodiodes, and the like may be set for each unit.

<Control of Photodiodes>

In a case where multiple photodiodes arranged in a pixel like the ones described above with reference to FIG. 6 are used selectively, the angle-of-incidence directional sensitivities of output pixel values of pixel output units may be able to be made different in various manners by switching the presence or absence or the extent of contribution of multiple photodiodes 121f to the output pixel values of the respective pixel output units.

Figure 24:
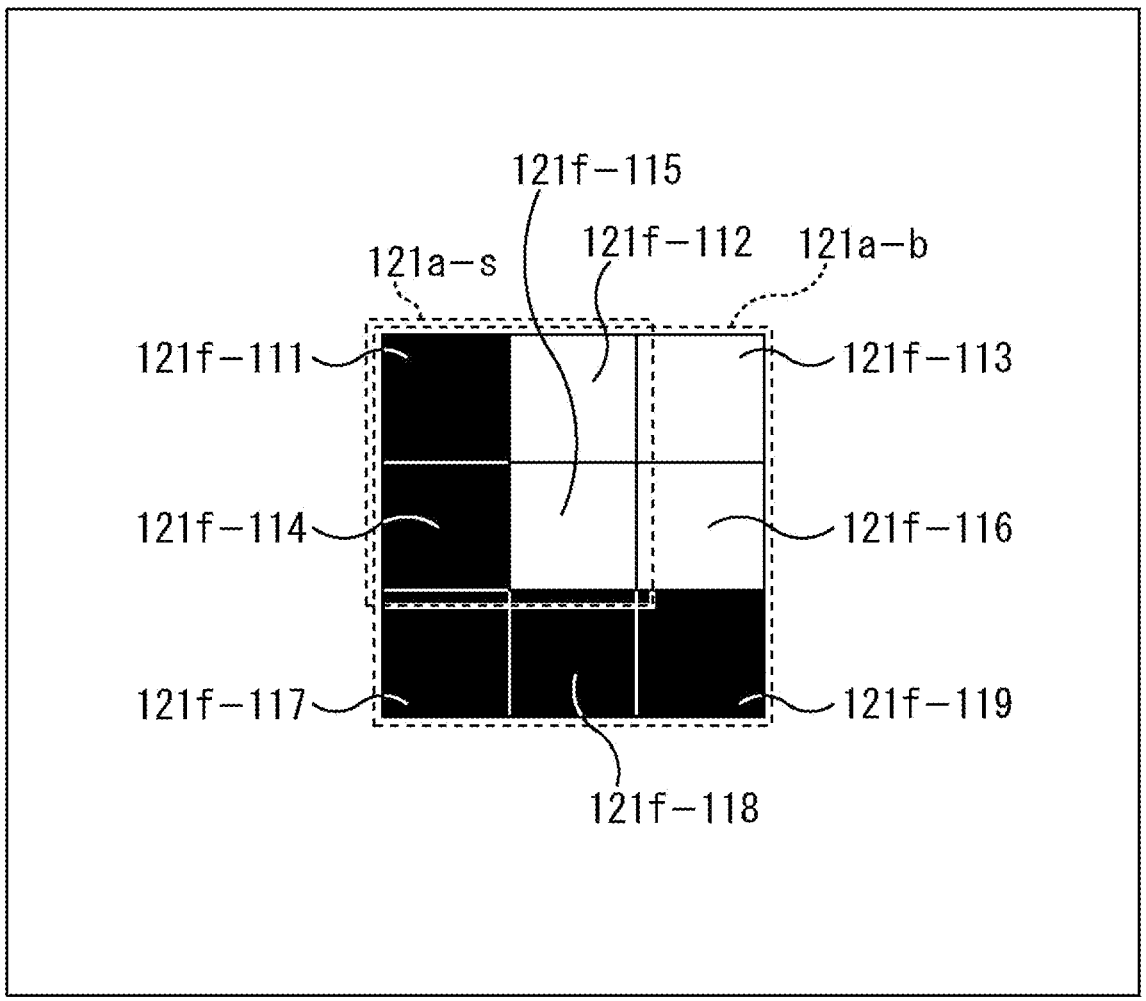
FIG. 24 is a figure for explaining a modification example.

For example, it is supposed, as depicted in FIG. 24, that nine (three in the vertical direction x three in the horizontal direction) photodiodes 121f which are photodiodes 121f-111 to 121f-119 are arranged in a pixel 121a. In this case, the pixel 121a may be used as a pixel 121a-b having the photodiodes 121f-111 to 121f-119, or may be used as a pixel 121a-s having photodiodes 121f-111, 121f-112, 121f-114, and 121f-115.

For example, in a case where the pixel 121a is the pixel 121a-b, the angle-of-incidence directional sensitivity of an output pixel value of the pixel 121a is controlled by control of the presence or absence or the extent of contribution of the photodiodes 121f-111 to 121f-119 to the output pixel value. In contrast to this, in a case where the pixel 121a is the pixel 121a-s, the angle-of-incidence directional sensitivity of an output pixel value of the pixel 121a is controlled by control of the presence or absence or the extent of contribution of the photodiodes 121f-111, 121f-112, 121f-114, and 121f-115 to the output pixel value. In this case, other photodiodes 121f (the photodiodes 121f-113, 121f-116, and 121f-117 to 121f-119) are controlled such that they do not contribute to the output pixel value.

That is, for example, in a case where the angle-of-incidence directional sensitivities of output pixel values of multiple pixels 121a-b are mutually different, the presence or absence or the extent of contribution of at least any one of the photodiodes 121f-111 to 121f-119 to the output pixel values is different. In contrast to this, for example, in a case where the angle-of-incidence directional sensitivities of output pixel values of multiple pixels 121a-s are mutually different, the presence or absence or the extent of contribution of at least any one of the photodiodes 121f-111, 121f-112, 121f-114, and 121f-115 to the output pixel values is different, and the other photodiodes 121f-113, 121f-116, and 121f-117 to 121f-119 uniformly do not contribute to the output pixel values.

Note that whether a pixel 121a is a pixel 121a-b or a pixel 121a-s can be set for each pixel. In addition, this setting may be able to be performed for each unit (multiple pixels).

Figure 25:
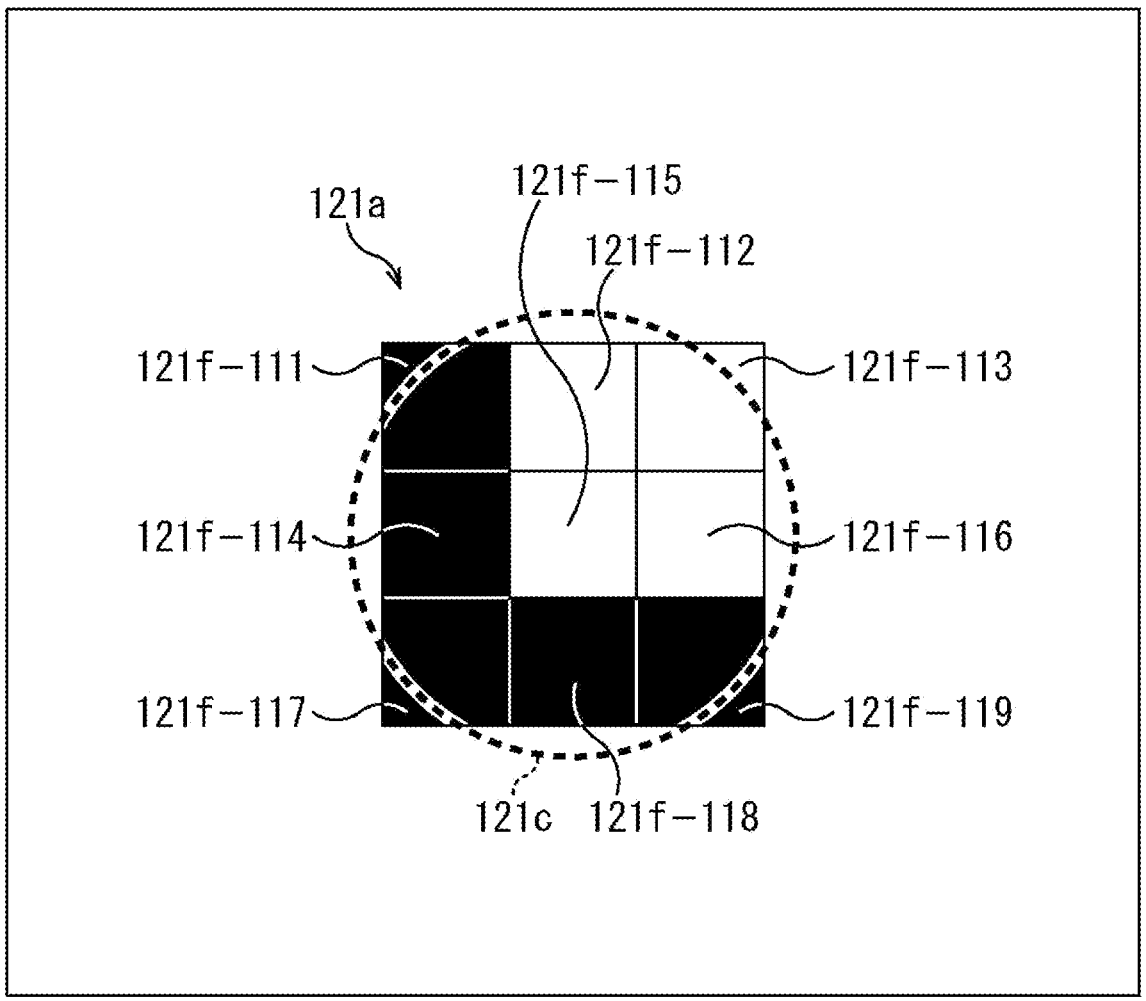
FIG. 25 is a figure for explaining the modification example.

In addition, one on-chip lens is formed in each pixel (each pixel output unit) of the image capturing element 121 as described above. That is, in a case where the pixel 121a has a configuration like the one in the example depicted in FIG. 24, one on-chip lens 121c is provided for the photodiodes 121f-111 to 121f-119 as depicted in FIG. 25. Accordingly, in both the case where the pixel 121a is the pixel 121a-b and the case where the pixel 121a is the pixel 121a-s as explained with reference to FIG. 24, one pixel (one pixel output unit) and one on-chip lens 121c correspond to each other in a one-to-one correspondence.

The image capturing element 121 has been explained thus far. The image capturing section 101 in FIG. 2 has the image capturing element 121 like the one above.

<Identification of Restoration Regions>

Next, identification of restoration regions (or non-restoration regions) by the region identifying section 102 is explained. For example, it is supposed that a restoration image 301 depicted in A of FIG. 26 captures a human 302-1, a human 302-2, and a human 302-3. In a case where it is not necessary to make distinctions between the human 302-1 to the human 302-3, they are referred to as humans 302. For example, in a case where it is desired to not disclose the face portion of each human 302, it is sufficient if predetermined regions including the face portions of the humans 302 are not restored. For example, in a case of the restoration image 301 in A of FIG. 26, it is sufficient if a partial region 303-1 including the face portion of the human 302-1, a partial region 303-2 including the face portion of the human 302-2, and a partial region 303-3 including the face portion of the human 302-3 are not restored as in B of FIG. 26.

Figure 26:
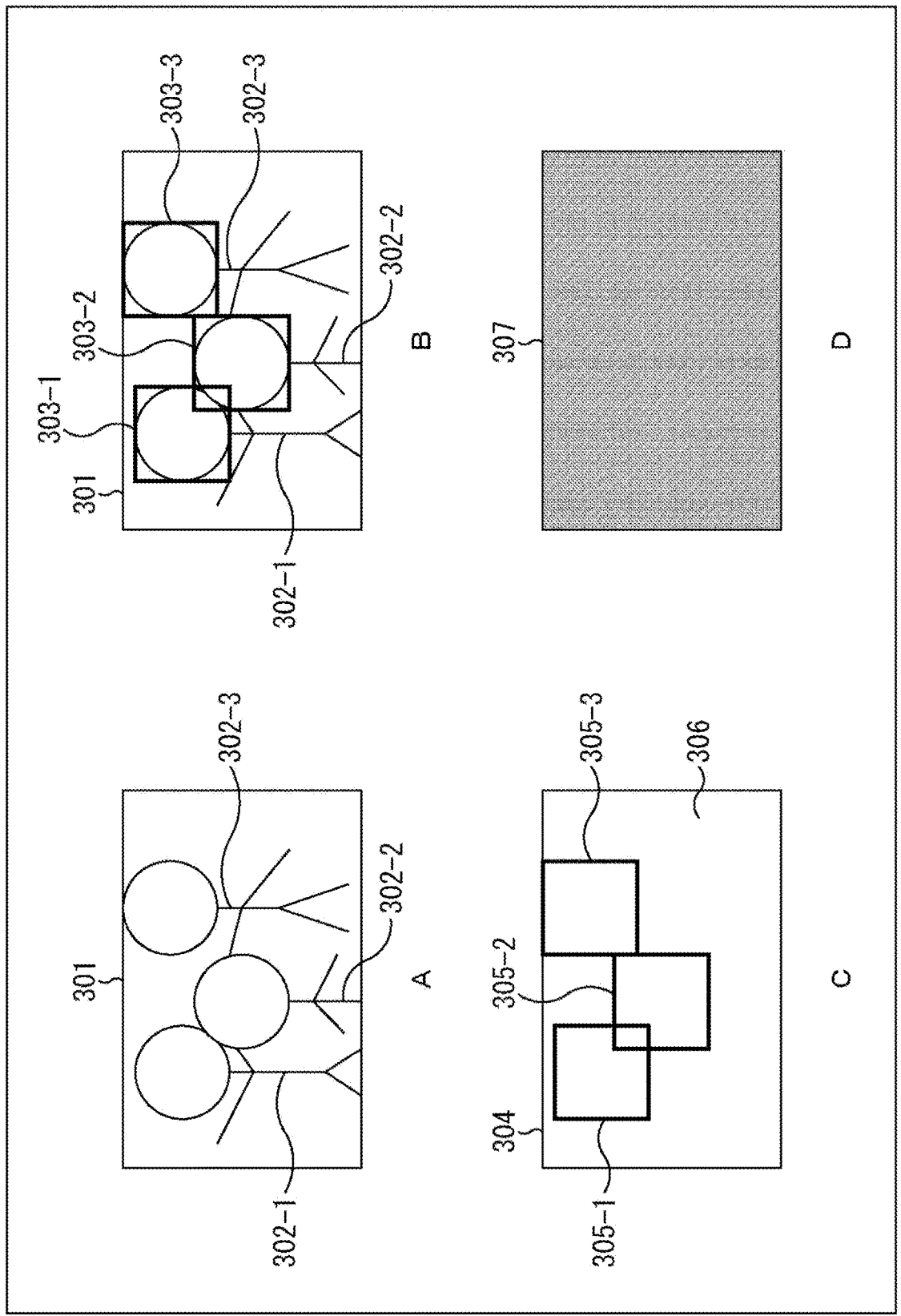
FIG. 26 depicts figures for explaining identification of restoration regions.

In view of this, for example, as depicted in C of FIG. 26, on a detection image 304, a non-restoration region 305-1 whose position, shape, and size are identical to those of the partial region 303-1, a non-restoration region 305-2 whose position, shape, and size are identical to those of the partial region 303-2, and a non-restoration region 305-3 whose position, shape, and size are identical to those of the partial region 303-3 are set. In a case where the non-restoration region 305-1 to the non-restoration region 305-3 need not be explained with distinctions being made therebetween, they are referred to as non-restoration regions 305. Regions other than the non-restoration regions on the detection image are set as restoration regions. That is, a restoration region 306 represents regions other than the non-restoration regions 305 on the detection image 304.

By setting such non-restoration regions 305, it is possible to prevent the non-restoration regions 305 from being restored. That is, it is possible to prevent certain partial regions on the detection image from being restored. Stated differently, by setting the restoration region 306, it is possible to restore only the restoration region 306. That is, it is possible to restore only a certain partial region on the detection image.

In addition, for example, in a case where it is not desired to disclose the face portion of each human 302, it is sufficient if only the partial regions 303 are restored (it is sufficient if areas other than the partial regions 303 are not restored). In this case, it is sufficient if the non-restoration regions 305 described above are set as restoration regions, and the restoration region 306 described above is set as a non-restoration region.

As described above, whereas restoration regions and non-restoration regions can be set as desired on a detection image, the detection image actually is an image on which images of subjects are not formed, and subjects cannot be visually recognized by a user, like a detection image 307 depicted in D of FIG. 26, for example. Accordingly, for example, it is basically impossible for a user to visually identify face portions on the detection image 307 as described above and set non-restoration regions (or restoration regions).

In view of this, identification of restoration regions (non-restoration regions) is performed by using AI (Artificial Intelligence). For example, by using, as teaching data, the detection image 304 like the one depicted in C of FIG. 26 and the non-restoration regions 305 (or the restoration region 306) corresponding to the detection image, machine learning (e.g. deep learning, etc.) is performed. Note that the non-restoration regions 305 (restoration region 306) to be used as the teaching data is one that is identified from the restoration image 301 by a user or the like, for example. Such machine learning is performed by using a large volume of teaching data, feature quantities are learned, and a model is created therefrom.

Such machine learning is performed in advance, and results of training (training data) are stored on the training data storage section 103. The region identifying section 102 identifies restoration regions (non-restoration regions) from a detection image by using the results of training (training data).

In such a manner, subjects that are visually unrecognizable to humans can be identified on a detection image, and partial regions that should be treated as restoration regions (non-restoration regions) can be identified.

<Restoration Regions/Non-Restoration Regions>

Such regions to be treated as restoration regions (non-restoration regions) only have to be identifiable as regions having predetermined features. That is, by setting such restoration regions (or non-restoration regions), it is possible to restore only certain partial regions having the features, restore other regions such that the partial regions are not restored, and so on. The features can be any features. That is, it is possible to restore only certain partial regions having certain features, restore other regions such that the partial regions are not restored, and so on.

For example, a partial region on a detection image corresponding to a region including a preregistered subject or a region other than the region including the predetermined subject on a restoration image may be set as a restoration region (or a non-restoration region). In such a manner, it is possible to restore only the region including the preregistered subject, restore another region such that the region including the preregistered subject is not restored, and so on. For example, a region including a human may be set as a restoration region (or a non-restoration region), a region other than the region including the human may be set as a restoration region (or a non-restoration region), and so on. Needless to say, instead of humans, for example, an animal such as a dog or a cat may be set as a target subject, or, for example, an object such as a vehicle or a tool may be set as a target subject.

In addition, a partial region on a detection image corresponding to a region including a preregistered part of the subject or a region other than the region including the preregistered part of the subject on a restoration image may be set as a restoration region (or a non-restoration region). In such a manner, it is possible to restore only the region including the preregistered part of the preregistered subject, restore another region such that the region including the preregistered part of the preregistered subject is not restored, and so on.

For example, a region including the face portion of a human may be set as a restoration region (or a non-restoration region), a region other than the region including the face portion may be set as a restoration region (or a non-restoration region), and so on. In such a manner, it is possible to restore only the region including the face portion of the human, restore another region such that the region including the face portion of the human is not restored, and so on. Needless to say, for example, a part other than the face, such as a hand, a foot, or the upper half of the body, may be set as a target part. In addition, a certain part of a subject other than a humans, such as a license plate of a vehicle, an arm section of a machine, or a sign portion of a traffic sign, may be set as a target part.

In addition, a partial region on a detection image corresponding to a region including a preregistered human or a region other than the region including the preregistered human on a restoration image may be set as a restoration region (or a non-restoration region). In such a manner, it is possible to restore only the region including the preregistered human, restore another region such that the region including the preregistered human is not restored, and so on. For example, a region including a particular individual may be set as a restoration region (or a non-restoration region), a region other than the region including the individual may be set as a restoration region (or a non-restoration region), and so on. Needless to say, a region including a preregistered part (the face, etc.) of the individual may be set as a restoration region (or a non-restoration region), a region other than the region including the preregistered part may be set as a restoration region (or a non-restoration region), and so on.

In addition, a partial region on a detection image corresponding to a region including a subject satisfying a preregistered condition or a region other than the region including the subject satisfying the preregistered condition on a restoration image may be set as a restoration region (or a non-restoration region). In such a manner, it is possible to restore only the region including the subject satisfying the preregistered condition, restore another region such that the region including the subject satisfying the preregistered condition is not restored, and so on. For example, a region including a human who performs a preregistered action may be set as a restoration region (or a non-restoration region), a region other than the region including the human who performs the preregistered action may be set as a restoration region (or a non-restoration region), and so on.

The action which is set as the condition can be any action. For example, such an action may be running, walking, jumping, climbing over a wall, sitting, crouching, driving, or the like, or may be another action. In addition, for example, such a subject that satisfies a preregistered condition may be a subject moving from left to right in an angle of view, a subject moving downward from the upper part in an angle of view, a subject moving from back to front in an angle of view, or the like. Note that actions (including movement) of subjects may be ones that are performed within the absolute coordinate system of a three-dimensional space or may be relative actions. For example, such an action may be an action to change the position and the posture of a subject relative to an object (the background, etc.) around the subject, or may be an action to change the position and the posture of a subject relative to the image capturing apparatus 100 (image capturing element 121).

In addition, such conditions can be any conditions, and may be conditions other than those related to actions. For example, the number of humans may be used as a condition, or an estimated gender, age, height, body weight, or the like of a human may be used as a condition. Needless to say, subjects may not be humans. In addition, conditions may be set according to subjects, and may be set for each subject.

In addition, a partial region at a preregistered position and with a preregistered size on a detection image may be used as a restoration region (or a non-restoration region). That is, a certain partial region may be set as a restoration region (or a non-restoration region), not depending on the contents of (subject on) an image. For example, a partial region with a certain size and shape on a detection image and at a certain position, for example, the right half, the left half, a peripheral section, or a middle section, on the detection image may be set as a restoration region (or a non-restoration region).

More specific examples are described later as use examples.

<Non-Restoration-Region-Unrestoring Restoration Matrix>

Next, a non-restoration-region-unrestoring restoration matrix generated (set) by the restoration matrix updating section 104 is explained. As explained with reference to FIG. 20 and FIG. 21, a restoration image is restored from a detection image by matrix calculations using a restoration matrix (matrix A (or matrix $A^{-1}$)). That is, a restoration image of a restoration region is restored by matrix calculations using coefficients in the restoration matrix, the coefficients corresponding to the restoration region, and pixel values of a detection image, the pixel values corresponding to the restoration region. That is, by deriving results of the matrix calculations only about the restoration region, only the restoration image of the restoration region can be created.

Stated differently, by not deriving a matrix calculation result corresponding to the non-restoration region in the matrix calculations, a restoration image can be created such that the non-restoration region is not restored.

Figure 27:
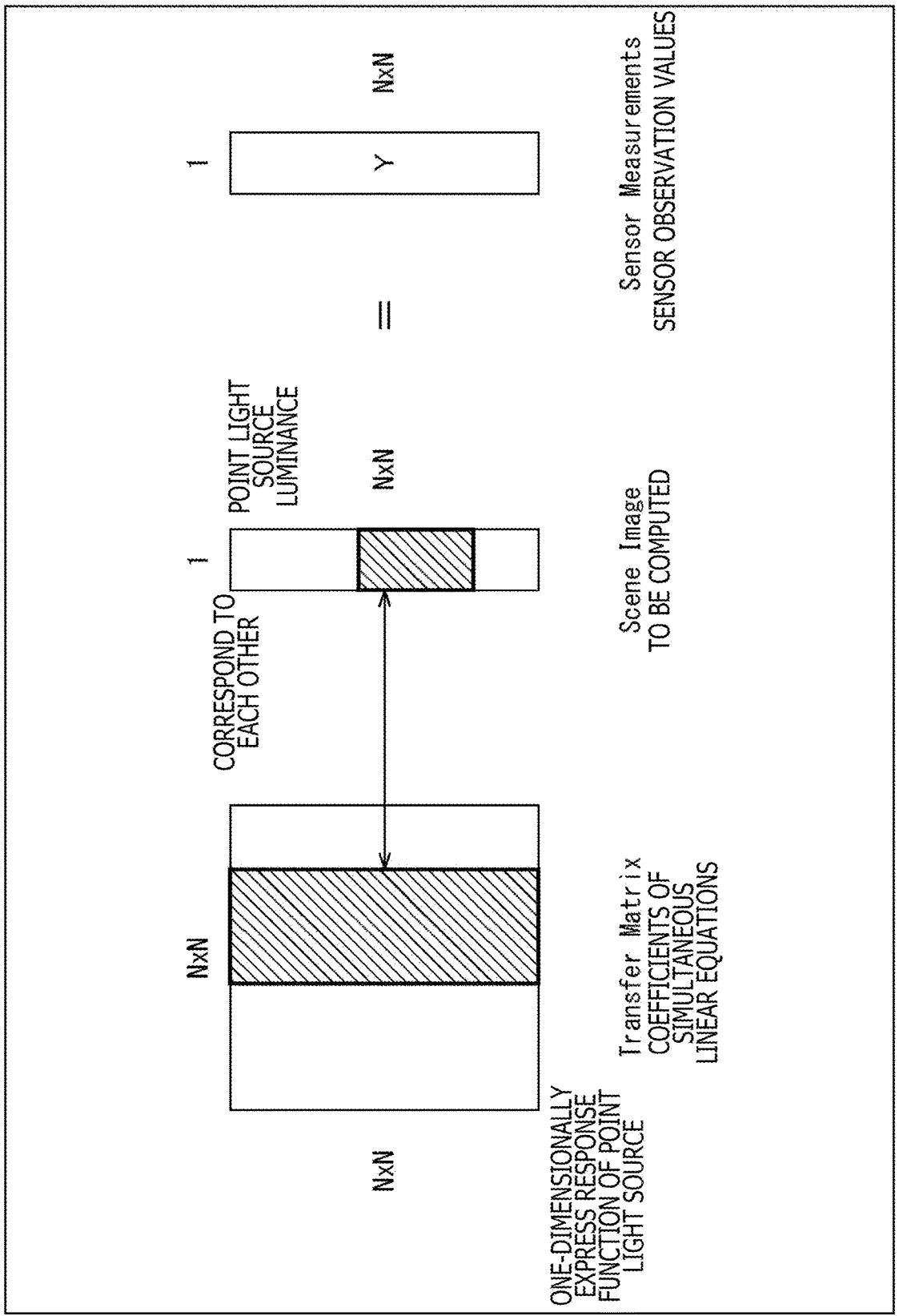
FIG. 27 is a figure for explaining creation of a restoration image.

In view of this, for example, as depicted in FIG. 27, coefficients in a restoration matrix, the coefficients corresponding to non-restoration regions, may be set to a predetermined value (e.g. "0"). For example, coefficients in a restoration matrix ("Transfer Matrix (coefficients of simultaneous linear equations)" in FIG. 27) corresponding to a shaded portion of a restoration image ("Scene Image (to be computed)" in FIG. 27) correspond to the shaded portion. In a case where the shaded portion of the restoration image is a non-restoration region, the values of the coefficients of the shaded portion in the restoration matrix are set to "0." In such a manner, even if a restoration image is created from a detection image by a matrix calculation like the one depicted in FIG. 21 being performed, the pixel values of the shaded portion on the restoration image become "0" (i.e. the restoration image is not created).

On the basis of restoration region information, the restoration matrix updating section 104 generates (sets) a non-restoration-region-unrestoring restoration matrix in which coefficient corresponding to non-restoration regions are "0," as described above. That is, the restoration matrix updating section 104 may generate (set) a partial restoration matrix to be used for creating only restoration images of restoration regions by setting, to a preregistered value (e.g. "0"), coefficients not corresponding to the restoration regions in coefficients of a whole restoration matrix which is a restoration matrix corresponding to the whole of a detection image.

When the restoring section 105 creates a restoration image from the detection image by using the non-restoration-region-unrestoring restoration matrix (partial restoration matrix), a restoration image in which pixel values of the non-restoration regions are "0" is obtained. That is, by using the non-restoration-region-unrestoring restoration matrix, the restoring section 105 can create a restoration image such that the non-restoration regions are not restored.

Note that the "preregistered value" of coefficients in a restoration matrix set by the restoration matrix updating section 104 can be any value, and may be a value other than "0." That is, the "preregistered value" only has to be a value by which a subject does not become visually recognizable as a result of matrix calculations. For example, the "preregistered value" may be set uniformly for all coefficients corresponding to non-restoration regions or may not be set uniformly. For example, as such a "preregistered value," a value which is different for each coefficient or block may be set.

Figure 28:
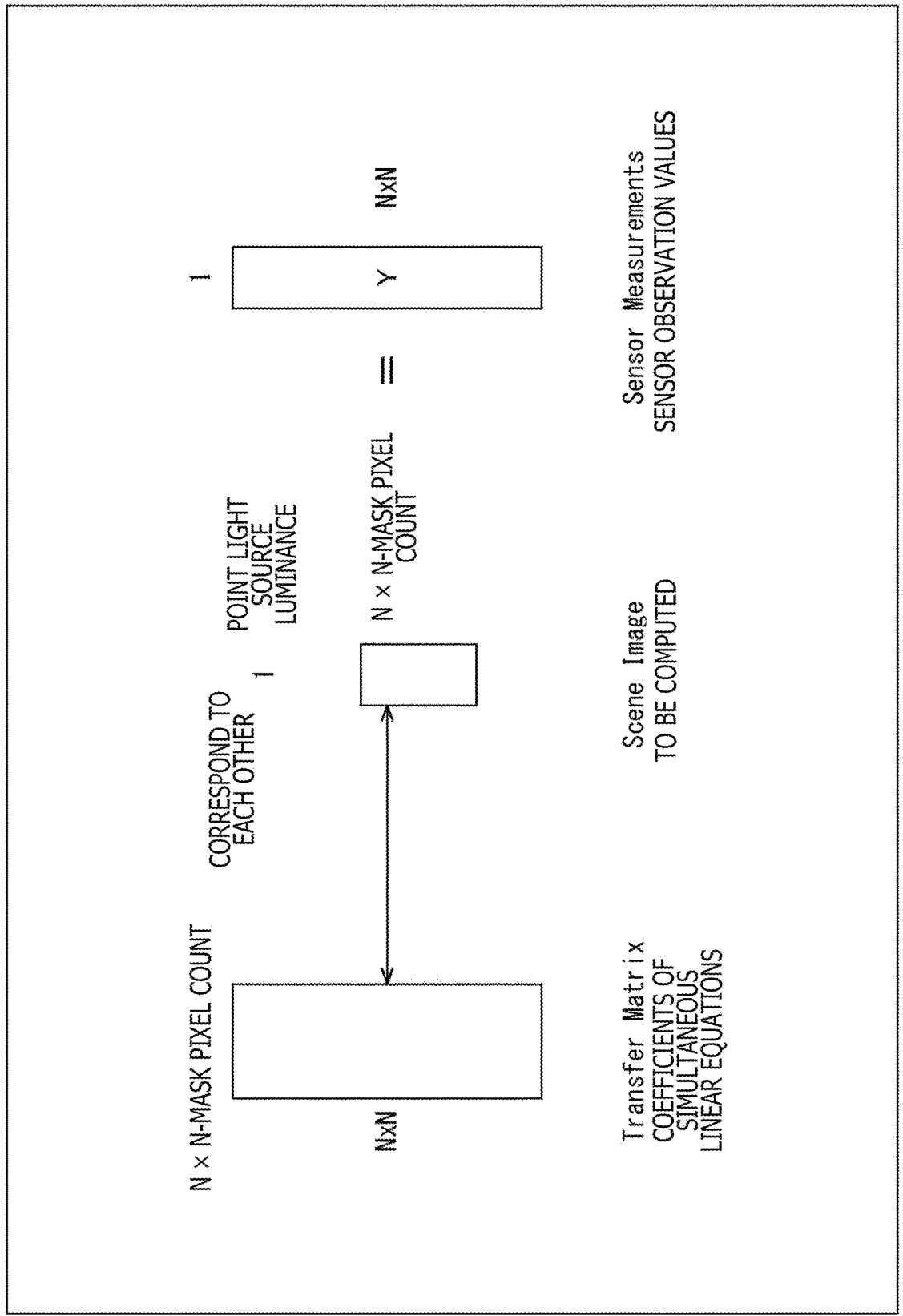
FIG. 28 is a figure for explaining restoration of a restoration region.

In addition, for example, as depicted in FIG. 28, coefficients in a restoration matrix, the coefficients corresponding to non-restoration regions, may be deleted. In a case of the example depicted in FIG. 28, coefficients corresponding to non-restoration regions (the shaded portion in FIG. 27) are deleted. In such a manner, a restoration matrix including coefficients corresponding to regions other than non-restoration regions (i.e. a restoration matrix corresponding to the restoration regions) is generated. By use of the restoration matrix, only restoration images of restoration regions can be created from a detection image.

On the basis of restoration region information, the restoration matrix updating section 104 generates (sets) a non-restoration-region-unrestoring restoration matrix from which coefficients corresponding to non-restoration regions are deleted, that is, a non-restoration-region-unrestoring restoration matrix including only coefficients corresponding to the restoration regions, as described above. That is, the restoration matrix updating section 104 may generate (set) a partial restoration matrix to be used for creating only restoration images of restoration regions, by deleting coefficients not corresponding to the restoration regions in coefficients of a whole restoration matrix which is a restoration matrix corresponding to the whole of a detection image.

When the restoring section 105 creates a restoration image from the detection image by using the non-restoration-region-unrestoring restoration matrix (partial restoration matrix), a restoration image in which pixel values of the non-restoration regions are "0" is obtained. That is, by using the non-restoration-region-unrestoring restoration matrix, the restoring section 105 can create a restoration image such that the non-restoration regions are not restored.

It should be noted that, in this case, the non-restoration-region-unrestoring restoration matrix does not correspond to the whole of the detection image. That is, as described above, the non-restoration-region-unrestoring restoration matrix does not include coefficients corresponding to non-restoration regions. Accordingly, information for associating each coefficient in the non-restoration-region-unrestoring restoration matrix with a pixel in the detection image (e.g. information representing restoration regions (or non-restoration regions) in the detection image) is necessary. On the basis of the information, the restoring section 105 can correctly associate restoration regions in the detection image and the non-restoration-region-unrestoring restoration matrix with each other. Note that the information may be known in advance by the restoring section 105, or may be supplied to the restoring section 105 from the restoration matrix updating section 104 along with the non-restoration-region-unrestoring restoration matrix.

<Procedure of Restoration Image Generation Process>

Figure 29:
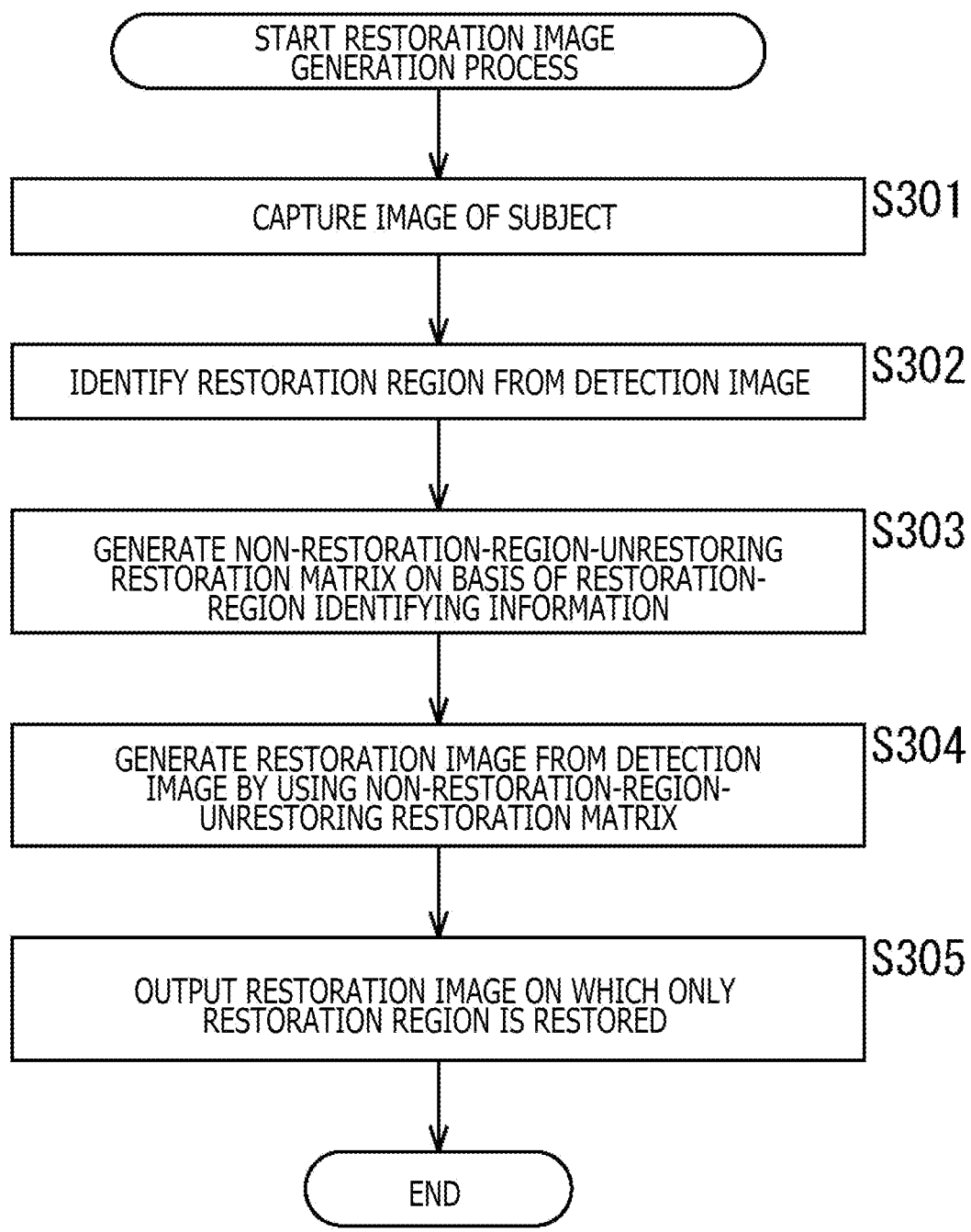
FIG. 29 is a flowchart for explaining an example of the procedure of a restoration image generation process.

An example of the procedure of a restoration image generation process in which the image capturing apparatus 100 captures an image of a subject and creates a restoration image from a detection image obtained thereby, such that non-restoration regions are not restored is explained with reference to the flowchart in FIG. 29.

When the restoration image generation process is started, in step S301, the image capturing section 101 of the image capturing apparatus 100 (FIG. 1) captures an image of a subject by using the image capturing element 121, and generates a detection image.

In step S302, on the basis of training data read out from the training data storage section 103, the region identifying section 102 identifies a restoration region (or a non-restoration region) from the detection image generated in step S301, and generates restoration region information representing the restoration region (or non-restoration region information representing the non-restoration region).

In step S303, on the basis of the restoration region information (or the non-restoration region information) generated in step S302, the restoration matrix updating section 104 updates a restoration matrix corresponding to the whole of the detection image, and generates a non-restoration-region-unrestoring restoration matrix.

In step S304, by using the non-restoration-region-unrestoring restoration matrix generated in step S303, the restoring section 105 creates a restoration image from the detection image generated in step S301, such that the non-restoration region is not restored.

In step S305, the restoring section 105 outputs the restoration image on which only the restoration region is restored in step S304. Note that the process in step S304 may be omitted, and in step S305, the restoring section 105 may output the detection image generated in step S301 and the non-restoration-region-unrestoring restoration matrix generated in step S303 associated with each other.

After the process in step S305 ends, the restoration image generation process ends.

As described above, the region identifying section 102 can control a region to be restored, by identifying a restoration region (non-restoration region). Accordingly, by executing the processes as described above, the image capturing apparatus 100 can create a restoration image such that a certain region is not restored.

3. Second Embodiment

3-1. Example 1 of Image Processing System

Whereas the present technology has been explained by an image capturing apparatus used as an example thus far, the present technology is not limited to this example, and can be applied to any configuration such as an image processing apparatus, an image encoding apparatus, an image decoding apparatus, an information processing apparatus, a communication apparatus, electronic equipment, or a system including multiple apparatuses, for example.

Figure 30:
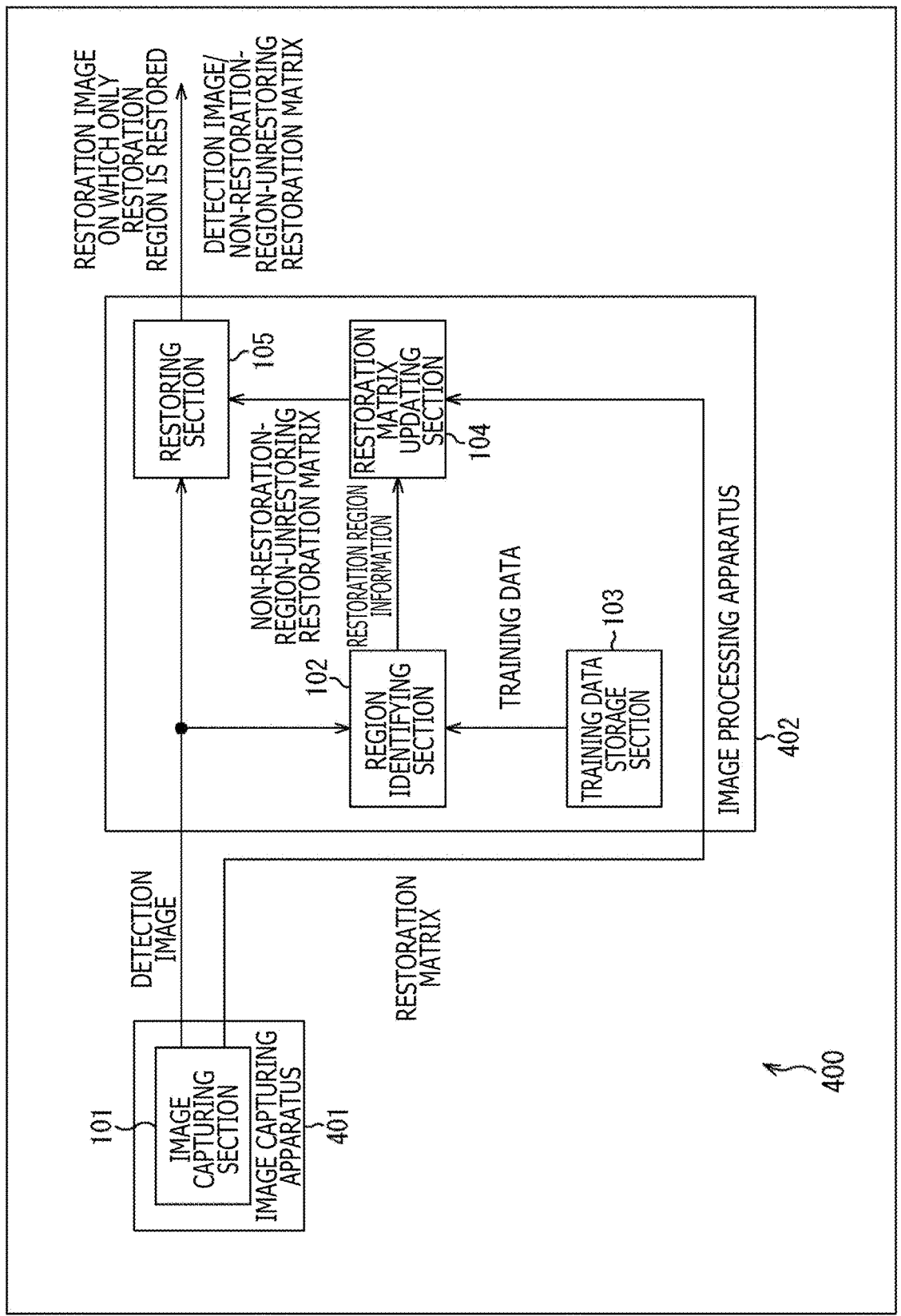
FIG. 30 is a block diagram depicting a main configuration example of an image processing system.

For example, the configuration of the image capturing apparatus 100 described above may be realized by multiple apparatuses. FIG. 30 is a diagram depicting a main configuration example of one embodiment of an image processing system to which the present technology is applied. An image processing system 400 depicted in FIG. 30 is a system having functionalities similar to those of the image capturing apparatus 100, captures an image of a subject, and creates a restoration image from a detection image obtained thereby. That is, similarly to the image capturing apparatus 100, as described above in <1. Identification of Restoration Regions/Non-Restoration Regions>, the image processing system 400 can set a restoration region (a non-restoration region) on a detection image and create a restoration image such that the non-restoration region is not restored.

As depicted in FIG. 30, the image processing system 400 has an image capturing apparatus 401 and an image processing apparatus 402. The image capturing apparatus 401 can generate a detection image by capturing an image of a subject, and output the detection image and a restoration matrix corresponding to the detection image.

The image processing apparatus 402 can acquire a detection image and a restoration matrix corresponding to the detection image supplied from the outside, set a restoration region (or a non-restoration region) on the detection image, and generate restoration region information representing the restoration region (or non-restoration region information representing the non-restoration region). In addition, on the basis of the restoration region information, the image processing apparatus 402 can update the acquired restoration matrix and generate a non-restoration-region-unrestoring restoration matrix to be used when only the restoration region is restored (or restoration is performed such that the non-restoration region is not restored). In addition, by using the non-restoration-region-unrestoring restoration matrix, the image processing apparatus 402 can generate and output, from the acquired detection image, a restoration image on which only the restoration region is restored (or a restoration image created such that the non-restoration region is not restored).

In such a manner, for example, the image processing apparatus 402 can control disclosure/non-disclosure of a certain region on a detection image, control protection/non-protection of information against unauthorized disclosure or unauthorized use, control a target area of image analysis or the like, control the level of a service to be provided, and so on. In addition, because a detection image is transmitted in image transmission from the image capturing apparatus 401 to the image processing apparatus 402, information can be protected, and occurrence of an infringement of the right to privacy or the like due to unauthorized disclosure, unauthorized use, or the like of the image can be reduced.

Figure 31:
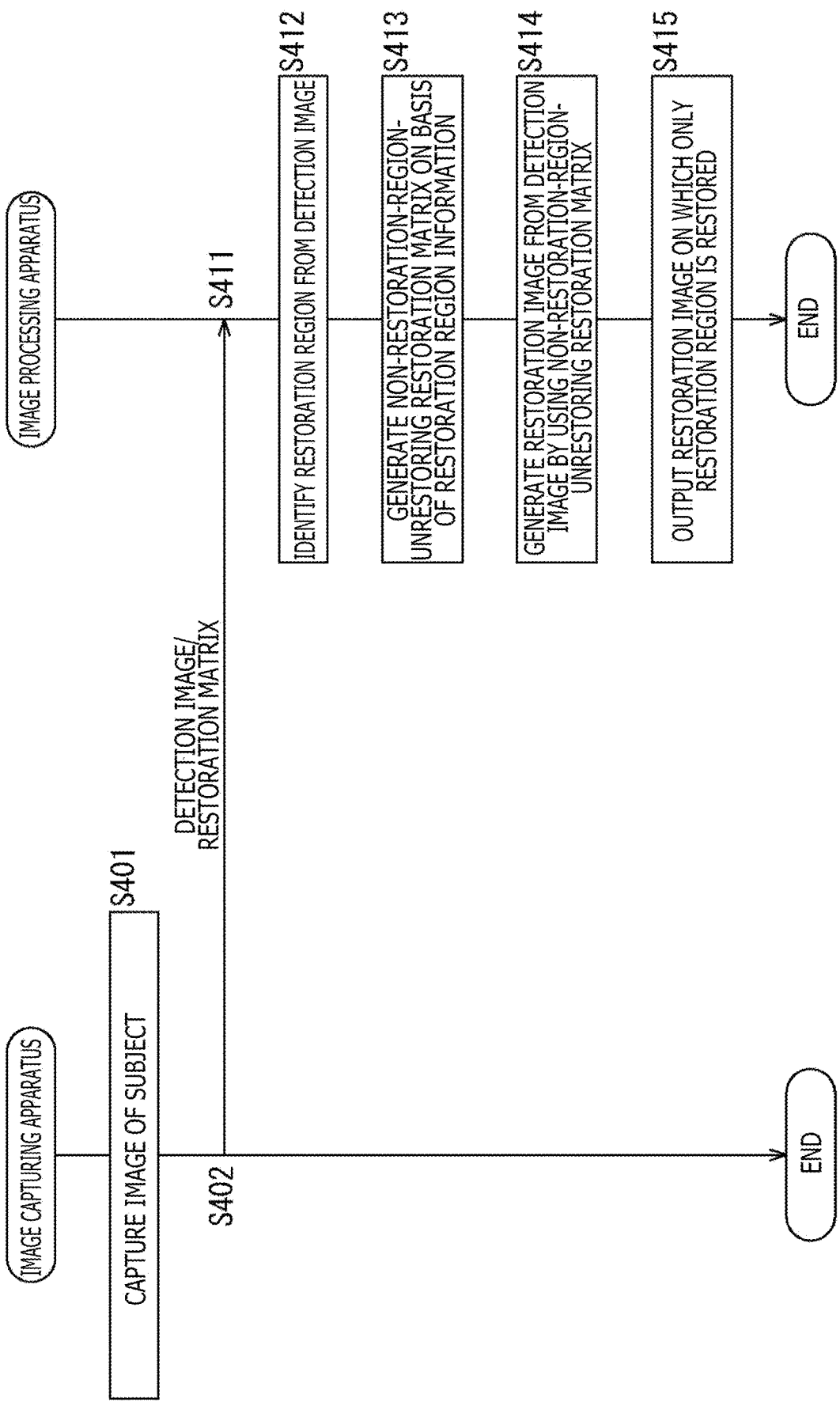
FIG. 31 is a flowchart for explaining an example of the procedure of image processing.

The image capturing apparatus 401 has the image capturing section 101. The image processing apparatus 402 has the region identifying section 102 to the restoring section 105. Each processing section performs processes similar to those in the case of the image capturing apparatus 100. That is, each processing section in the image capturing apparatus 401 and the image processing apparatus 402 performs processes according to a procedure like the flowchart depicted in FIG. 31, for example.

In step S401, the image capturing section 101 of the image capturing apparatus 401 captures an image of a subject by using the image capturing element 121, and generates a detection image. In step S402, the image capturing apparatus 401 supplies, to the image processing apparatus 402, the detection image and a restoration matrix (whole restoration matrix) corresponding to the detection image. In step S411, the image processing apparatus 402 acquires the supplied detection image and restoration matrix.

Note that information exchange between the apparatuses can be performed by any method. For example, the detection image and the restoration matrix may be supplied from the image capturing apparatus 401 to the image processing apparatus 402 by communication via a certain communication medium. A communication method for this can be any method, and may be cable communication, may be wireless communication, or may be both. In addition, for example, the communication may be performed via one or more networks such as the Internet, a LAN (Local Area Network), and the like, and may be performed via another apparatus such as a communication apparatus or a relay apparatus. Further, the communication may be performed via a server or what is generally called cloud computing.

In addition, for example, information may be exchanged via a certain storage medium such as a removable flash memory or hard disk. That is, information to be exchanged may be stored on a certain storage medium connected to a supplier apparatus, the storage medium may be connected to a receiver apparatus, and the information may be read out from the storage medium.

In step S412, on the basis of training data read out from the training data storage section 103, the region identifying section 102 of the image processing apparatus 402 identifies a restoration region (or a non-restoration region) from the detection image acquired in step S411, and generates restoration region information representing the restoration region (or non-restoration region information representing the non-restoration region).

In step S413, on the basis of the restoration region information (or the non-restoration region information), the restoration matrix updating section 104 updates the restoration matrix acquired in step S411, and generates a non-restoration-region-unrestoring restoration matrix.

In step S414, by using the non-restoration-region-unrestoring restoration matrix generated in step S413, the restoring section 105 creates (generates) a restoration image from the detection image acquired in step S411, such that only the restoration region is restored (stated differently, such that the non-restoration region is not restored).

In step S415, the image processing apparatus 402 outputs, to the outside of the image processing apparatus 402, the restoration image which is generated in step S414 and on which only the restoration region is restored (stated differently, the restoration image created such that the non-restoration region is not restored).

This output to the outside may be performed by communication via a certain communication path or may be performed via a certain storage medium (i.e. the information stored on the storage medium is output).

By executing each process in such a manner, the image processing system 400 can control regions to be restored. Accordingly, for example, the image processing system 400 can control disclosure/non-disclosure of a certain region on a detection image, control protection/non-protection of information against unauthorized disclosure or unauthorized use, control a target area of image analysis or the like, control the level of a service to be provided, and so on. In addition, because a detection image is transmitted in image transmission from the image capturing apparatus 401 to the image processing apparatus 402, information can be protected, and occurrence of an infringement of the right to privacy or the like due to unauthorized disclosure, unauthorized use, or the like of the image can be reduced.

Note that the process in step S414 may be omitted and, in step S415, the image processing apparatus 402 may output, to the outside, the detection image and the non-restoration-region-unrestoring restoration matrix associated with each other. That is, the creation of the restoration image may be performed outside the image processing apparatus 402, and, in that case, the restoring section 105 does not perform the restoration, but associates the detection image and the non-restoration-region-unrestoring restoration matrix with each other, and outputs the detection image and the non-restoration-region-unrestoring restoration matrix thus associated with each other to a restoring apparatus that is located outside the image processing apparatus 402 and that performs a restoration process. In such a manner, the image processing apparatus 402 can transmit the image to the restoring apparatus (another apparatus) in a state where the information is protected. Accordingly, occurrence of an infringement of the right to privacy or the like due to unauthorized disclosure, unauthorized use, or the like of the image can be reduced.

In addition, in the image processing system 400 like the one above, the restoring section 105 may be provided to the image capturing apparatus 401. In that case, the restoration matrix updating section 104 supplies the derived non-restoration-region-unrestoring restoration matrix to the restoring section 105 of the image capturing apparatus 401. That is, the non-restoration-region-unrestoring restoration matrix is transmitted from the image processing apparatus 402 to the image capturing apparatus 401. Then, by using the non-restoration-region-unrestoring restoration matrix supplied from the restoration matrix updating section 104 of the image processing apparatus 402, the restoring section 105 of the image capturing apparatus 401 creates (generates) a restoration image from the detection image supplied from the image capturing section 101, such that only the restoration region is restored (stated differently, such that the non-restoration region is not restored).

Further, the restoration matrix updating section 104 may also be provided to the image capturing apparatus 401. In that case, the region identifying section 102 supplies the restoration region information to the restoration matrix updating section 104 of the image capturing apparatus 401. That is, the restoration region information is transmitted from the image processing apparatus 402 to the image capturing apparatus 401. Then, on the basis of the restoration region information supplied from the region identifying section 102 of the image processing apparatus 402, the restoration matrix updating section 104 of the image capturing apparatus 401 updates the restoration matrix supplied from the image capturing section 101, and generates a non-restoration-region-unrestoring restoration matrix. By using the non-restoration-region-unrestoring restoration matrix, the restoring section 105 of the image capturing apparatus 401 creates (generates) a restoration image from the detection image supplied from the image capturing section 101, such that only the restoration region is restored (stated differently, such that the non-restoration region is not restored).

Also in these cases, because a detection image is transmitted in image transmission from the image capturing apparatus 401 to the image processing apparatus 402, the image processing system 400 can protect information and reduce occurrence of an infringement of the right to privacy or the like due to unauthorized disclosure, unauthorized use, or the like of the image.

3-2. Example 2 of Image Processing System

Figure 32:
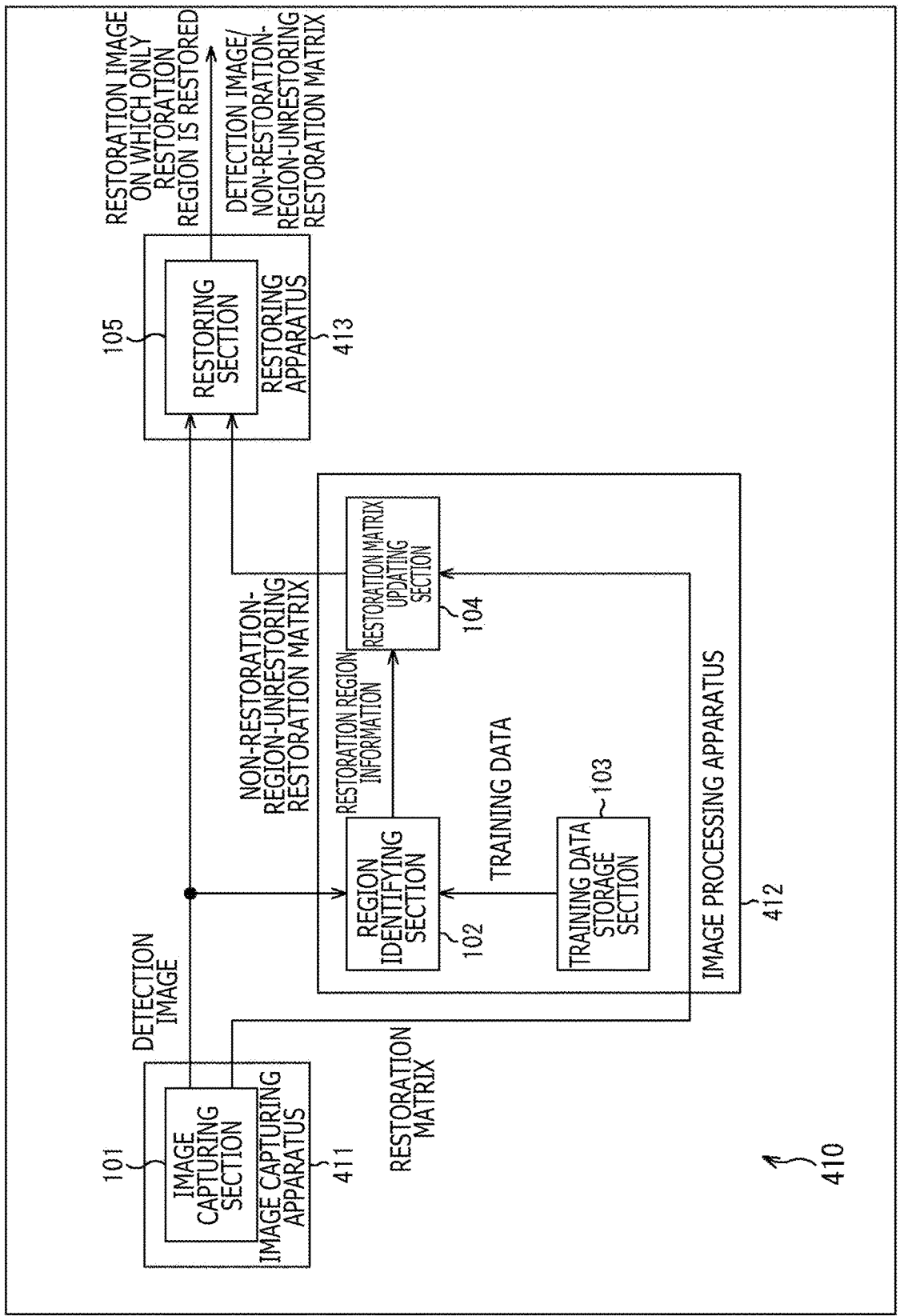
FIG. 32 is a block diagram depicting another configuration example of the image processing system.

FIG. 32 is a diagram depicting a main configuration example of another embodiment of an image processing system to which the present technology is applied. Similarly to the image processing system 400 (FIG. 30), an image processing system 410 depicted in FIG. 32 is a system that captures an image of a subject and creates a restoration image from a detection image obtained thereby. The image processing system 410 can set a restoration region (non-restoration region) on the detection image and create a restoration image such that the non-restoration region is not restored.

As depicted in FIG. 32, the image processing system 410 has an image capturing apparatus 411, an image processing apparatus 412, and a restoring apparatus 413. Similarly to the image capturing apparatus 401, the image capturing apparatus 411 can generate a detection image by capturing an image of a subject, and output the detection image and a restoration matrix corresponding to the detection image.

The image processing apparatus 412 can acquire a detection image and a restoration matrix corresponding to the detection image supplied from the outside, set a restoration region (or a non-restoration region) on the detection image, and generate restoration region information representing the restoration region (or non-restoration region information representing the non-restoration region). In addition, on the basis of the restoration region information, the image processing apparatus 412 can update the acquired restoration matrix, and generate and output a non-restoration-regionunrestoring restoration matrix to be used when only the restoration region is restored (or restoration is performed such that the non-restoration region is not restored).

The restoring apparatus 413 can acquire a non-restoration-region-unrestoring restoration matrix and a detection image supplied from the outside, and, by using the non-restoration-region-unrestoring restoration matrix, can generate and output, from the acquired detection image, a restoration image on which only a restoration region is restored (or a restoration image created such that a non-restoration region is not restored).

Figure 33:
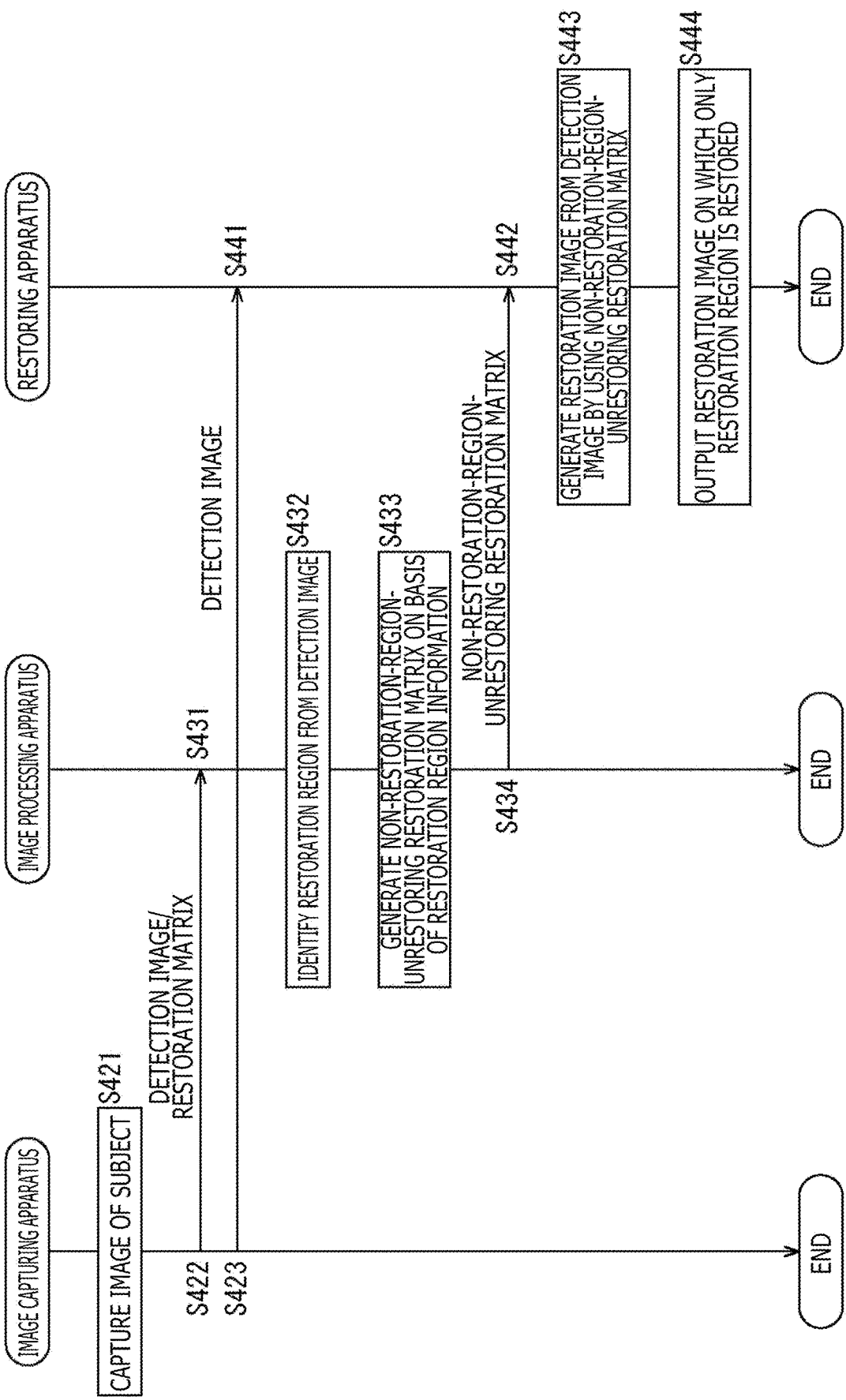
FIG. 33 is a flowchart for explaining another example of the procedure of the image processing.

The image capturing apparatus 411 has the image capturing section 101. The image processing apparatus 412 has the region identifying section 102 to the restoration matrix updating section 104. The restoring apparatus 413 has the restoring section 105. Each processing section performs processes similar to those in the case of the image capturing apparatus 100. That is, each processing section in the image capturing apparatus 411, the image processing apparatus 412, and the restoring apparatus 413 performs processes according to a procedure like the flowchart depicted in FIG. 33, for example.

In step S421, the image capturing section 101 of the image capturing apparatus 411 captures an image of a subject by using the image capturing element 121, and generates a detection image.

In step S422, the image capturing apparatus 411 supplies, to the image processing apparatus 412, the detection image and a restoration matrix (whole restoration matrix) corresponding to the detection image. In step S431, the image processing apparatus 412 acquires the supplied detection image and restoration matrix.

In step S423, the image capturing apparatus 411 supplies the detection image to the restoring apparatus 413. In step S441, the restoring apparatus 413 acquires the supplied detection image. Note that information exchange between the apparatuses can be performed by any method similarly to the case of the image processing system 400.

In step S432, on the basis of training data read out from the training data storage section 103, the region identifying section 102 of the image processing apparatus 412 identifies a restoration region (or a non-restoration region) from the detection image acquired in step S431, and generates restoration region information representing the restoration region (or non-restoration region information representing the non-restoration region).

In step S433, on the basis of the restoration region information (or the non-restoration region information), the restoration matrix updating section 104 updates the restoration matrix acquired in step S431, and generates a non-restoration-region-unrestoring restoration matrix.

In step S434, the image processing apparatus 412 supplies the non-restoration-region-unrestoring restoration matrix to the restoring apparatus 413. In step S442, the restoring apparatus 413 acquires the supplied non-restoration-region-unrestoring restoration matrix.

In step S443, by using the non-restoration-region-unrestoring restoration matrix acquired in step S442, the restoring section 105 of the restoring apparatus 413 creates (generates) a restoration image from the detection image acquired in step S441, such that only the restoration region is restored (stated differently, such that the non-restoration region is not restored).

In step S444, the restoring apparatus 413 outputs, to the outside of the restoring apparatus 413, the restoration image which is generated in step S443 and on which only the restoration region is restored (stated differently, the restoration image created such that the non-restoration region is not restored).

This output to the outside may be performed by communication via a certain communication path or may be performed via a certain storage medium (i.e. the information stored on the storage medium is output).

In such a manner, the restoring apparatus 413 can output an image in which information regarding a desired region in the image is protected. As a result, occurrence of an infringement of the right to privacy or the like due to unauthorized disclosure, unauthorized use, or the like of the image can be reduced. In addition, by executing each process in such a manner, the image processing system 410 can control regions to be restored. Accordingly, for example, the image processing system 410 can control disclosure/non-disclosure of a certain region on a detection image, control protection/non-protection of information against unauthorized disclosure or unauthorized use, control a target area of image analysis or the like, control the level of a service to be provided, and so on. Further, because an image is transmitted as a detection image from the image capturing apparatus 411 to the restoring apparatus 413, the transmission can be performed in a state where information is protected, and occurrence of an infringement of the right to privacy or the like due to unauthorized disclosure, unauthorized use, or the like of the image can be reduced. In addition, a restoration matrix corresponding to the detection image is transmitted from the image capturing apparatus 401 to the restoring apparatus 413 through a path different from that for the detection image (via the image processing apparatus 412). Accordingly, unauthorized disclosure of information can be reduced more.

Note that the process in step S443 may be omitted and, in step S444, the restoring apparatus 413 may output, to the outside, the detection image and the non-restoration-region-unrestoring restoration matrix associated with each other. That is, the creation of the restoration image may be performed outside the restoring apparatus 413, and, in that case, the restoring section 105 does not perform the restoration, but associates the detection image and the non-restoration-region-unrestoring restoration matrix with each other, and outputs the detection image and the non-restoration-region-unrestoring restoration matrix to another restoring apparatus that is located outside the restoring apparatus 413 and that performs a restoration process. In such a manner, the restoring apparatus 413 can transmit the image to another restoring apparatus in a state where the information is protected. Accordingly, occurrence of an infringement of the right to privacy or the like due to unauthorized disclosure, unauthorized use, or the like of the image can be reduced.

In addition, whereas it is explained above that the detection image is supplied from the image capturing apparatus 411 to the restoring apparatus 413, the detection image may be supplied via the image processing apparatus 412. That is, the image processing apparatus 412 may supply, to the restoring apparatus 413, the detection image supplied from the image capturing apparatus 411 and the non-restoration-region-unrestoring restoration matrix generated for the detection image. Also in that case, because the image is transmitted as the detection image from the image capturing apparatus 411 to the restoring apparatus 413, unauthorized disclosure of information can be reduced more.

3-3. Example 3 of Image Processing System

Figure 34:
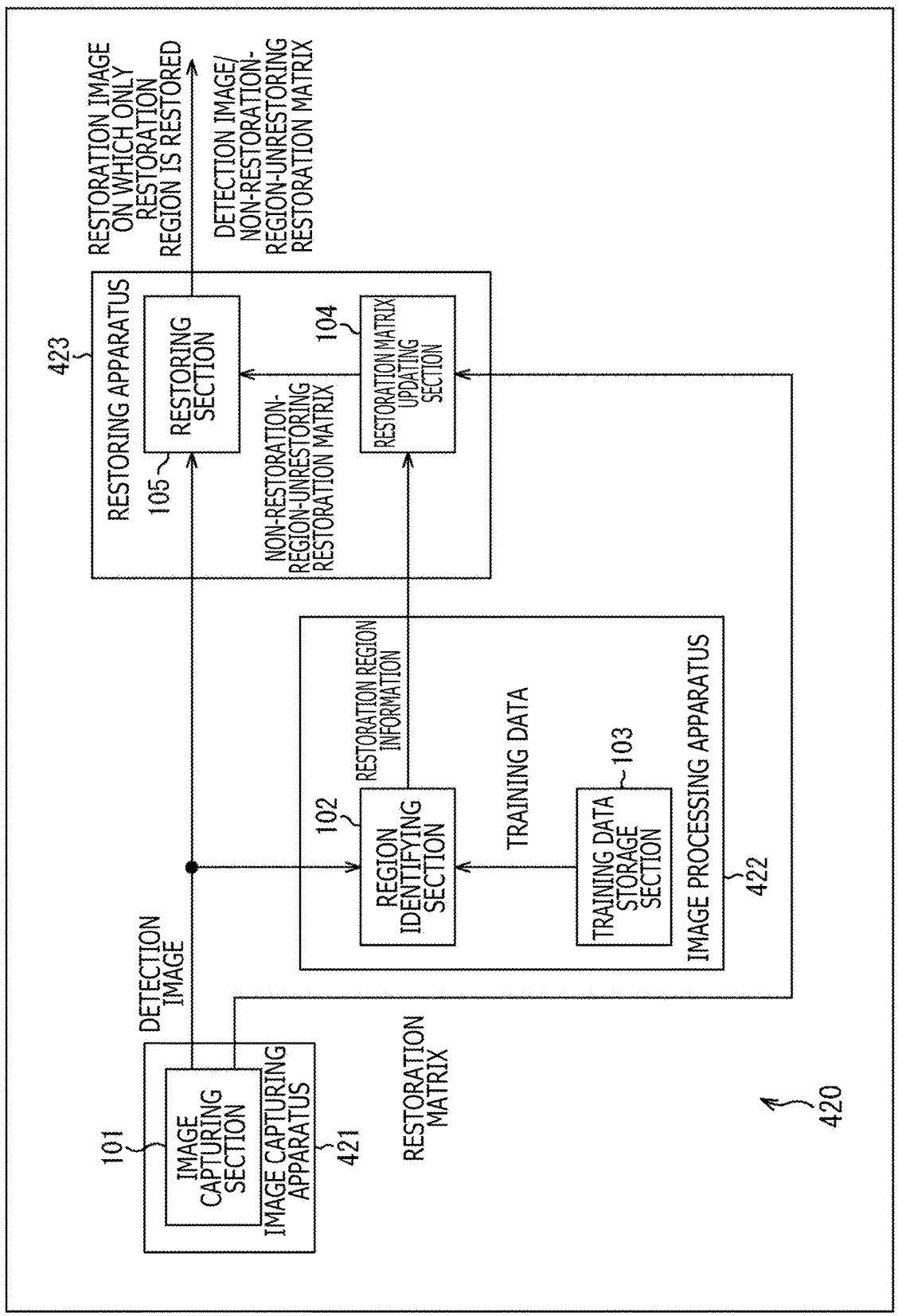
FIG. 34 is a block diagram depicting still another configuration example of the image processing system.

FIG. 34 is a diagram depicting a main configuration example of another embodiment of an image processing system to which the present technology is applied. Similarly to the image processing system 410 (FIG. 32), an image processing system 420 depicted in FIG. 34 is a system that captures an image of a subject and creates a restoration image from a detection image obtained thereby. The image processing system 420 can set a restoration region (non-restoration region) on the detection image and create a restoration image such that the non-restoration region is not restored.

As depicted in FIG. 34, the image processing system 420 has an image capturing apparatus 421, an image processing apparatus 422, and a restoring apparatus 423. The image capturing apparatus 421 can generate a detection image by capturing an image of a subject, and output the detection image and a restoration matrix corresponding to the detection image.

The image processing apparatus 422 can acquire a detection image and a restoration matrix corresponding to the detection image supplied from the outside, set a restoration region (or a non-restoration region) on the detection image, and generate and output restoration region information representing the restoration region (or non-restoration region information representing the non-restoration region).

The restoring apparatus 423 can acquire a non-restoration-region-unrestoring restoration matrix and a detection image supplied from the outside, update the acquired restoration matrix on the basis of the restoration region information, and generate a non-restoration-region-unrestoring restoration matrix to be used when only a restoration region is restored (or restoration is performed such that a non-restoration region is not restored). In addition, by using the non-restoration-region-unrestoring restoration matrix, the restoring apparatus 423 can generate and output, from the acquired detection image, a restoration image on which only the restoration region is restored (or a restoration image created such that the non-restoration region is not restored).

Figure 35:
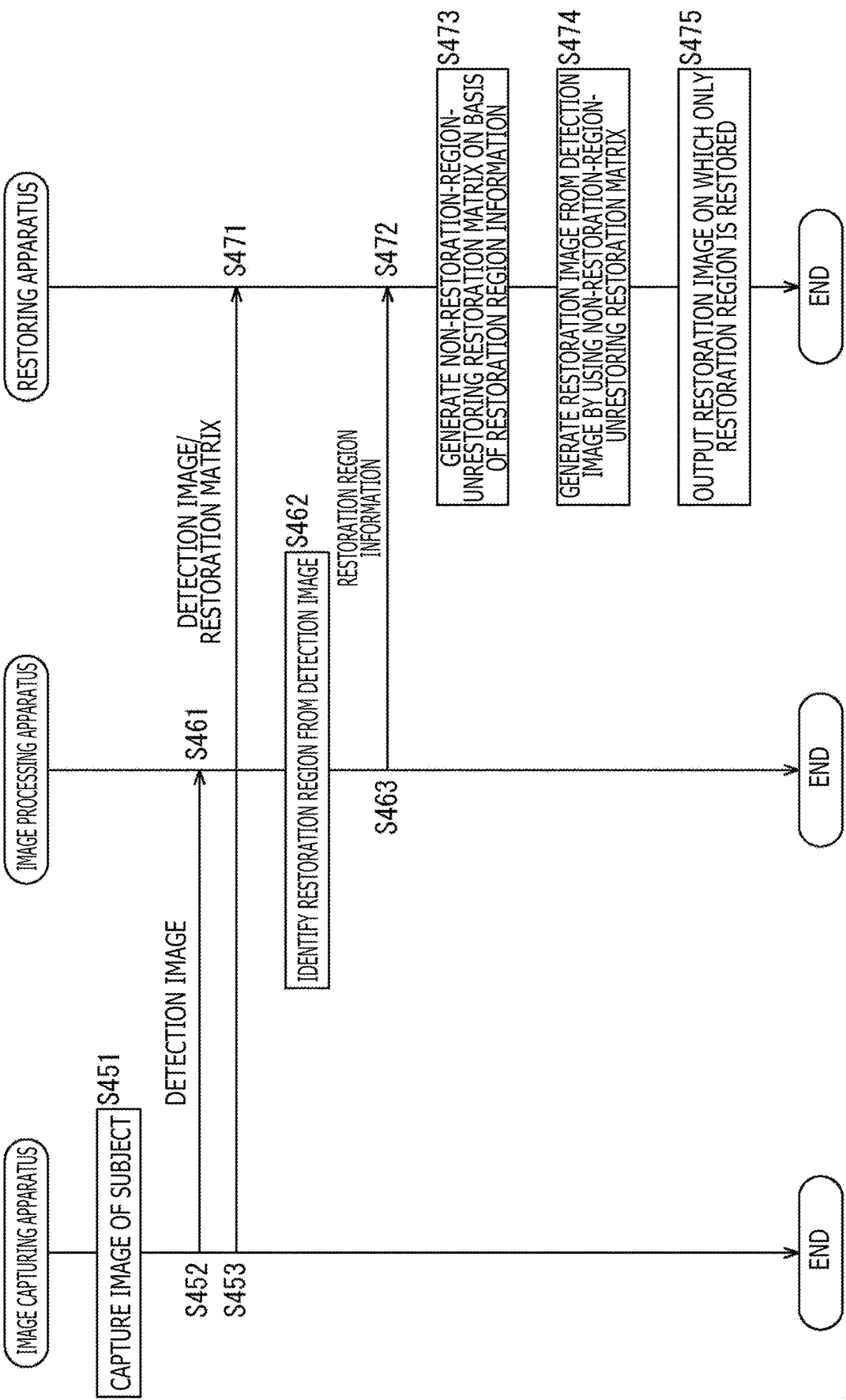
FIG. 35 is a flowchart for explaining still another example of the procedure of the image processing.

The image capturing apparatus 421 has the image capturing section 101. The image processing apparatus 422 has the region identifying section 102 and the training data storage section 103. The restoring apparatus 423 has the restoration matrix updating section 104 and the restoring section 105. Each processing section performs processes similar to those in the case of the image capturing apparatus 100. That is, each processing section in the image capturing apparatus 421, the image processing apparatus 422, and the restoring apparatus 423 performs processes according to a procedure like the flowchart depicted in FIG. 35, for example.

In step S451, the image capturing section 101 of the image capturing apparatus 421 captures an image of a subject by using the image capturing element 121, and generates a detection image.

In step S452, the image capturing apparatus 421 supplies the detection image to the image processing apparatus 422. In step S461, the image processing apparatus 422 acquires the supplied detection image. Note that information exchange between the apparatuses can be performed by any method similarly to the case of the image processing system 400.

In step S453, the image capturing apparatus 421 supplies, to the restoring apparatus 423, the detection image and a restoration matrix (whole restoration matrix) corresponding to the detection image. In step S471, the restoring apparatus 423 acquires the supplied detection image and restoration matrix.

In step S462, on the basis of training data read out from the training data storage section 103, the region identifying section 102 of the image processing apparatus 422 identifies a restoration region (or a non-restoration region) from the detection image acquired in step S461, and generates restoration region information representing the restoration region (or non-restoration region information representing the non-restoration region).

In step S463, the image processing apparatus 422 supplies the restoration region information (or the non-restoration region information) to the restoring apparatus 423. In step S472, the restoring apparatus 423 acquires the supplied restoration region information (or non-restoration region information).

In step S473, on the basis of the restoration region information (or the non-restoration region information) acquired in step S472, the restoration matrix updating section 104 of the restoring apparatus 423 updates the restoration matrix acquired in step S471, and generates a non-restoration-region-unrestoring restoration matrix.

In step S474, by using the non-restoration-region-unrestoring restoration matrix, the restoring section 105 creates (generates) a restoration image from the detection image acquired in step S471, such that only the restoration region is restored (stated differently, such that the non-restoration region is not restored).

In step S475, the restoring apparatus 423 outputs, to the outside of the restoring apparatus 423, the restoration image which is generated in step S474 and on which only the restoration region is restored (stated differently, the restoration image created such that the non-restoration region is not restored).

This output to the outside may be performed by communication via a certain communication path or may be performed via a certain storage medium (i.e. the information stored on the storage medium is output).

In such a manner, the restoring apparatus 423 can output an image in which information regarding a desired region in the image is protected. As a result, occurrence of an infringement of the right to privacy or the like due to unauthorized disclosure, unauthorized use, or the like of the image can be reduced. In addition, by executing each process in such a manner, the image processing system 420 can control regions to be restored. Accordingly, for example, the image processing system 420 can control disclosure/non-disclosure of a certain region on a detection image, control protection/non-protection of information against unauthorized disclosure or unauthorized use, control a target area of image analysis or the like, control the level of a service to be provided, and so on. Further, because an image is transmitted as a detection image from the image capturing apparatus 421 to the restoring apparatus 423, the transmission can be performed in a state where information is protected, and occurrence of an infringement of the right to privacy or the like due to unauthorized disclosure, unauthorized use, or the like of the image can be reduced. In addition, because the updating of the restoration matrix is performed at the restoring apparatus 423 in this case, the load of the image processing apparatus 422 can be reduced as compared to the case depicted in FIG. 32.

Note that the process in step S474 may be omitted and, in step S475, the restoring apparatus 423 may output, to the outside, the detection image and the non-restoration-region-unrestoring restoration matrix associated with each other. That is, the creation of the restoration image may be performed outside the restoring apparatus 423, and, in that case, the restoring section 105 does not perform the restoration, but associates the detection image and the non-restoration-region-unrestoring restoration matrix with each other, and outputs the detection image and the non-restoration-region-unrestoring restoration matrix to another restoring apparatus that is located outside the restoring apparatus 423 and that performs a restoration process. In such a manner, the restoring apparatus 423 can transmit the image to another restoring apparatus in a state where the information is protected. Accordingly, occurrence of an infringement of the right to privacy or the like due to unauthorized disclosure, unauthorized use, or the like of the image can be reduced.

In addition, whereas it is explained above that the detection image is supplied from the image capturing apparatus 421 to the restoring apparatus 423, the detection image may be supplied to the restoring apparatus 423 via the image processing apparatus 422. That is, the image processing apparatus 422 may supply, to the restoring apparatus 423, the detection image supplied from the image capturing apparatus 421 and the restoration region information (or non-restoration region information) generated for the detection image. Similarly, the restoration matrix may be supplied to the restoring apparatus 423 via the image processing apparatus 422. That is, the image processing apparatus 422 may supply, to the restoring apparatus 423, the restoration matrix supplied from the image capturing apparatus 421 and the restoration region information (or non-restoration region information) generated for the restoration matrix. Needless to say, the detection image and the restoration image may be supplied to the restoring apparatus 423 via the image processing apparatus 422.

3-4. Example 4 of Image Processing System

Figure 36:
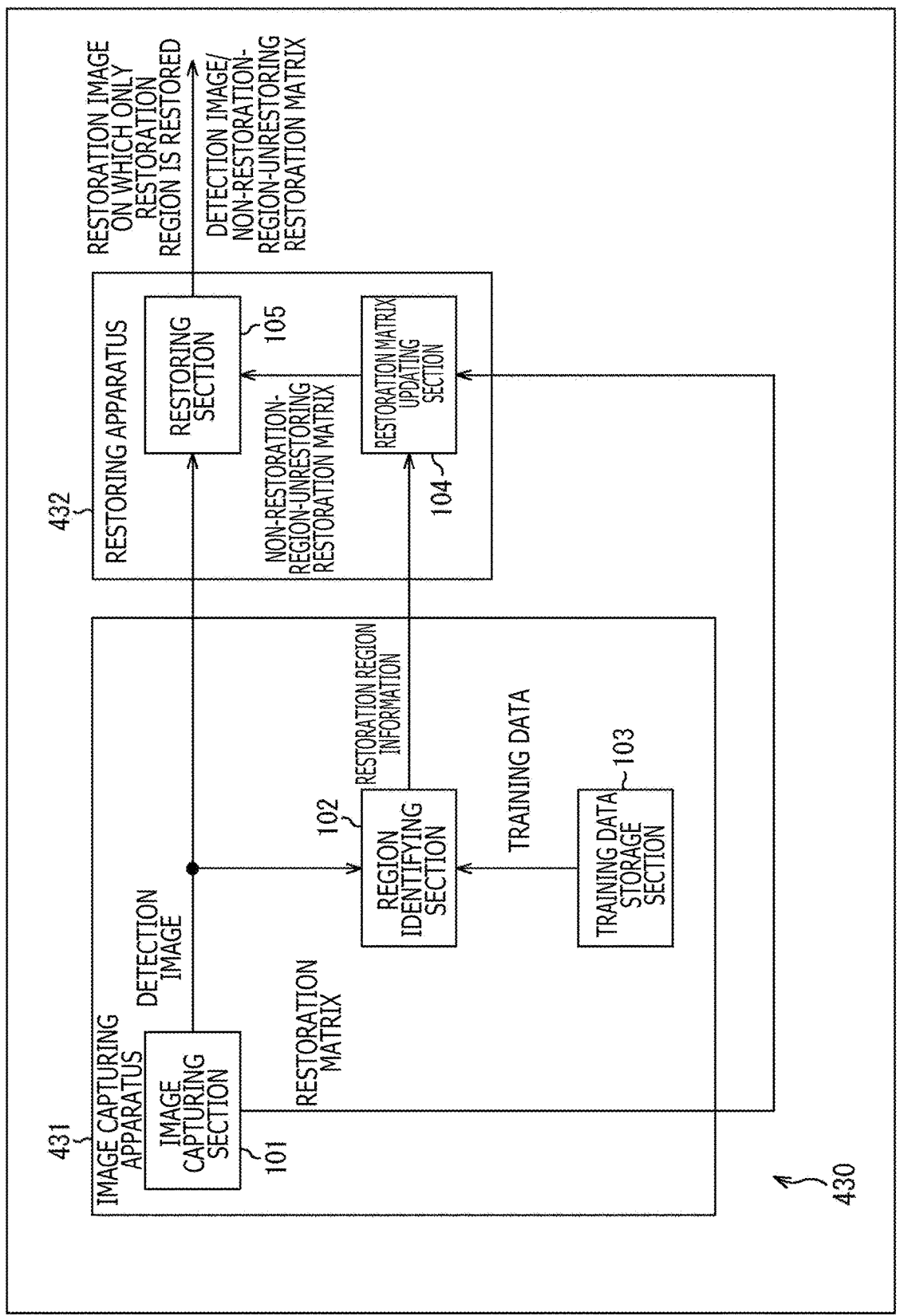
FIG. 36 is a block diagram depicting yet another configuration example of the image processing system.

FIG. 36 is a diagram depicting a main configuration example of another embodiment of an image processing system to which the present technology is applied. Similarly to the image processing system 420 (FIG. 34), an image processing system 430 depicted in FIG. 36 is a system that captures an image of a subject and creates a restoration image from a detection image obtained thereby. The image processing system 430 can set a restoration region (non-restoration region) on the detection image and create a restoration image such that the non-restoration region is not restored.

As depicted in FIG. 36, the image processing system 430 has an image capturing apparatus 431 and a restoring apparatus 432. The image capturing apparatus 431 can generate a detection image by capturing an image of a subject, and output the detection image and a restoration matrix corresponding to the detection image. In addition, the image capturing apparatus 431 can set a restoration region (or a non-restoration region) on the detection image, and generate and output restoration region information representing the restoration region (or non-restoration region information representing the non-restoration region).

The restoring apparatus 432 can acquire a detection image supplied from the outside and a restoration matrix and restoration region information corresponding to the detection image. In addition, on the basis of the acquired restoration region information, the restoring apparatus 432 can update the acquired restoration matrix and generate a non-restoration-region-unrestoring restoration matrix to be used when only the restoration region is restored (or restoration is performed such that the non-restoration region is not restored). Further, by using the non-restoration-region-unrestoring restoration matrix, the restoring apparatus 432 can generate and output, from the acquired detection image, a restoration image on which only the restoration region is restored (or a restoration image created such that the non-restoration region is not restored).

Figure 37:
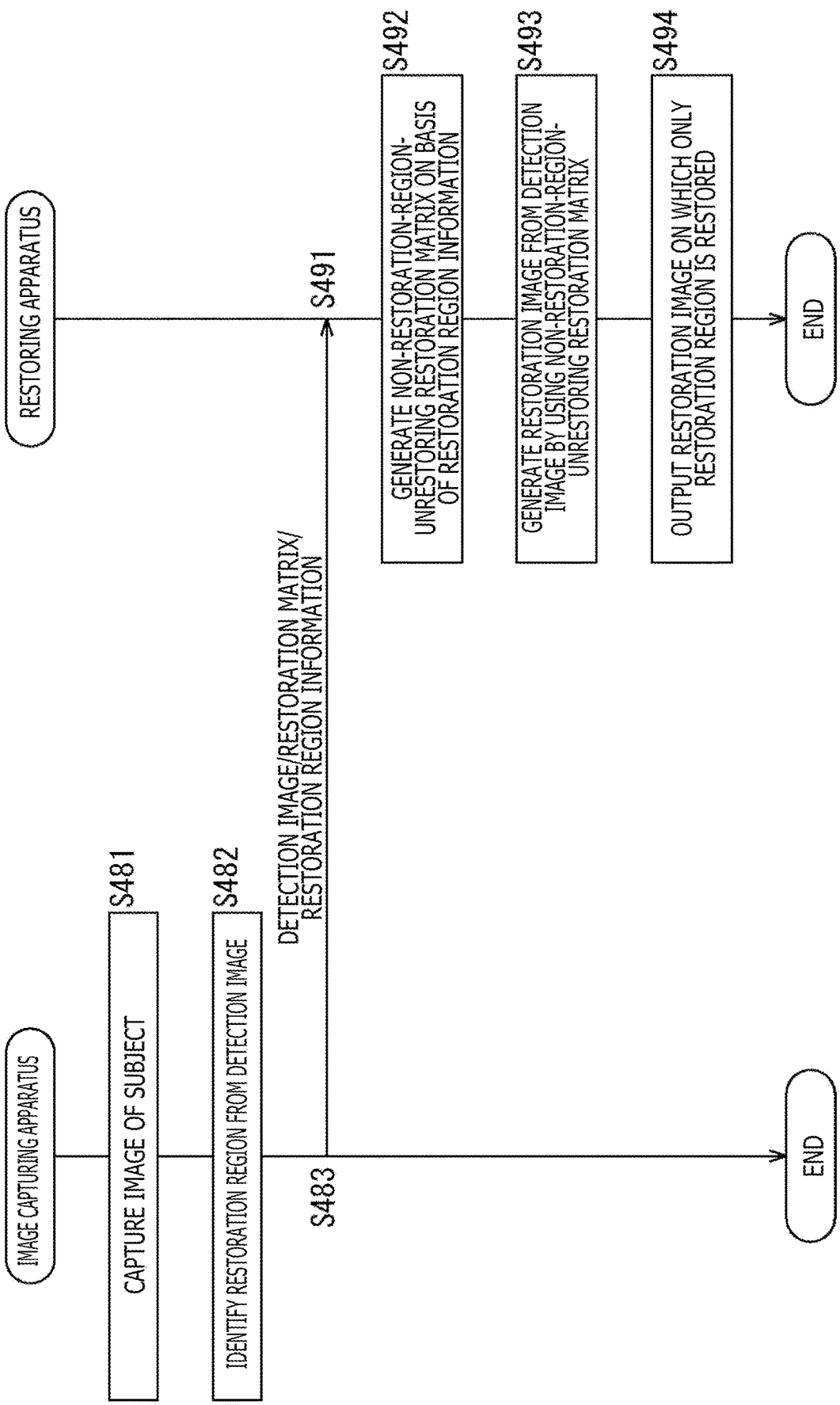
FIG. 37 is a flowchart for explaining yet another example of the procedure of the image processing.

The image capturing apparatus 431 has the image capturing section 101, the region identifying section 102, and the training data storage section 103. The restoring apparatus 432 has the restoration matrix updating section 104 and the restoring section 105. Each processing section performs processes similar to those in the case of the image capturing apparatus 100. That is, each processing section in the image capturing apparatus 431 and the restoring apparatus 432 performs processes according to a procedure like the flowchart depicted in FIG. 37, for example.

In step S481, the image capturing section 101 of the image capturing apparatus 431 captures an image of a subject by using the image capturing element 121, and generates a detection image.

In step S482, on the basis of training data read out from the training data storage section 103, the region identifying section 102 identifies a restoration region (or a non-restoration region) from the detection image generated in step S481, and generates restoration region information representing the restoration region (or non-restoration region information representing the non-restoration region).

In step S483, the image capturing apparatus 431 supplies, to the restoring apparatus 432, the detection image, the restoration matrix corresponding to the detection image, and the restoration region information (or the non-restoration region information). In step S491, the restoring apparatus 432 acquires the supplied detection image, restoration matrix, and restoration region information (or non-restoration region information). Note that information exchange between the apparatuses can be performed by any method similarly to the case of the image processing system 400.

In step S492, on the basis of the restoration region information (or the non-restoration region information) acquired in step S491, the restoration matrix updating section 104 of the restoring apparatus 432 updates the restoration matrix acquired in step S491, and generates a non-restoration-region-unrestoring restoration matrix.

In step S493, by using the non-restoration-region-unrestoring restoration matrix, the restoring section 105 creates (generates) a restoration image from the detection image acquired in step S491, such that only the restoration region is restored (stated differently, such that the non-restoration region is not restored).

In step S494, the restoring apparatus 432 outputs, to the outside of the restoring apparatus 432, the restoration image which is generated in step S493 and on which only the restoration region is restored (stated differently, the restoration image created such that the non-restoration region is not restored).

This output to the outside may be performed by communication via a certain communication path or may be performed via a certain storage medium (i.e. the information stored on the storage medium is output).

In such a manner, the restoring apparatus 432 can output an image in which information regarding a desired region in the image is protected. As a result, occurrence of an infringement of the right to privacy or the like due to unauthorized disclosure, unauthorized use, or the like of the image can be reduced. In addition, by executing each process in such a manner, the image processing system 430 can control regions to be restored. Accordingly, for example, the image processing system 430 can control disclosure/non-disclosure of a certain region on a detection image, control protection/non-protection of information against unauthorized disclosure or unauthorized use, control a target area of image analysis or the like, control the level of a service to be provided, and so on. Further, because an image is transmitted as a detection image from the image capturing apparatus 431 to the restoring apparatus 432, the transmission can be performed in a state where information is protected, and occurrence of an infringement of the right to privacy or the like due to unauthorized disclosure, unauthorized use, or the like of the image can be reduced.

Note that the process in step S493 may be omitted and, in step S494, the restoring apparatus 432 may output, to the outside, the detection image and the non-restoration-region-unrestoring restoration matrix associated with each other. That is, the creation of the restoration image may be performed outside the restoring apparatus 432, and, in that case, the restoring section 105 does not perform the restoration, but associates the detection image and the non-restoration-region-unrestoring restoration matrix with each other, and outputs the detection image and the non-restoration-region-unrestoring restoration matrix to another restoring apparatus that is located outside the restoring apparatus 432 and that performs a restoration process. In such a manner, the restoring apparatus 432 can transmit the image to another restoring apparatus in a state where the information is protected. Accordingly, occurrence of an infringement of the right to privacy or the like due to unauthorized disclosure, unauthorized use, or the like of the image can be reduced.

3-5. Example 5 of Image Processing System

Figure 38:
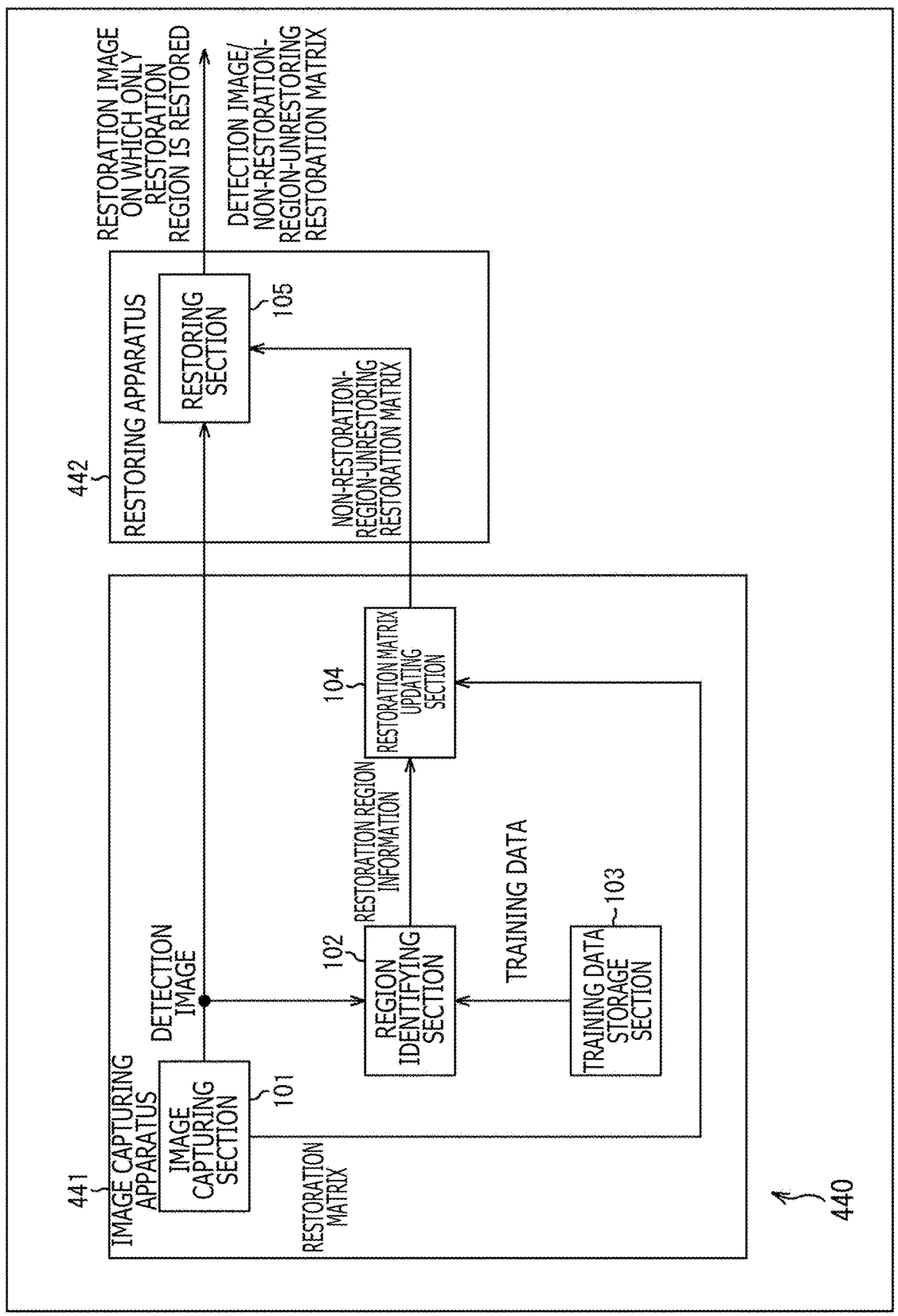
FIG. 38 is a block diagram depicting a further configuration example of the image processing system.

FIG. 38 is a diagram depicting a main configuration example of another embodiment of an image processing system to which the present technology is applied. Similarly to the image processing system 430 (FIG. 36), an image processing system 440 depicted in FIG. 38 is a system that captures an image of a subject and creates a restoration image from a detection image obtained thereby. The image processing system 440 can set a restoration region (non-restoration region) on the detection image and create a restoration image such that the non-restoration region is not restored.

As depicted in FIG. 38, the image processing system 440 has an image capturing apparatus 441 and a restoring apparatus 442. The image capturing apparatus 441 can generate a detection image by capturing an image of a subject, and output the detection image. In addition, the image capturing apparatus 441 can set a restoration region (or a non-restoration region) on the detection image, and generate restoration region information representing the restoration region (or non-restoration region information representing the non-restoration region). Further, on the basis of the restoration region information, the image capturing apparatus 441 can update a restoration matrix corresponding to the generated detection image, and generate and output a non-restoration-region-unrestoring restoration matrix to be used when only the restoration region is restored (or restoration is performed such that the non-restoration region is not restored).

The restoring apparatus 442 can acquire a detection image and a non-restoration-region-unrestoring restoration matrix supplied from the outside. In addition, by using the non-restoration-region-unrestoring restoration matrix, the restoring apparatus 442 can generate and output, from the detection image, a restoration image on which only a restoration region is restored (or a restoration image created such that a non-restoration region is not restored).

Figure 39:
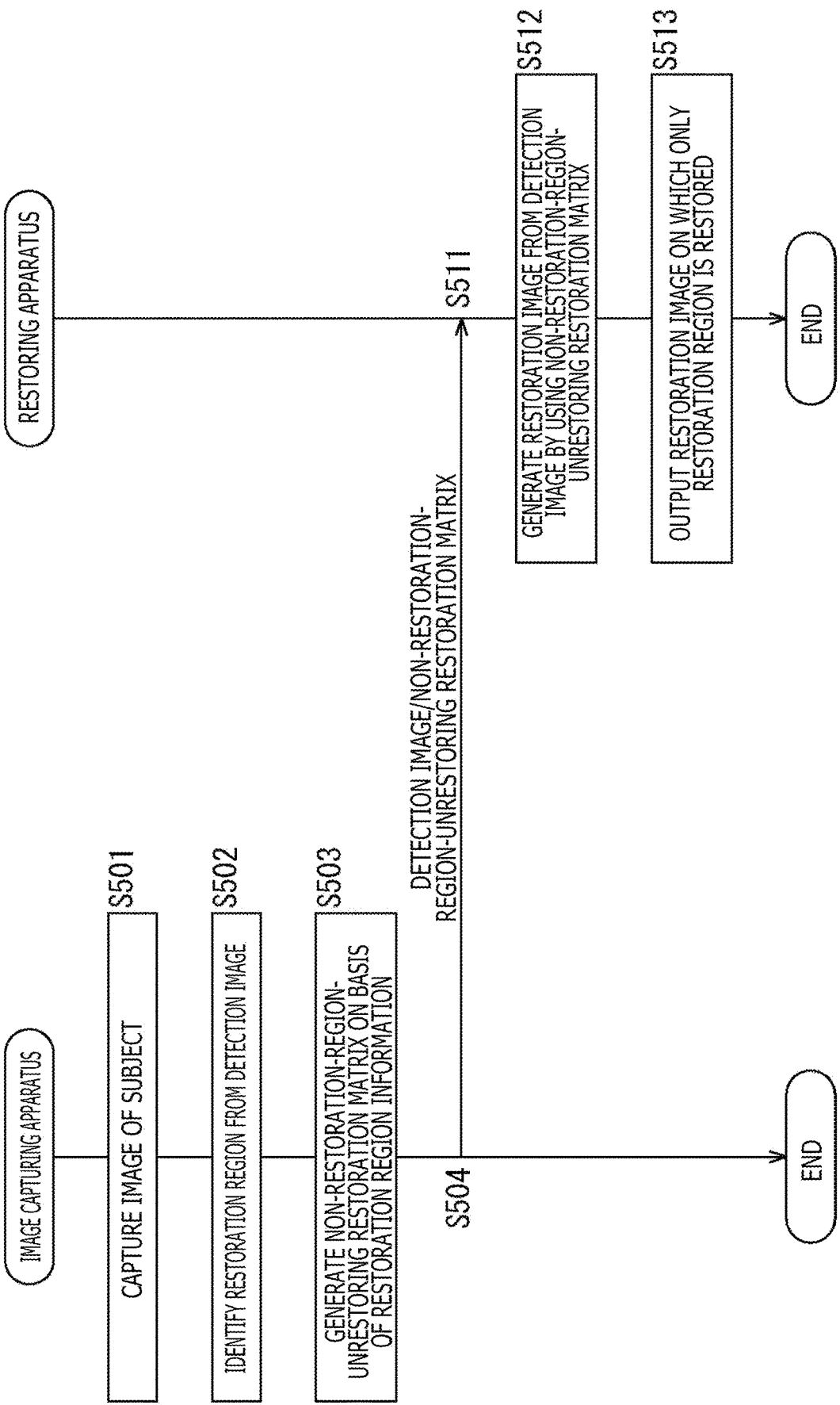
FIG. 39 is a flowchart for explaining a further example of the procedure of the image processing.

The image capturing apparatus 441 has the image capturing section 101 to the restoration matrix updating section 104. The restoring apparatus 442 has the restoring section 105. Each processing section performs processes similar to those in the case of the image capturing apparatus 100. That is, each processing section in the image capturing apparatus 441 and the restoring apparatus 442 performs processes according to a procedure like the flowchart depicted in FIG. 39, for example.

In step S501, the image capturing section 101 of the image capturing apparatus 441 captures an image of a subject by using the image capturing element 121, and generates a detection image.

In step S502, on the basis of training data read out from the training data storage section 103, the region identifying section 102 identifies a restoration region (or a non-restoration region) from the detection image generated in step S501, and generates restoration region information representing the restoration region (or non-restoration region information representing the non-restoration region).

In step S503, on the basis of the restoration region information (or the non-restoration region information) generated in step S502, the restoration matrix updating section 104 updates a restoration matrix corresponding to the detection image generated in step S501, and generates a non-restoration-region-unrestoring restoration matrix.

In step S504, the image capturing apparatus 441 supplies the detection image and the non-restoration-region-unrestoring restoration matrix to the restoring apparatus 442. In step S511, the restoring apparatus 442 acquires the supplied detection image and non-restoration-region-unrestoring restoration matrix. Note that information exchange between the apparatuses can be performed by any method similarly to the case of the image processing system 400.

In step S512, by using the non-restoration-region-unrestoring restoration matrix acquired in step S511, the restoring section 105 of the restoring apparatus 442 creates (generates) a restoration image from the detection image acquired in step S511, such that only the restoration region is restored (stated differently, such that the non-restoration region is not restored).

In step S513, the restoring apparatus 442 outputs, to the outside of the restoring apparatus 442, the restoration image which is generated in step S512 and on which only the restoration region is restored (stated differently, the restoration image created such that the non-restoration region is not restored).

This output to the outside may be performed by communication via a certain communication path or may be performed via a certain storage medium (i.e. the information stored on the storage medium is output).

In such a manner, the restoring apparatus 442 can output an image in which information regarding a desired region in the image is protected. As a result, occurrence of an infringement of the right to privacy or the like due to unauthorized disclosure, unauthorized use, or the like of the image can be reduced. In addition, by executing each process in such a manner, the image processing system 440 can control regions to be restored. Accordingly, for example, the image processing system 440 can control disclosure/non-disclosure of a certain region on a detection image, control protection/non-protection of information against unauthorized disclosure or unauthorized use, control a target area of image analysis or the like, control the level of a service to be provided, and so on. Further, because an image is transmitted as a detection image from the image capturing apparatus 441 to the restoring apparatus 442, the transmission can be performed in a state where information is protected, and occurrence of an infringement of the right to privacy or the like due to unauthorized disclosure, unauthorized use, or the like of the image can be reduced.

Note that the process in step S512 may be omitted and, in step S513, the restoring apparatus 442 may output, to the outside, the detection image and non-restoration-region-unrestoring restoration matrix that are acquired in step S511 associated with each other. That is, the creation of the restoration image may be performed outside the restoring apparatus 442, and, in that case, the restoring section 105 does not perform the restoration, but associates the detection image and the non-restoration-region-unrestoring restoration matrix with each other, and outputs the detection image and the non-restoration-region-unrestoring restoration matrix to another restoring apparatus that is located outside the restoring apparatus 442 and that performs a restoration process. In such a manner, the restoring apparatus 442 can transmit the image to another restoring apparatus in a state where the information is protected. Accordingly, occurrence of an infringement of the right to privacy or the like due to unauthorized disclosure, unauthorized use, or the like of the image can be reduced.

4. Use Examples

Next, use examples of apparatuses, systems, and the like to which the present technology is applied are explained.

<Vehicle-Mounted Apparatuses/Systems>

In recent years, developments are underway for apparatuses and systems in which a camera is installed on a vehicle, captured images captured by the camera are analyzed, and warnings, alerts, guidance, etc. is/are given as appropriate on the basis of results of the analysis. In addition, developments are underway also for apparatuses and systems that control operation of an accelerator, a brake, a steering wheel, or the like (operation related to driving of a vehicle) on the basis of the results of the analysis. Further, developments are underway also for what are generally called drive recorders or the like that store captured images as records. The present technology may be applied to such vehicle-mounted apparatuses, vehicle-mounted systems, and the like mounted on a vehicle.

In that case, it is sufficient if such a vehicle-mounted apparatus (or a vehicle-mounted system) can generate a detection image instead of captured images described above and set a restoration region (or a non-restoration region) on the detection image.

At that time, for example, the restoration region or the non-restoration region may be set according to a travel speed of a vehicle on which the vehicle-mounted apparatus (or the vehicle-mounted system) is installed. For example, when the vehicle is travelling at a high speed (travelling at a speed equal to or higher than a predetermined speed), a region on the farther side (distant, wide angle) may be set as a restoration region, and when the vehicle is travelling at a low speed (travelling at a speed lower than a predetermined speed), a region on the nearer side (nearby, narrow angle) may be set as a restoration region. Stated differently, when the vehicle is travelling at a high speed, a region on the nearer side (nearby, narrow angle) may be set as a non-restoration region, and when the vehicle is travelling at a low speed, a region on the farther side (distant, wide angle) may be set as a non-restoration region.

In addition, a restoration region (or a non-restoration region) may be set according to a subject. For example, a partial region including an obstacle that enters an angle of view at a speed higher than a preset predetermined threshold or an obstacle that enters an angle of view in a preset predetermined direction may be set as a restoration region or may be set as a non-restoration region. In addition, a partial region including a child may be set as a restoration region, but a ball may not be included in the restoration region. In addition, a traffic sign or the like may be included in a restoration region.

In such a manner, the vehicle-mounted apparatus (or the vehicle-mounted system) can create a restoration image from a detection image such that only a restoration region is restored (a non-restoration region is not restored), and restore only a region desired to be restored (or a region not desired to be restored is not restored). That is, regions to be restored can be controlled.

In such a manner, for example, in a case where image analysis is performed on a restoration image, an unnecessary region is not restored, and the image analysis of the unnecessary region can thus be omitted (or can thus be simplified). Hence, an increase of the load can be reduced. In addition, for example, it is possible to reduce the likelihood that an error of situation determination or control occurs due to results of image analysis on the unnecessary region (or an unnecessary subject, etc.).

In addition, in a case where detection images are stored as records as in a drive recorder, regions including the face of a human, a license plate, a windshield, or the like may be set as restoration regions or may be set as non-restoration regions. In such a manner, occurrence of an infringement of the privacy or the like due to unintended disclosure of personal information or the like can be reduced.

Note that, in this case, it may be made possible to restore non-restoration regions according to uses (according to where an image is provided to). For example, when a video is provided to news media, a restoration image may be created by use of a non-restoration-region-unrestoring restoration matrix such that non-restoration regions are not restored, and when the video is provided to the police, a restoration image may be created by use of a whole restoration matrix such that the non-restoration regions are also restored. That is, for example, a restoration image on which only restoration regions are restored (or a restoration image created such that non-restoration regions are not restored) may be provided to news media, and a restoration image on which the whole (restoration regions and non-restoration regions) is restored may be provided to the police. Note that a detection image and a non-restoration-region-unrestoring restoration matrix may be supplied to news media, and a restoration image on which only restoration regions are restored (or a restoration image created such that non-restoration regions are not restored) may be created at the news media. In addition, a detection image and a restoration matrix (whole restoration matrix) corresponding to the detection image may be supplied to the police, and a restoration image on which the whole (restoration regions and non-restoration regions) is restored may be created at the police.

<Smartphones, etc.>

In addition, the present technology may be applied to mobile information processing terminal apparatuses and the like having an image capturing functionality, such as what are generally called smartphones, tablet terminals, or note type personal computers. In addition, the present technology may be applied to image capturing apparatuses such as digital cameras or video cameras. In this case, it is sufficient if it is made possible for such a mobile information processing terminal apparatus or image capturing apparatus to capture an image of a subject, generate a detection image instead of a captured image, and set restoration regions (or non-restoration regions) on the detection image.

At that time, for example, the entire background may be set as a non-restoration region and be masked. In addition, faces other than the face of a user (or multiple preregistered faces) may be sets as non-restoration regions to prevent the faces other than the face of the user from being restored. Further, only parts around eyes may be set as non-restoration regions to prevent the parts around eyes from being restored. In such a manner, occurrence of an infringement of the privacy or the like due to unintended disclosure of personal information or the like can be reduced.

<Monitoring Cameras>

In addition, the present technology may be applied to apparatuses, systems, and the like that perform monitoring by using a monitoring camera. In this case, it is sufficient if it is made possible for such a monitoring camera to capture an image of a subject, generate a detection image instead of a captured image, and set restoration regions (or non-restoration regions) on the detection image.

At that time, for example, the entire bodies of humans, the faces of humans, the spaces around the hands of humans, or the like may be set as non-restoration regions to prevent the entire bodies of humans, the faces of humans, the spaces around the hands of humans, or the like from being restored. For example, in a case of a monitoring camera located in a space where an ATM (Automatic Teller Machine) is installed, the spaces around the hands of a user inputting a PIN code may be set as non-restoration regions to prevent the spaces around the hands from being restored. In addition, particular buildings, vehicles, and the like may be set as non-restoration regions to prevent the particular buildings, vehicles, and the like from being restored.

In this case also, it may be made possible to restore non-restoration regions according to uses. For example, when a video is provided to news media, a restoration image may be created by use of a non-restoration-region-unrestoring restoration matrix such that non-restoration regions are not restored, and when the video is provided to the police, a restoration image may be created by use of a whole restoration matrix such that the non-restoration regions are also restored.

<Control of Service Provision Levels>

In addition, for example, the present technology may be applied to image distribution services and the like. For example, in a system in which a detection image described above is distributed from a server and a user terminal apparatus creates a restoration image from the detection image, regions to be restored may be controlled (restoration regions may be identified) according to user privileges. For example, a child of a user A may be set in advance as a restoration target in relation to privileges of the user A. In a case where a detection image provided to the user A includes the child of the user A, the server provides, along with the detection image and to the user A, a non-restoration-region-unrestoring restoration matrix in which a region including the child of the user A is set as a restoration region, and the user A is allowed to create a restoration image by using the non-restoration-region-unrestoring restoration matrix. That is, only a partial region including a subject (the child of the user A) permitted for the user A can be made visually recognizable to the user A.

In contrast to this, in a case where the same detection image is provided to a user B, the server provides, to the user B, a non-restoration-region-unrestoring restoration matrix in which a region including a restoration target permitted for the user B is set as a restoration region. That is, only a partial region including a subject permitted for the user B can be made visually recognizable to the user B.

In such a manner, by setting a restoration region and providing a non-restoration-region-unrestoring restoration matrix for each user (according to user privileges), the server can control a region to be restored for each user (according to the user privileges). That is, the server can provide services (control service provision levels) for each user (according to the user privileges).

Other Examples

Note that a non-restoration region of a restoration image may be subjected to processing. For example, the non-restoration region may be synthesized with another image. For example, in a case where the face portion of a human is set as a non-restoration region, any suitable sample facial image may be synthesized with the non-restoration region. In such a manner, the restoration image is decorated, and, as compared to a case where the non-restoration region is expressed as a black image or the like, for example, deterioration of the appearance of the restoration image can be reduced.

5. Third Embodiment

<Vehicle-Mounted Apparatus>

Figure 40:
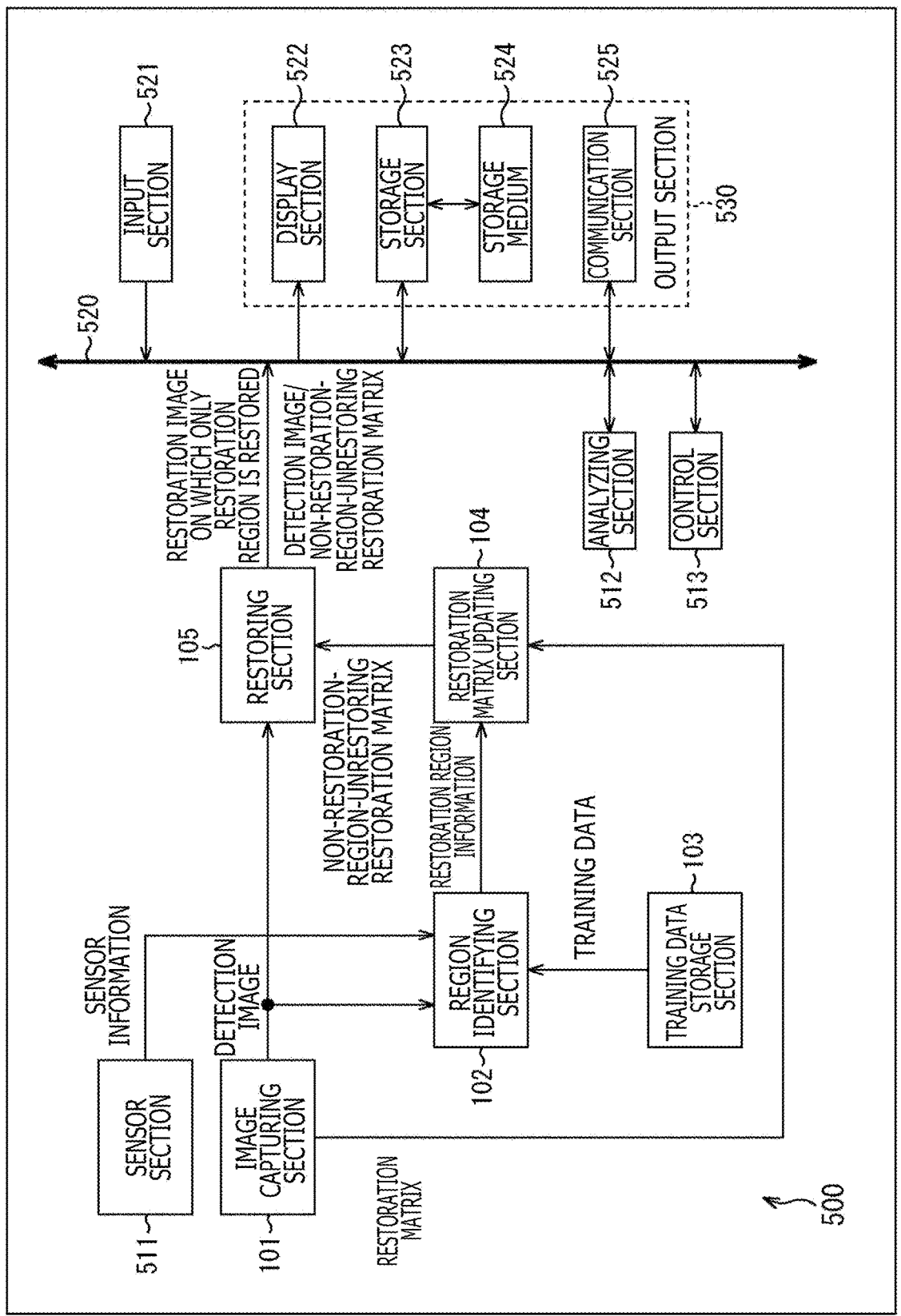
FIG. 40 is a block diagram depicting a main configuration example of a vehicle-mounted apparatus.

Next, an example of a vehicle-mounted apparatus in the use examples described above is explained more specifically. Although the configuration of the vehicle-mounted apparatus can be any configuration, but may be configured as depicted in FIG. 40, for example. FIG. 40 is a diagram depicting a main configuration example of the vehicle-mounted apparatus which is one embodiment of an image processing apparatus to which the present technology is applied. A vehicle-mounted apparatus 500 depicted in FIG. 40 is an apparatus that can capture an image of a subject, analyze the captured image, and, for example, on the basis of results of the analysis, control operation of an accelerator, a brake, a steering wheel, or the like (operation related to driving of the vehicle), control operation related to vehicle equipment such as activation of lighting of headlamps, operation of turn signals, or operation of an air conditioner or a display apparatus, give warnings, alerts, guidance, or the like, store the captured image as a record, and so on. Similarly to the cases of the image capturing apparatus 100 and the like, the vehicle-mounted apparatus 500 can set, as a captured image, a restoration region (a non-restoration region) on a detection image to be analyzed, and create a restoration image such that the non-restoration region is not restored.

Note that FIG. 40 depicts main ones of processing sections, data flows, and the like, and not necessarily depicts all that are included. That is, in the vehicle-mounted apparatus 500, there may be a processing section not depicted as a block in FIG. 40, there may be a process or data flow not depicted as an arrow or the like in FIG. 40, and so on.

As depicted in FIG. 40, similarly to the case of the image capturing apparatus 100, the vehicle-mounted apparatus 500 has the image capturing section 101 to the restoring section 105 and the like. These processing sections perform processes basically similar to those in the case of the image capturing apparatus 100.

In addition, the vehicle-mounted apparatus 500 has a sensor section 511. The sensor section 511 is a detecting section that has a certain sensor, and can detect certain information related to a subject or the environment around the image capturing section 101 (i.e. at least any one of a vehicle and the environment around the vehicle). For example, the sensor section 511 can have a sensor such as a distance measurement sensor, a temperature sensor, or an acceleration sensor. Needless to say, the sensor section 511 may have sensors other than these. For example, the sensor section 511 may have a sensor that detects the state of operation of an accelerator, a brake, a steering wheel, or the like. In addition, the sensor section 511 may have a sensor that detects the state of operation on other equipment. Further, the sensor section 511 may have a sensor that senses a collision or the like of the vehicle, such as an acoustic sensor or a shock sensor. The sensor may be provided in any number, and the number may be one or more. In addition, pieces of information can be detected in any number by the sensor section 511. For example, the sensor section 511 may have multiple types of sensors and detect multiple types of information. The sensor section 511 can supply the detected information as sensor information to the region identifying section 102.

As described above, the region identifying section 102 sets a restoration region (or a non-restoration region) on a detection image, and generates restoration region information (or non-restoration region information). At that time, on the basis of training data and sensor information, the region identifying section 102 can set the restoration region (the non-restoration region).

For example, on the basis of sensor information (temperature distribution) detected by using a temperature sensor, the region identifying section 102 may determine whether or not a subject is a human, and set a restoration region (a non-restoration region) on the basis of a result of the determination. In addition, the region identifying section 102 may set a restoration region (a non-restoration region) according to sensor information (e.g. a vehicle speed) detected by an acceleration sensor. Further, the region identifying section 102 may set a restoration region (a non-restoration region) according to sensor information (e.g. a distance to another vehicle or to an obstacle) detected by a distance measurement sensor.

In addition, on the basis of the state of operation of an accelerator, a brake, a steering wheel, or the like detected by the sensor section 511, the region identifying section 102 may perform detection of sudden operation of the accelerator, the brake, the steering wheel, or the like, and set a restoration region (a non-restoration region) according to a result of the detection. In addition, on the basis of a sound or a shock detected by the sensor section 511, the region identifying section 102 may set a restoration region (a non-restoration region).

Note that the setting of a restoration region (or a non-restoration region) can also be performed as desired, or may be performed by selection (switching of settings) of one according to a condition from predetermined choices prepared in advance. For example, in a case where it is determined, on the basis of sensor information detected by a distance measurement sensor, that there is a high possibility of a collision with another vehicle, the restoration region may be switched.

In such a manner, by setting a restoration region (or a non-restoration region) by using sensor information as well, the region identifying section 102 can set a restoration region (or a non-restoration region) more accurately.

Further, the vehicle-mounted apparatus 500 has an analyzing section 512, a control section 513, a bus 520, an input section 521, a display section 522, a storage section 523, a storage medium 524, and a communication section 525. The display section 522 to the communication section 525 are also referred to as an output section 530 because they can perform processes related to information output.

The analyzing section 512 can acquire, via the bus 520, a restoration image (a restoration image on which only a restoration region is restored) supplied from the restoring section 105. The analyzing section 512 analyzes the restoration image on which only the restoration region is restored, and, for example, can identify another vehicle, a human, an obstacle, or the like, identify the speed, posture, or the like of the vehicle, identify the situation related to temperature, brightness, or the like around the vehicle, and so on. The analyzing section 512 can supply results of the analysis to the control section 513 via the bus 520.

The control section 513 can acquire, via the bus 520, the analysis results supplied from the analyzing section 512. For example, on the basis of the analysis results, the control section 513 can control operation of an accelerator, a brake, a steering wheel, or the like (operation related to driving of the vehicle), control operation related to vehicle equipment such as activation of lighting of headlamps, operation of turn signals, or operation of an air conditioner or a display apparatus, give warnings, alerts, guidance, or the like, store the captured image as a record, and so on.

For example, the input section 521 has a certain input device such as a keyboard, a mouse, a microphone, a touch panel, or an input terminal, and, via the input device, can receive information input by operation by a user or the like, information supplied from another apparatus, or the like. The input section 521 can supply the received information to another processing section (a certain processing section) as appropriate via the bus 520.

In addition, the restoration image output from the restoring section 105 (the restoration image on which only the restoration region is restored) can be supplied to the display section 522, the storage section, 523 or the communication section 525 via the bus 520.

For example, the display section 522 has a monitor that can display images and that includes a liquid crystal panel, an organic EL (Electro Luminescence) panel, or the like. For example, the display section 522 can display a restoration image supplied from the restoring section 105. Other than this, for example, the display section 522 can display a GUI (Graphical User Interface) such as a menu or the like, settings information of the vehicle-mounted apparatus 500, and the like. Further, the display section 522 can display a restoration image stored on the storage medium 524. For example, the display section 522 can display a thumbnail image of a restoration image stored on the storage medium 524.

For example, the storage section 523 controls storage of the storage medium 524 including a semiconductor memory or the like. The storage medium 524 may be a removable storage medium or may be a storage medium built in the vehicle-mounted apparatus 500. For example, the storage section 523 can store, on the storage medium 524, a restoration image supplied via the bus 520. In addition, the storage section 523 can store, on the storage medium 524, a detection image and a non-restoration-region-unrestoring restoration matrix that are supplied via the bus 520 and that are associated with each other.

In addition, for example, the storage section 523 can read out data stored on the storage medium 524, and supply the data to another processing section (e.g. the display section 522, the communication section 525, etc.) via the bus 520. For example, the storage section 523 can read out a restoration image (or a thumbnail image thereof) from a storage medium, supply the restoration image to the display section 522 via the bus 520, and cause the display section 522 to display the restoration image. In addition, for example, the storage section 523 can read out a restoration image or a detection image and a non-restoration-region-unrestoring restoration matrix from a storage medium, supply the restoration image or the detection image and the non-restoration-region-unrestoring restoration matrix to the communication section 525 via the bus 520, and cause the communication section 525 to send the restoration image or the detection image and the non-restoration-region-unrestoring restoration matrix to another apparatus.

By a certain communication method, the communication section 525 performs communication with a server on the Internet, another apparatus on a LAN established by cables or wirelessly, another external device, or the like. For example, by the communication, the communication section 525 sends, to a communication partner (an external device), a restoration image or a detection image and a non-restoration-region-unrestoring restoration matrix supplied from the restoring section 105, the storage section 523, or the like via the bus 520. For example, the communication section 525 can send the data by a streaming method or an uploading method.

The region identifying section 102 can control a region to be restored by identifying a restoration region (non-restoration region). Accordingly, the vehicle-mounted apparatus 500 is configured as described above, the vehicle-mounted apparatus 500 can thus create a restoration image such that a certain region is not restored, similarly to the case of the image capturing apparatus 100.

Hence, for example, in image analysis, image storage or the like, the vehicle-mounted apparatus 500 can attain advantages like the ones described above in 4. Use Examples Note that the processing sections (the image capturing section 101 to the restoring section 105, the sensor section 511, and the input section 521 to the communication section 525) of the vehicle-mounted apparatus 500 can each have any configuration. For example, each processing section may include a logical circuit that realizes processes described above. In addition, for example, each processing section may have a CPU, a ROM, a RAM, or the like, and, by executing a program by using it, realize processes described above. Needless to say, each processing section may have both types of configurations, realize some of processes described above by using a logical circuit, and realize the other processes by executing a program. The configuration of the processing sections may be independent of each other. For example, some processing sections may realize some of processes described above by using logical circuits, some other processing sections may realize processes described above by executing programs, and still other processing sections may realize processes described above by using both logical circuits and program execution.

<Procedure of Restoration Image Generation Process>

Figure 41:
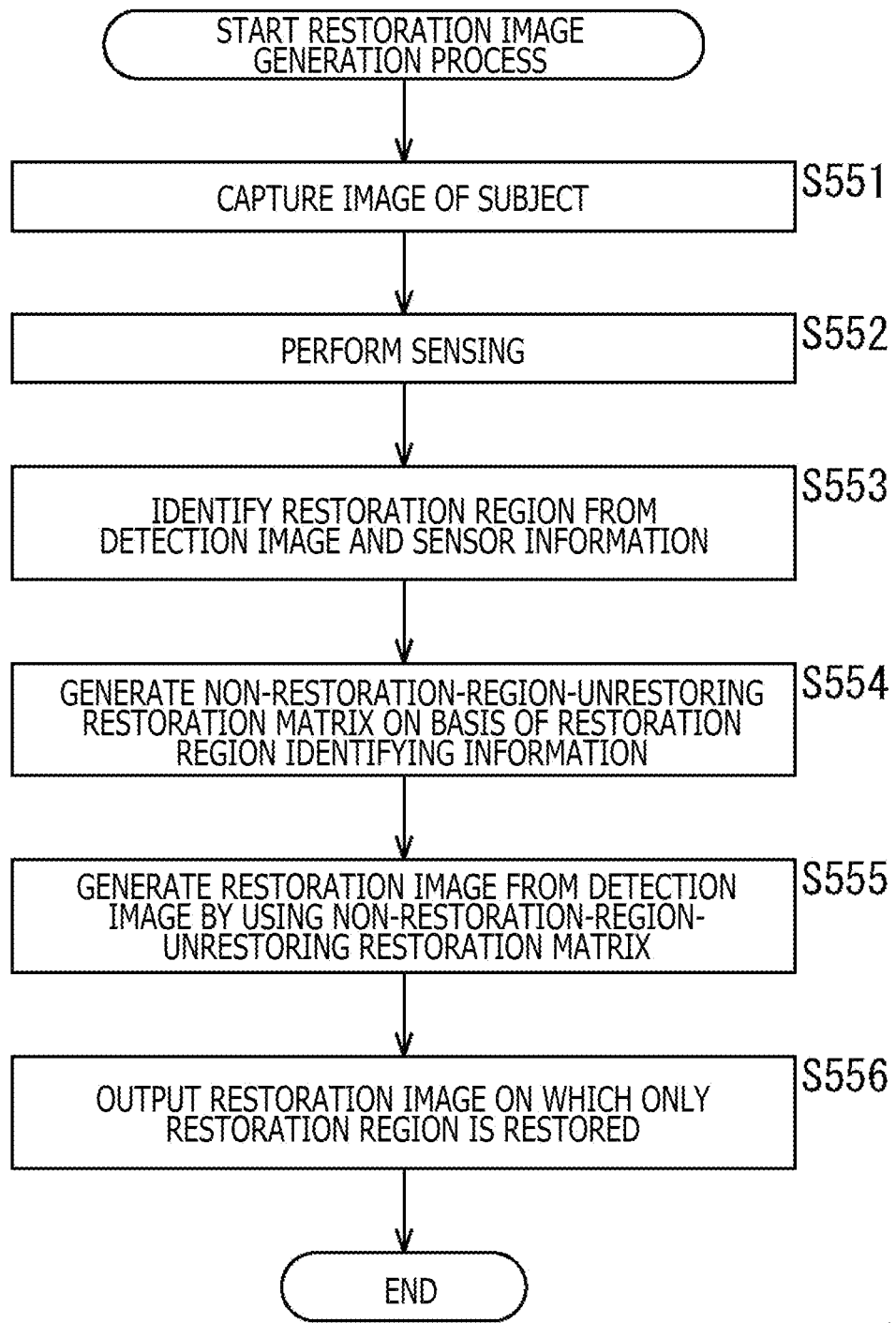
FIG. 41 is a flowchart for explaining another example of the procedure of the restoration image generation process.

An example of the procedure of a restoration image generation process in which the vehicle-mounted apparatus 500 captures an image of a subject and creates a restoration image from a detection image obtained thereby, such that non-restoration regions are not restored is explained with reference to the flowchart in FIG. 41.

When the restoration image generation process is started, in step S551, the image capturing section 101 of the vehicle-mounted apparatus 500 (FIG. 40) captures an image of a subject by using the image capturing element 121, and generates a detection image.

In step S552, the sensor section 511 performs sensing, detects predetermined information related to a subject or the environment around the image capturing section 101, and generates sensor information.

In step S553, on the basis of training data read out from the training data storage section 103 and the sensor information obtained in step S552, the region identifying section 102 identifies a restoration region (or a non-restoration region) from the detection image generated in step S551, and generates restoration region information representing the restoration region (or non-restoration region information representing the non-restoration region).

In step S554, on the basis of the restoration region information (or the non-restoration region information) generated in step S553, the restoration matrix updating section 104 updates a restoration matrix corresponding to the whole of the detection image, and generates a non-restoration-region-unrestoring restoration matrix.

In step S555, by using the non-restoration-region-unrestoring restoration matrix generated in step S554, the restoring section 105 creates a restoration image from the detection image generated in step S551, such that the non-restoration region is not restored.

In step S556, the output section 530 outputs the restoration image on which only the restoration region is restored in step S555. For example, the display section 522 displays the restoration image. In addition, the storage section 523 stores data of the restoration image on the storage medium 524. Further, the communication section 525 sends the data of the restoration image to another apparatus.

Note that the process in step S555 may be omitted and, in step S556, the output section 530 may output the detection image generated in step S551 and the non-restoration-region-unrestoring restoration matrix generated in step S554 associated with each other. For example, the storage section 523 may store data of the detection image or the non-restoration-region-unrestoring restoration matrix on the storage medium 524. Further, the communication section 525 may send the data of the detection image or the non-restoration-region-unrestoring restoration matrix to another apparatus.

After the process in step S556 ends, the restoration image generation process ends.

As described above, the region identifying section 102 can control a region to be restored by identifying a restoration region (non-restoration region). Accordingly, by executing the processes as described above, the vehicle-mounted apparatus 500 can create a restoration image such that a certain region is not restored. The vehicle-mounted apparatus 500 can thus attain advantages like the ones described above in <4. Use Examples>, for example.

6. Fourth Embodiment

<Another Configuration Example of Image Capturing Element>

Whereas an example of the image capturing element 121 has been explained thus far, the image capturing element 121 only has to have multiple pixel output units including at least two pixel output units whose characteristics related to angles of incidence of incident beams received from subjects are mutually different, and the configuration can be any configuration.

For example, random black-and-white pattern masks or optical interference masks may be used as modulating elements, and beams that enter the image capturing plane of the image capturing element 121 may be modulated according to black-and-white patterns or interference of beams.

Figure 42:
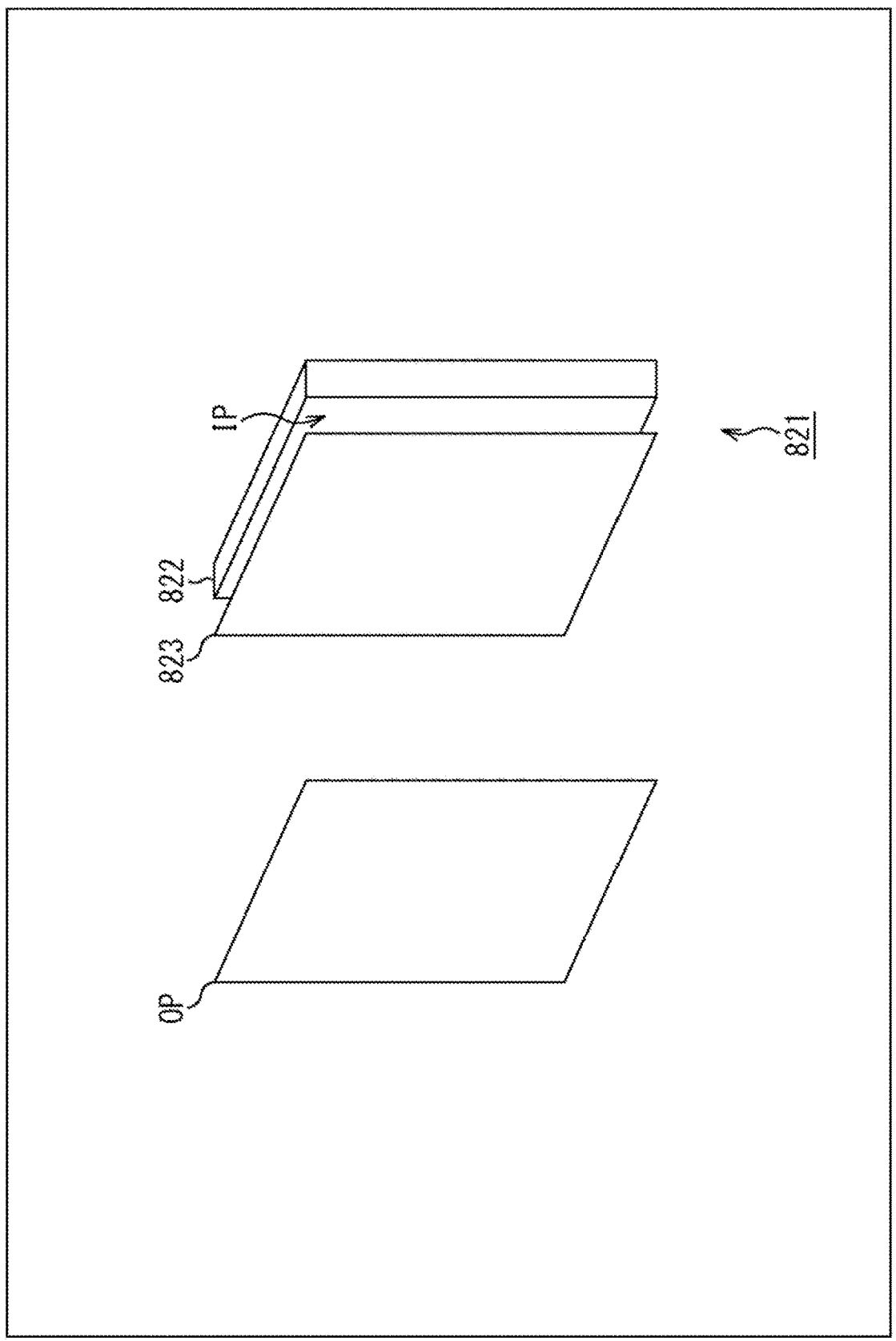
FIG. 42 is a diagram depicting a main configuration example of the image capturing element.

FIG. 42 depicts another configuration of an image capturing element. An image capturing element 821 has a mask 823 that is fixed to an image capturing element 822 such that there is a predetermined interval between the mask 823 and an image capturing plane IP of the image capturing element 822, and is configured such that beams from a subject plane OP enter the image capturing plane IP of the image capturing element 822 after being modulated by the mask 823.

Figure 43:
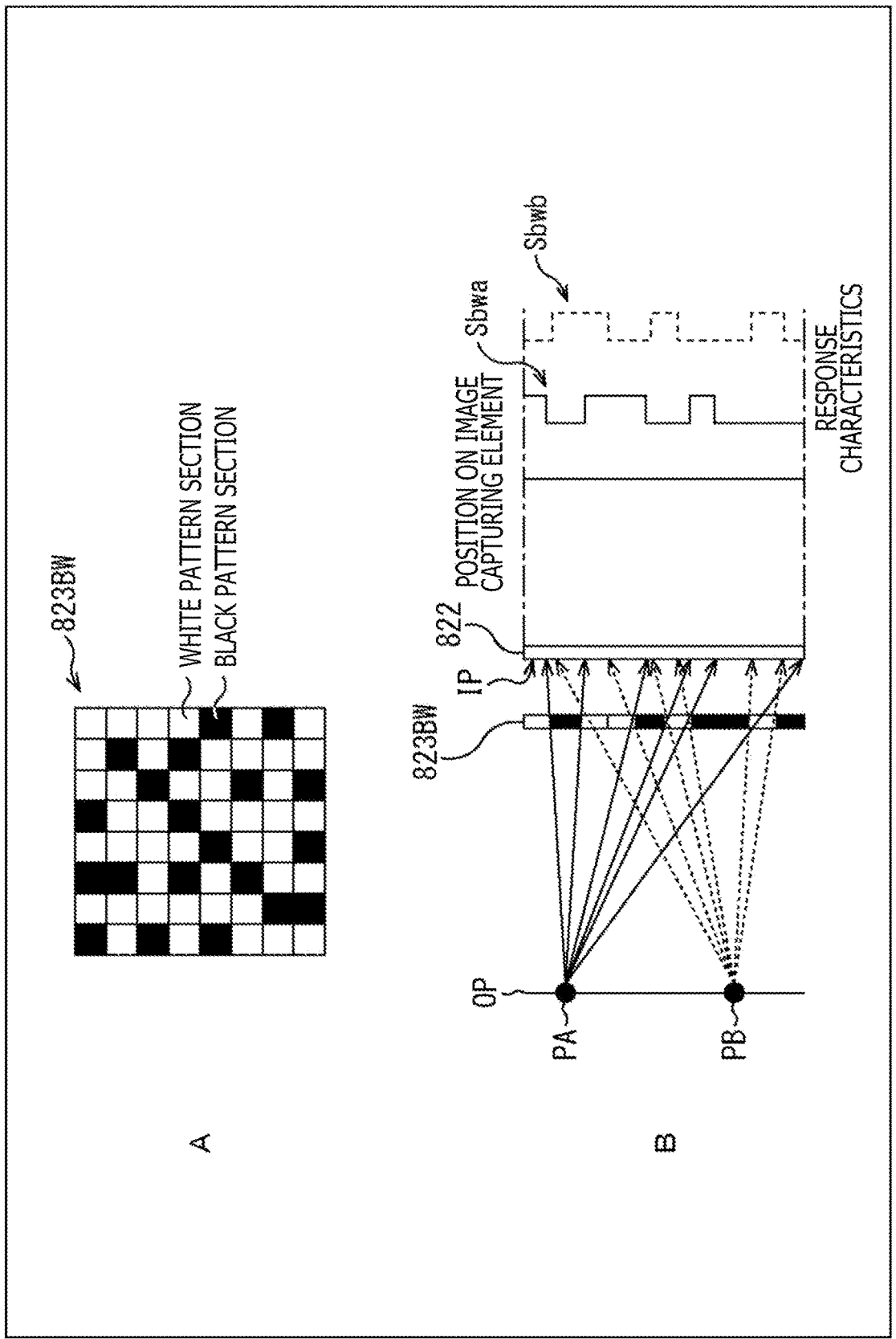
FIG. 43 depicts diagrams depicting a case where a black-and-white pattern mask is used.

FIG. 43 depicts a case where a black-and-white pattern mask is used. A in FIG. 43 illustrates a black-and-white pattern mask. A black-and-white pattern mask 823BW has a configuration in which white pattern sections that transmit beams and black pattern sections that shield beams are arranged randomly, and the pattern size is set independently of the pixel size of the image capturing element 822. B in FIG. 43 schematically depicts a state where the image capturing plane IP is irradiated with beams emitted from the point light source PA and beams emitted from the point light source PB. In addition, B in FIG. 43 schematically depicts examples of responses of the image capturing element in a case where the black-and-white pattern mask 823BW is used about the individual beams emitted from the point light source PA and beams emitted from the point light source PB. The beams from the subject plane OP enter the image capturing plane IP of the image capturing element 822 after being modulated by the black-and-white pattern mask 823BW. Accordingly, the responses of the image capturing element that correspond to the beams emitted from the point light source PA of the subject plane OP are Sbwa. In addition, the responses of the image capturing element that correspond to the beams emitted from the point light source PB of the subject plane OP are Sbwb. Accordingly, pixel output information output from the image capturing element 822 is information generated by synthesis of the responses to each point light source for each pixel output unit.

Figure 44:
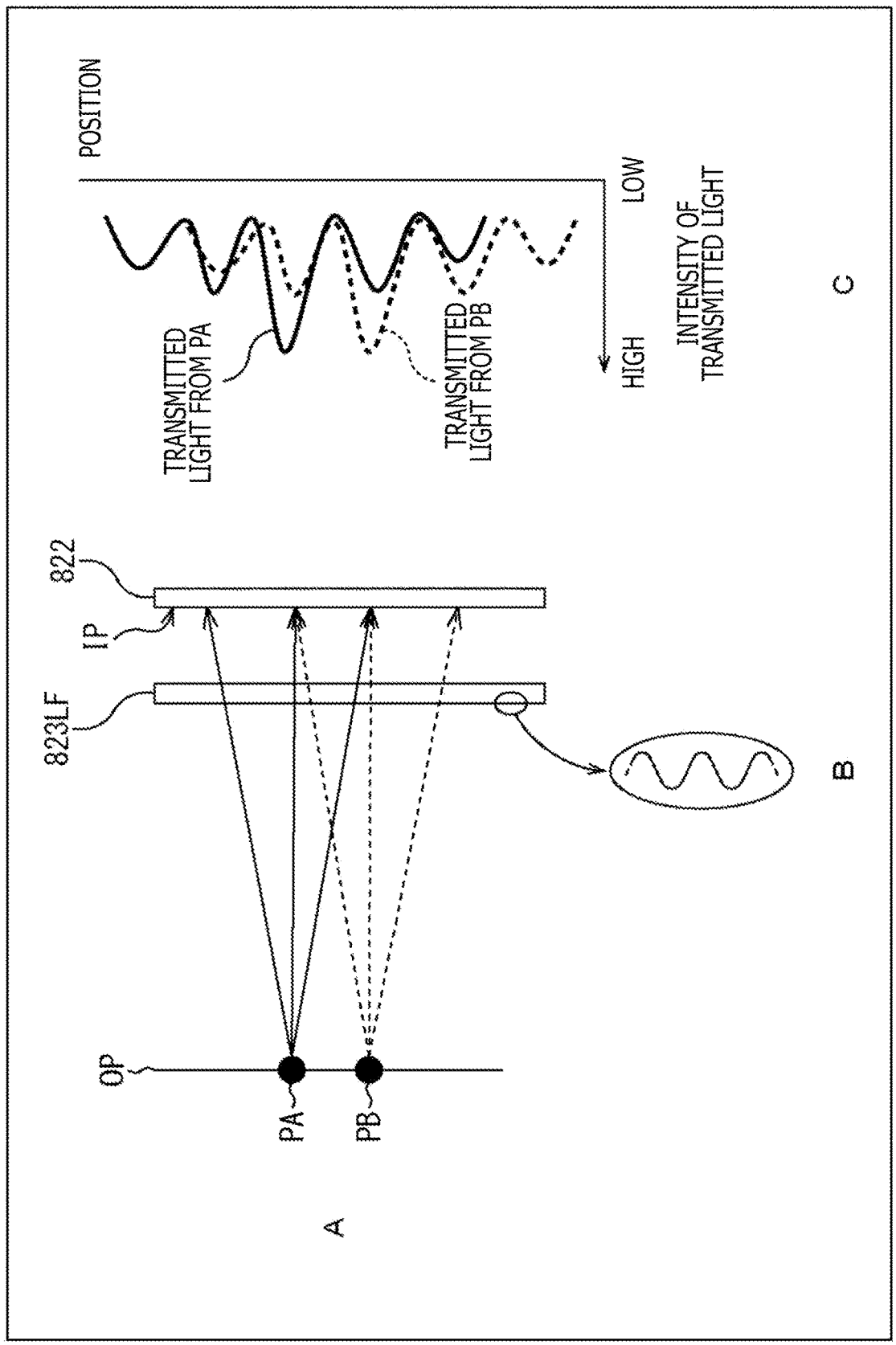
FIG. 44 depicts diagrams depicting a case where an optical interference mask is used.

FIG. 44 depicts a case where an optical interference mask is used. As depicted in A in FIG. 44, the image capturing plane IP of the image capturing element 822 is irradiated with beams emitted from the point light sources PA and PB of the subject plane OP via an optical interference mask 823LF. For example, the light incidence surface of the optical interference mask 823LF is provided with recesses and protrusions that approximately correspond to wavelengths as depicted in B in FIG. 44. In addition, the optical interference mask 823LF has the highest transmittance for a beam that has a particular wavelength and that is emitted from the vertical direction. As changes of the angles of incidence, relative to the optical interference mask 823LF, of beams that have particular wavelengths and that are emitted from the point light sources PA and PB of the subject plane OP (the inclinations relative to the vertical direction) increase, the optical path lengths change. Here, when an optical path length is an odd multiple of the half wavelength, beams weaken each other, and when an optical path length is an even multiple of the half wavelength, beams strengthen each other. That is, as depicted in C in FIG. 44, the intensity of a transmitted beam that has a particular wavelength and that is emitted from the point light source PA or PB and transmitted through the optical interference mask 823LF is modulated according to the angle of incidence relative to the optical interference mask 823LF, and the transmitted beam enters the image capturing plane IP of the image capturing element 822. Accordingly, pixel output information output from the image capturing element 822 is information generated by synthesis of the optical intensities obtained after the modulation of each point light source for each pixel output unit.

In addition, the mask 823 may have a configuration in which the black pattern depicted in FIG. 43 is used as a λ/2 wave plate (λ is a wavelength) and a linear polarization element is provided in the polarization direction equal to the front surface and the rear surface of the mask. In this case, if a beam having a wavelength λ is emitted from a point light source, the plane of polarization of a polarized beam transmitted through the λ/2 wave plate is rotated, and the light amount thus decreases as compared with beams that are transmitted through white pattern portions. Hence, pixel output information can be generated similarly to the case depicted in FIG. 43. Note that, for example, if far infrared light is used as beams having particular wavelengths that are emitted from point light sources, pixel output information according to a subject in an image capturing region can be generated even if the image capturing region is dark.

It should be noted that, in a case of these configurations, it is necessary to add another configuration such as a mask to the image capturing element and therefore, the image capturing element 121 described above (FIG. 3) enables a further size reduction.

It is sufficient if the image capturing element 121 has any of the configuration like the one explained with reference to FIG. 5, the configuration like the one explained with reference to FIG. 6, the configuration like the one explained with reference to FIG. 42 and FIG. 43, or the configuration like the one explained with reference to FIG. 44. That is, if the image capturing element 121 has a configuration which is any of these, the present technology can be applied to it or an apparatus or the like that has it. That is, the image capturing element 121 only has to be an image capturing element that includes multiple pixel output units to receive incident beams that are incident thereon via neither an image capturing lens nor a pinhole and that is configured such that output pixel values of at least two pixel output units in the multiple pixel output units have mutually different characteristics in terms of angle-of-incidence directional sensitivities about incident beams from a subject.

In addition, it is sufficient if the image capturing element 121 has the configuration like the one explained with reference to FIG. 5 or the configuration like the one explained with reference to FIG. 6. That is, if the image capturing element 121 has a configuration which is any of these, the present technology can be applied to it or an apparatus or the like that has it. That is, the image capturing element 121 may be configured such that the angle-of-incidence directional sensitivity of the output pixel value of each pixel output unit in multiple pixel output units of the image capturing element 121 can be set independently.

For example, it is sufficient if the image capturing element 121 has the configuration like the one explained with reference to FIG. 5. That is, if the image capturing element 121 has such a configuration, the present technology can be applied to it or an apparatus or the like that has it. That is, the image capturing element 121 may be configured such that the angle-of-incidence directional sensitivity of the output pixel value, of each pixel output unit in multiple pixel output units of the image capturing element 121, about incident beams from a subject can be set independently.

In addition, for example, it is sufficient if the image capturing element 121 has the configuration like the one explained with reference to FIG. 6. That is, if the image capturing element 121 has such a configuration, the present technology can be applied to the image capturing element 121 or an apparatus or the like that has the image capturing element 121. That is, it may be made possible to independently set the angle-of-incidence directional sensitivity of an output pixel value of each pixel output unit in the multiple pixel output units in the image capturing element 121 by making PDs (Photo Diodes) that contribute to output mutually different among the multiple pixel output units.

7. Notes

<Computer>

The series of processing described above can also be executed by hardware, or can also be executed by software. In a case where the series of processing is executed by software, a program included in the software is installed on a computer. Here, the computer includes a computer incorporated in dedicated hardware, a general-purpose personal computer, for example, that can execute various types of functionalities by having various types of programs installed thereon, and the like.

Figure 45:
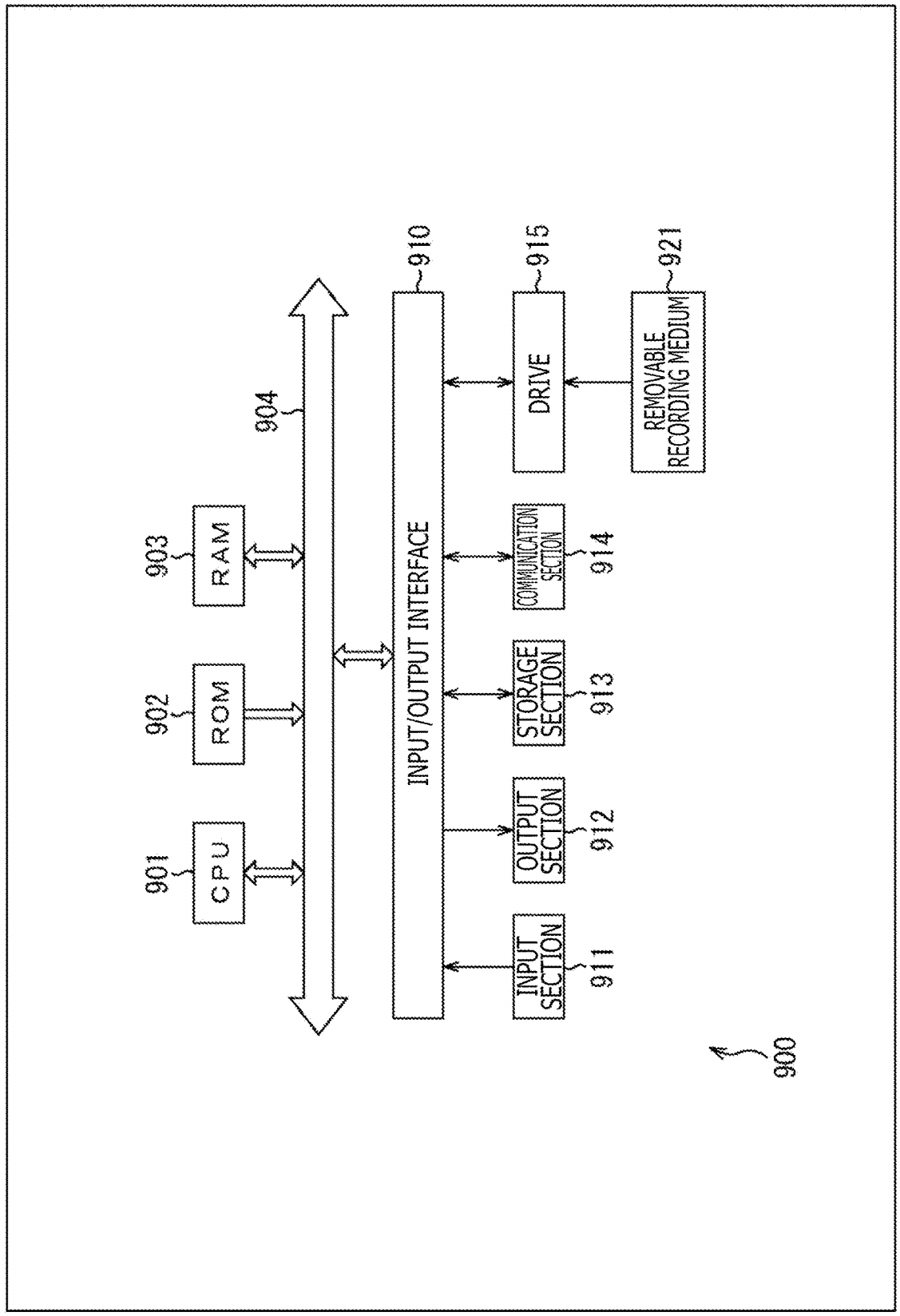
FIG. 45 is a block diagram depicting a main configuration example of a computer.

FIG. 45 is a block diagram depicting a configuration example of the hardware of a computer that executes the series of processing described above by a program.

In a computer 900 depicted in FIG. 45, a CPU (Central Processing Unit) 901, a ROM (Read Only Memory) 902, and a RAM (Random Access Memory) 903 are interconnected via a bus 904.

The bus 904 is also connected with an input/output interface 910. The input/output interface 910 is connected with an input section 911, an output section 912, a storage section 913, a communication section 914, and a drive 915.

For example, the input section 911 includes a keyboard, a mouse, a microphone, a touch panel, an input terminal, and the like. For example, the output section 912 includes a display, speakers, an output terminal, and the like. For example, the storage section 913 includes a hard disk, a RAM disk, a non-volatile memory, and the like. For example, the communication section 914 includes a network interface. The drive 915 drives a removable recording medium 921 such as a magnetic disc, an optical disc, a magneto-optical disc, or a semiconductor memory.

In the computer configured as described above, for example, the CPU 901 loads a program stored on the storage section 913 onto the RAM 903 via the input/output interface 910 and the bus 904 and executes the program to thereby perform the series of processing described above. In addition, data and the like that are necessary for execution of various types of processes by the CPU 901 are stored as appropriate on the RAM 903.

The program executed by the computer can be applied being recorded on the removable recording medium 921 as a package medium or the like, for example. In that case, the removable recording medium 921 is attached to the drive 915, and the program can thus be installed on the storage section 913 via the input/output interface 910.

In addition, this program can also be provided via a cable transmission medium or a wireless transmission medium such as a local area network, the Internet, or digital satellite broadcasting. In that case, the program can be received at the communication section 914 and installed on the storage section 913.

Other than them, this program can also be installed in advance on the ROM 902 or the storage section 913.

<Application Targets of Present Technology>

Note that systems, apparatuses, processing sections, and the like to which the present technology is applied can be used in any field such as, for example, transportation, medical care, crime prevention, agriculture, the livestock industry, the mining industry, the beauty industry, factories, home electric appliances, meteorology, or nature monitoring. In addition, its use in those fields also can be any use.

For example, the present technology can be applied to systems and devices aimed for providing the content to be viewed and listened to and the like. In addition, for example, the present technology can also be applied to systems and devices aimed for transportation such as supervision of traffic situations or automated driving control. Further, for example, the present technology can also be applied to systems and devices aimed for security. In addition, for example, the present technology can be applied to systems and devices aimed for automatic control of machines and the like. Further, for example, the present technology can be applied to systems and devices aimed for the agriculture and the livestock industry. In addition, for example, the present technology can also be applied to systems and devices that monitor the states of nature such as volcanos, forests or oceans, wildlife, and the like. Further, for example, the present technology can also be applied to systems and devices aimed for sports.

<Others>

Embodiments of the present technology are not limited to the embodiments described above, and can be changed in various manners within the scope not deviating from the gist of the present technology.

For example, the present technology can also be implemented as any configurations included in an apparatus or a system, such as a processor as a system LSI (Large Scale Integration) or the like, a module that uses multiple processors or the like, a unit that uses multiple modules or the like, or a set which is a unit having still other additional functionalities (i.e. the present technology can be implemented as a partial configuration of the apparatus).

In addition, each processing section described above can be realized by any configuration. For example, each processing section may include a circuit, an LSI, a system LSI, a processor, a module, a unit, a set, a device, an apparatus, a system, or the like. In addition, multiple ones among them may be combined. At that time, for example, the same type of configuration like multiple circuits, multiple processors, or the like may be combined, or different types of configurations like a circuit, an LSI, and the like may be combined.

Note that, in the present specification, a system means a set of multiple constituent elements (apparatuses, modules (components), etc.), and it does not matter whether or not all the constituent elements are located in a single housing. Accordingly, multiple apparatuses housed in separate housings and connected via a network and one apparatus with one housing having housed therein multiple modules are both systems.

In addition, for example, a configuration explained as one apparatus (or processing section) may be divided and configured as multiple apparatuses (or processing sections). On the contrary, configurations explained above as multiple apparatuses (or processing sections) may be put together and configured as one apparatus (or processing section). In addition, needless to say, the configuration of each apparatus (or each processing section) may additionally have a configuration other than those described above. Further, as long as substantially the same configuration or operation can be attained as the whole system, some of configurations of an apparatus (or processing section) may be included in the configuration of another apparatus (or another processing section).

In addition, for example, the present technology can be configured as cloud computing in which one functionality is shared among multiple apparatuses via a network and is processed in cooperation with each other. For example, the present technology can also be applied to a cloud service that provides a service related to captured images (moving images) to a certain terminal such as a computer, AV (Audio Visual) equipment, a mobile information processing terminal, or an IoT (Internet of Things) device.

In addition, for example, the program described above can be executed at any apparatus. In that case, it is sufficient if the apparatus has necessary functionalities (functional blocks, etc.) and can obtain necessary information.

In addition, for example, other than being executed on one apparatus, each step explained in a flowchart described above can be shared by multiple apparatuses and executed thereon. Further, in a case where one step includes multiple processes, other than being executed on one apparatus, the multiple processes included in the one step can be shared among multiple apparatuses and executed thereon. Stated differently, the multiple processes included in the one step can also be executed as processes of multiple steps. On the contrary, processes explained as multiple steps can also be executed collectively as one step.

Regarding the program executed by the computer, processes of steps describing the program may be executed in a temporal sequence along an order explained in the present specification, may be executed in parallel, or may be executed individually at necessary timings such as timings when those processes are called. That is, as long as contradictions do not occur, processes of each step may be executed in an order different from the order described above. Further, processes of steps describing the program may be executed in parallel with processes of other programs, and may be executed in combination with processes of other programs.

Multiple aspects of the present technology that are explained in the present specification can each be implemented independently and singly as long as such implementation does not give rise to contradictions. Needless to say, a certain multiple aspects of the present technology can also be implemented in combination. For example, part or the whole of the present technology explained in any of the embodiments can also be implemented by being combined with part or the whole of the present technology explained in another embodiment. In addition, certain part or the whole of the present technology described above can also be implemented by being combined with another technology not described above.

The present technology can also have configuration like the ones described below.

(1)
An image processing apparatus including:
a region identifying section that identifies a restoration region where a restoration image is to be created by using a restoration matrix, the restoration region being in a region of a detection image obtained at an image capturing element that includes multiple pixels to receive incident beams that are incident thereon via neither an image capturing lens nor a pinhole and that is configured such that output pixel values of at least two pixels in the multiple pixels have mutually different characteristics in terms of angle-of-incidence directional sensitivities about incident beams from a subject.

(2)
The image processing apparatus according to (1), in which the restoration region includes a partial region of the detection image corresponding to a region including a preregistered subject or a region other than the region including the preregistered subject on the restoration image.

(3)
The image processing apparatus according to (2), in which the restoration region includes a partial region of the detection image corresponding to a region including a preregistered part of the subject or a region other than the region including the preregistered part of the subject on the restoration image.

(4)
The image processing apparatus according to (3), in which the restoration region includes a partial region of the detection image corresponding to a region including a face of a human or a region other than the region including the face of the human on the restoration image.

(5)
The image processing apparatus according to any one of (2) to (4), in which the restoration region includes a partial region of the detection image corresponding to a region including a preregistered human or a region other than the region including the preregistered human on the restoration image.

(6)
The image processing apparatus according to any one of (1) to (5), in which the restoration region includes a partial region of the detection image corresponding to a region including a subject satisfying a preregistered condition or a region other than the region including the subject satisfying the preregistered condition on the restoration image.

(7)
The image processing apparatus according to any one of (1) to (6), in which the restoration region includes a partial region provided at a preregistered position and with a preregistered size in the detection image.

(8)
The image processing apparatus according to any one of (1) to (7), further including:
a training result storage section that stores a result of training using, as teaching data, the detection image and information regarding the restoration region corresponding to the detection image, in which
the region identifying section identifies the restoration region of the detection image on a basis of the result of the training stored on the training result storage section.

(9)
The image processing apparatus according to any one of (1) to (8), further including:
a partial restoration matrix setting section that sets a partial restoration matrix to be used for creating only a restoration image of the restoration region identified from the detection image by the region identifying section.

(10)
The image processing apparatus according to (9), in which the partial restoration matrix setting section sets the partial restoration matrix by setting, to a preregistered value, a coefficient not corresponding to the restoration region in coefficients of a whole restoration matrix that is a restoration matrix corresponding to a whole of the detection image.

(11)
The image processing apparatus according to (9) or (10), in which the partial restoration matrix setting section sets the partial restoration matrix by deleting a coefficient not corresponding to the restoration region in coefficients of a whole restoration matrix that is a restoration matrix corresponding to a whole of the detection image.

(12)

The image processing apparatus according to any one of (9) to (11), further including:
a restoring section that creates a restoration image of the restoration region from the detection image by using the partial restoration matrix set by the partial restoration matrix setting section.

(13)

The image processing apparatus according to any one of (1) to (12), further including:
the image capturing element.

(14)

The image processing apparatus according to (13), in which the multiple pixel output units are configured such that the angle-of-incidence directional sensitivity of the output pixel value of each of the pixel output units can be set independently.

(15)

The image processing apparatus according to (13) or (14), in which the multiple pixel output units are configured such that the angle-of-incidence directional sensitivity of each of the pixel output units about an incident beam from the subject can be set independently.

(16)

The image processing apparatus according to any one of (13) to (15), in which the angle-of-incidence directional sensitivity of the output pixel value of each of the pixel output units can be set independently by making PDs (Photo Diodes) that contribute to output mutually different among the multiple pixel output units.

(17)

The image processing apparatus according to any one of (13) to (16), further including:
a detecting section that detects information regarding at least either one of a vehicle and an environment around the vehicle, in which,
by using the information detected by the detecting section, the region identifying section identifies the restoration region of the detection image obtained at the image capturing element.

(18)

The image processing apparatus according to (17), in which the region identifying section identifies the restoration region according to a speed of the vehicle detected by the detecting section.

(19)

The image processing apparatus according to (17), in which the region identifying section identifies, as the restoration region, a partial region including an obstacle that is detected by the detecting section and that enters an angle of view at a speed higher than a threshold or an obstacle that is detected by the detecting section and that enters the angle of view in a preset direction.

(20)

The image processing apparatus according to any one of (1) to (19), in which the region identifying section identifies the restoration region according to where the restoration image is provided to.

(21)

The image processing apparatus according to any one of (1) to (20), in which the region identifying section identifies the restoration region according to a user privilege.

(22)

An image processing method including:
identifying a restoration region where a restoration image is to be created by using a restoration matrix of a detection image obtained at an image capturing element that includes multiple pixel output units to receive incident beams that are incident thereon via neither an image capturing lens nor a pinhole and that is configured such that output pixel values of at least two pixel output units in the multiple pixel output units have mutually different characteristics in terms of angle-of-incidence directional sensitivities about incident beams from a subject.

(23)

A program that causes a computer to function as:
a region identifying section that identifies a restoration region where a restoration image is to be created by using a restoration matrix of a detection image obtained at an image capturing element that includes multiple pixel output units to receive incident beams that are incident thereon via neither an image capturing lens nor a pinhole and that is configured such that output pixel values of at least two pixel output units in the multiple pixel output units have mutually different characteristics in terms of angle-of-incidence directional sensitivities about incident beams from a subject.

(24)

An image processing system including:
an image capturing apparatus and an image processing apparatus, in which
the image capturing apparatus includes an image capturing element that includes multiple pixel output units to receive incident beams that are incident thereon via neither an image capturing lens nor a pinhole and that is configured such that output pixel values of at least two pixel output units in the multiple pixel output units have mutually different characteristics in terms of angle-of-incidence directional sensitivities about incident beams from a subject, and
the image processing apparatus includes a region identifying section that identifies a restoration region where a restoration image is to be created by using a restoration matrix of a detection image obtained at the image capturing element.

REFERENCE SIGNS LIST

100: Image capturing apparatus
101: Image capturing section
102: Region identifying section
103: Training data storage section
104: Restoration matrix updating section
105: Restoring section
121: Image capturing element
400: Image processing system
401: Image capturing apparatus
402: Image processing apparatus
410: Image processing system
411: Image capturing apparatus
412: Image processing apparatus
413: Restoring apparatus
420: Image processing system
421: Image capturing apparatus
422: Image processing apparatus
423: Restoring apparatus
430: Image processing system
431: Image capturing apparatus 432: Restoring apparatus
440: Image processing system
441: Image capturing apparatus
442: Restoring apparatus
500: Vehicle-mounted apparatus
511: Sensor section
520: Bus
521: Input section
522: Display section
523: Storage section
524: Storage medium
525: Communication section
530: Output section

The invention claimed is:

1. An image processing apparatus comprising:
a memory storing a program, and
one or more processors configured to execute the program to perform operations comprising:
identifying a restoration region where a restoration image is to be created by using a restoration matrix, the restoration region being in a region of a detection image obtained at an image capturing element that includes multiple pixels to receive incident beams that are incident thereon and that is configured such that output pixel values of at least two pixels in the multiple pixels have mutually different characteristics in terms of angle-of-incidence directional sensitivities about incident beams from a subject,
wherein the restoration region includes a partial region of the detection image corresponding to a region including a subject satisfying a preregistered condition or a region other than the region including the subject satisfying the preregistered condition on the restoration image.

2. The image processing apparatus according to claim 1, wherein the restoration region includes a partial region of the detection image corresponding to a region including a preregistered subject or a region other than the region including the preregistered subject on the restoration image.

3. The image processing apparatus according to claim 2, wherein the restoration region includes a partial region of the detection image corresponding to a region including a preregistered part of the subject or a region other than the region including the preregistered part of the subject on the restoration image.

4. The image processing apparatus according to claim 3, wherein the restoration region includes a partial region of the detection image corresponding to a region including a face of a human or a region other than the region including the face of the human on the restoration image.

5. The image processing apparatus according to claim 2, wherein the restoration region includes a partial region of the detection image corresponding to a region including a preregistered human or a region other than the region including the preregistered human on the restoration image.

6. The image processing apparatus according to claim 1, wherein the operations further comprise:
setting a partial restoration matrix to be used for creating only a restoration image of the restoration region identified from the detection image.

7. The image processing apparatus according to claim 6, wherein the operations further comprise:
setting the partial restoration matrix by setting, to a preregistered value, a coefficient not corresponding to the restoration region in coefficients of a whole restoration matrix that is a restoration matrix corresponding to a whole of the detection image.

8. The image processing apparatus according to claim 6, wherein the operations further comprise:
setting the partial restoration matrix by deleting a coefficient not corresponding to the restoration region in coefficients of a whole restoration matrix that is a restoration matrix corresponding to a whole of the detection image.

9. The image processing apparatus according to claim 6, wherein the operations further comprise:
creating a restoration image of the restoration region from the detection image by using the partial restoration matrix.

10. The image processing apparatus according to claim 1, wherein the operations further comprise:
detecting information regarding at least either one of a vehicle and an environment around the vehicle; and
identifying the restoration region of the detection image by using the detected information.

11. The image processing apparatus according to claim 10, wherein the operations further comprise:
identifying the restoration region according to a detected speed of the vehicle.

12. The image processing apparatus according to claim 10, wherein the operations further comprise:
identifying, as the restoration region, a partial region including an obstacle and that enters an angle of view at a speed higher than a threshold or an obstacle and that enters the angle of view in a preset direction.

13. The image processing apparatus according to claim 1, wherein the operations further comprise:
identifying the restoration region according to where the restoration image is provided to.

14. The image processing apparatus according to claim 1, wherein the operations further comprise:
identifying the restoration region according to a user privilege.

15. The image processing apparatus according to claim 1, wherein the image capturing element that includes multiple pixels receives the incident beams that are incident thereon via an on-chip lens.

16. An image processing apparatus comprising:
a memory storing a program, and
one or more processors configured to execute the program to perform operations comprising:
identifying a restoration region where a restoration image is to be created by using a restoration matrix, the restoration region being in a region of a detection image obtained at an image capturing element that includes multiple pixels to receive incident beams that are incident thereon and that is configured such that output pixel values of at least two pixels in the multiple pixels have mutually different characteristics in terms of angle-of-incidence directional sensitivities about incident beams from a subject,
wherein the restoration region includes a partial region provided at a preregistered position and with a preregistered size in the detection image.

17. The image processing apparatus according to claim 16, wherein the image capturing element that includes multiple pixels receives the incident beams that are incident thereon via an on-chip lens.

18. An image processing apparatus comprising:
a memory storing a program, and
one or more processors configured to execute the program to perform operations comprising:
identifying a restoration region where a restoration image is to be created by using a restoration matrix, the restoration region being in a region of a detection image obtained at an image capturing element that includes multiple pixels to receive incident beams that are incident thereon and that is configured such that output pixel values of at least two pixels in the multiple pixels have mutually different characteristics in terms of angle-of-incidence directional sensitivities about incident beams from a subject;

storing a result of training using, as teaching data, the detection image and information regarding the restoration region corresponding to the detection image, wherein;

identifying the restoration region of the detection image on a basis of the stored result of the training.

19. The image processing apparatus according to claim 18, wherein the image capturing element that includes multiple pixels receives the incident beams that are incident thereon via an on-chip lens.

20. An image processing method comprising:

identifying a restoration region where a restoration image is to be created by using a restoration matrix, the restoration region being in a region of a detection image obtained at an image capturing element that includes multiple pixels to receive incident beams that are incident thereon and that is configured such that output pixel values of at least two pixels in the multiple pixels have mutually different characteristics in terms of angle-of-incidence directional sensitivities about incident beams from a subject, wherein the restoration region includes a partial region of the detection image corresponding to a region including a subject satisfying a preregistered condition or a region other than the region including the subject satisfying the preregistered condition on the restoration image.

21. A non-transitory computer readable medium storing a program, the program being executable by a processor to perform operations comprising:

identifying a restoration region where a restoration image is to be created by using a restoration matrix, the restoration region being in a region of a detection image obtained at an image capturing element that includes multiple pixels to receive incident beams that are incident thereon and that is configured such that output pixel values of at least two pixels in the multiple pixels have mutually different characteristics in terms of angle-of-incidence directional sensitivities about incident beams from a subject, wherein the restoration region includes a partial region of the detection image corresponding to a region including a subject satisfying a preregistered condition or a region other than the region including the subject satisfying the preregistered condition on the restoration image.

22. The non-transitory computer readable medium according to claim 21, wherein the image capturing element that includes multiple pixels receives the incident beams that are incident thereon via an on-chip lens.

* * * * *